(12) United States Patent
Lee et al.

(10) Patent No.: US 10,261,295 B2
(45) Date of Patent: Apr. 16, 2019

(54) ELECTRONIC DEVICE INCLUDING OPTICAL SYSTEM HAVING A TELEPHOTO LENS

(71) Applicant: Samsung Electronics Co., Ltd., Gyeonggi-do (KR)

(72) Inventors: Tae-Kun Lee, Seoul (KR); Ki-Woo Lee, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 48 days.

(21) Appl. No.: 15/342,925

(22) Filed: Nov. 3, 2016

(65) Prior Publication Data

US 2017/0123195 A1    May 4, 2017

(30) Foreign Application Priority Data

Nov. 3, 2015   (KR) .................. 10-2015-0154114

(51) Int. Cl.
| | | |
|---|---|---|
| *G02B 15/17* | (2006.01) | |
| *G02B 15/26* | (2006.01) | |
| *G02B 5/00* | (2006.01) | |
| *G02B 7/10* | (2006.01) | |
| *G02B 27/00* | (2006.01) | |

(52) U.S. Cl.
CPC .............. *G02B 15/26* (2013.01); *G02B 5/005* (2013.01); *G02B 7/102* (2013.01); *G02B 15/17* (2013.01); *G02B 27/0025* (2013.01)

(58) Field of Classification Search
CPC ........ G02B 15/17; G02B 15/16; G02B 15/26; G02B 7/102; G02B 5/005; G02B 27/0025; G02B 13/18; G02B 15/167; G02B 15/20; G02B 15/173
USPC .......................... 359/684, 676, 714, 765, 688
See application file for complete search history.

(56) References Cited

U.S. PATENT DOCUMENTS

| | | | | |
|---|---|---|---|---|
| 5,808,809 | A | * | 9/1998 | Yahagi ................. G02B 15/173 359/683 |
| 8,824,057 | B2 | | 9/2014 | Ryu |
| 8,867,144 | B2 | | 10/2014 | Yamanaka |
| 2009/0296231 | A1 | | 12/2009 | Shirasuna |
| 2013/0201565 | A1 | | 8/2013 | Yamanaka |

FOREIGN PATENT DOCUMENTS

| | | |
|---|---|---|
| JP | 2009086535 | 4/2009 |
| JP | 2009288619 | 12/2009 |
| JP | 2010191335 | 9/2010 |
| JP | 2013160997 | 8/2013 |

* cited by examiner

*Primary Examiner* — Collin X Beatty
(74) *Attorney, Agent, or Firm* — The Farrell Law Firm, P.C.

(57) ABSTRACT

An optical system is provided. The optical system includes a first lens group that has a positive refractive power, a second lens group that has a negative refractive power, a third lens group that has a negative refractive power, a fourth lens group that has a positive refractive power, and a fifth lens group that includes one or more lens groups, in sequence from an object, wherein the first lens group and the fifth lens group are fixed and the third lens group moves parallel to an optical axis to perform focusing when adjusting a magnification of the optical system.

19 Claims, 73 Drawing Sheets

ELECTRONIC DEVICE INCLUDING OPTICAL SYSTEM HAVING A TELEPHOTO LENS

PRIORITY

This application claims priority under 35 U.S.C. § 119(a) to Korean Patent Application Serial No. 10-2015-0154114, which was filed in the Korean Intellectual Property Office on Nov. 3, 2015, the entire content of which is incorporated herein by reference.

BACKGROUND

1. Field of the Disclosure

The present disclosure relates generally to an optical system, and more particularly, to an optical system of a telephoto zoom lens having a large aperture.

2. Description of the Related Art

Recently, optical systems, such as digital cameras, video cameras, or portable terminals that adopt camera devices, have been implemented using a charged coupled device (CCD) or a complementary metal-oxide semiconductor (CMOS). In addition, there has been a demand for a camera module that uses a large number of pixels in an optical system of digital cameras, video cameras, or camera devices that are mounted in the portable terminals.

Among a variety of lenses that are implemented in the optical systems, a zoom lens may continuously change the focal distance in order to zoom in or out on a subject to be photographed.

The optical system may adopt a combination of lenses in order to get a high-zoom magnification and in order to reduce aberration. Therefore, an optical system that can implement the zoom lens is inevitably large and heavy compared to an optical system that implements a single focus.

In addition, the optical system adopting the zoom lens requires a driving source for operating the zoom lens to zoom in or out on a subject to be photographed, and it is not easy to make a quick switch of the driving source when photographing a subject that is close to the optical system because the driving source is large. Furthermore, it is difficult to control focusing, and the operating time of the optical system is shortened due to its big power consumption.

SUMMARY

An aspect of the present disclosure provides an optical system that lightens the focusing group; minimizes a change in the short-distance aberration; improves the focusing sensitivity in order to thereby increase the focusing speed; and enables the short-distance photographing.

An aspect of the present disclosure provides an optical system that minimizes the aberration change when adjusting the magnification of the optical system through a zoom lens; and has a high center-periphery balance at the front zoom end. In particular, the present disclosure provides an optical system that reduces the weight of the whole optical system by optimizing the lens configuration of the first lens group, and that has a high imagery performance by effectively correcting the telephoto end spherical aberration and the vertical chromatic aberration.

An aspect of the present disclosure provides an optical system that is lightened by configuring the lens group for the image stabilization to have two lenses, and that can correct the coma-aberration, the astigmatism, and the magnification chromatic aberration upon the correction of 0.4 degrees at the telephoto end.

An aspect of the present disclosure provides an optical system that is suitable for video recording by applying a negative power to a lens group that has a lighter focusing lens; applying a negative power to a lens group that is positioned before the focusing lens group; and disposing a positive power to the rear group in order to thereby minimize a change in the angle of view while focusing according to a change in the object distance.

In accordance with an aspect of the present disclosure, there is provided an optical system. The optical system includes a first lens group that has a positive refractive power, a second lens group that has a negative refractive power, a third lens group that has a negative refractive power, a fourth lens group that has a positive refractive power, and a fifth lens group that includes one or more lens groups, in sequence from an object, wherein the first lens group and the fifth lens group are fixed and the third lens group moves parallel to an optical axis to perform focusing when adjusting a magnification of the optical system.

In accordance with an aspect of the present disclosure, there is provided an optical system. The optical system includes a first lens group that has a positive refractive power, a second lens group that has a negative refractive power, a third lens group that has a negative refractive power, a fourth lens group that has a positive refractive power, and a fifth lens group that includes one or more lens groups, in sequence from an object, wherein the first lens group and the fifth lens group are fixed and the third lens group moves parallel to an optical axis to perform focusing when adjusting a magnification of the optical system from a wide-angle end to a telephoto end, and wherein the optical system satisfies the Equation: $|fT/f12T|<0.3$, where $fT$ represents a focal distance of the whole system at a telephoto end, and $f12T$ represents a composite focal distance of the first lens group and the second lens group at a telephoto end.

In accordance with an aspect of the present disclosure, there is provided an optical system. The optical system includes a first lens group that has a positive refractive power, a second lens group that has a negative refractive power, a third lens group that has a negative refractive power, a fourth lens group that has a positive refractive power, and a fifth lens group that includes one or more lens groups, in sequence from an object, wherein the first lens group and the fifth lens group are fixed and the third lens group moves parallel to an optical axis to perform focusing when adjusting a magnification of the optical system from a wide-angle end to a telephoto end, and the third lens group is configured with one of one lens and two combined lenses, and wherein the optical system satisfies the Equations: $|fT/f12T|<0.3$ and $0.4<|(R1+R2)/(R1-R2)|<0.8$, where $fT$ represents a focal distance of the whole system at a telephoto end, $f12T$ represents a composite focal distance of the first lens group and the second lens group at a telephoto end, R1 represents a radius of curvature of the first lens surface from the object in the third lens group, and R2 represents a radius of curvature of the last lens surface from the object in the third lens group.

In accordance with an aspect of the present disclosure, there is provided an optical system. The optical system includes a first lens group that has a positive refractive power, a second lens group that has a negative refractive power, a third lens group that has a negative refractive power, a fourth lens group that has a positive refractive power, and a fifth lens group that includes one or more lens groups, in sequence from an object, wherein the first lens group and the fifth lens group are fixed and the third lens group moves parallel to an optical axis to perform focusing when adjusting a magnification of the optical system from a wide-angle end to a telephoto end, and the third lens group is configured with one of one lens and two combined lenses, and wherein the optical system satisfies the Equations: |fT/f12T|<0.3 0<(wT(0.1)−wT(0))/wT(0)<0.15, where fT represents a focal distance of the whole system at a telephoto end, f12T represents a composite focal distance of the first lens group and the second lens group at a telephoto end, and wT(M) represents a degree of a half-angle of view at a telephoto end when the object-to-image magnification is M.

In accordance with an aspect of the present disclosure, there is provided an optical system. The optical system includes a first lens group that has a positive refractive power, a second lens group that has a negative refractive power, a third lens group that has a positive refractive power, and a fourth lens group that includes one or more lens groups, wherein the first lens group and the fourth lens group are fixed when adjusting a magnification of the optical system from a wide-angle end to a telephoto end, and the second lens group comprises a focusing lens group that moves parallel to an optical axis to perform focusing, and wherein the optical system satisfies the Equation: |fT/f1-focusT|<0.3, where, fT represents a focal distance of the whole system at a telephoto end, and f1-focusT represents a composite focal distance from the first lens group to a lens group before the focusing lens group at a telephoto end.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
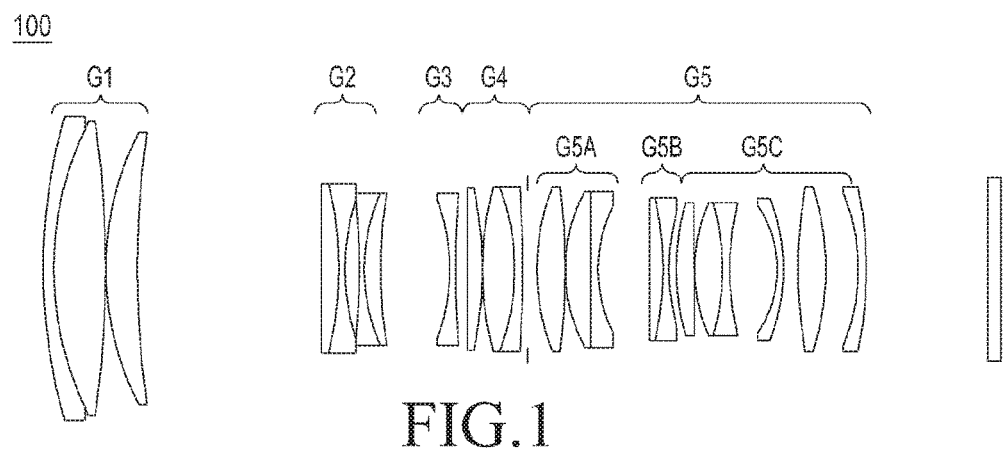
FIG. 1 is a diagram illustrating a lens array of a wide-angle end in an optical system, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

In addition, the technical configuration and effects of the optical system, according to the present disclosure, will be clearly understood through the following description with reference to the drawings that illustrate preferred embodiments of the present disclosure.

However, a thickness, size, and shape of a lens described herein will be shown to be slightly exaggerated in the lens configuration diagram of each embodiment for ease of understanding. In particular, a spherical or aspherical shape of the lens shown in the lens configuration diagram is only an example, and the present disclosure is not limited thereto.

The present disclosure discloses an optical system that can be operated as a large-aperture telephoto zoom lens. The optical system operated as a large-aperture telephoto zoom lens may be implemented to lighten the focusing lens group, the image stabilization lens group, and the whole lens system; minimize an aberration variation according to an adjustment of a magnification and the aberration variation according to a change in the object distance to attain a high optical performance; and minimize a change in the angle of view in the case of the focusing movement in order to maximize a high-resolution video recording function, which has recently been demanded, so that lens functions that are necessary for the video recording, as well as the high-resolution still photographing, can be executed.

The optical system 100 (see FIGS. 1-3, for example) of the present disclosure, which is a zoom lens having a fixed full length, may include a first lens group G1, a second lens group G2, a third lens group G3, a fourth lens group G4, and a fifth lens group G5.

In the optical system 100, the first lens group G1 may be configured to have a positive refractive power. The first lens group G1 may be fixed while adjusting a magnification or while focusing.

The first lens group G1 may include one or more negative lenses and two or more positive lenses.

It is important to configure the lenses of the first lens group G1 so as to effectively correct the spherical aberration and the vertical chromatic aberration at the telephoto end. In addition, since the lens displacement and the aberration variation in the case of adjusting the magnification is determined by the refractive power relationship between the first lens group G1 and variator lens groups after the first lens group G1, it may be important to properly distribute the refractive power. In addition, the first lens group G1 is configured to implement the condensing of light at the telephoto end, which has the largest aperture lens in the optical system 100 and which has the largest proportion in weight of the whole optical system 100. Therefore, in the optical system 100, the first lens group G1 may be configured with one negative lens and two positive lenses, and the two positive lenses may be made of an anomalous dispersion material for the vertical chromatic aberration correction.

In the optical system 100, the second lens group G2 may be provided as a variator lens group for the variator.

The second lens group G2 may be configured with a plurality of composite lenses of a positive lens and a negative lens in order to minimize a change in the vertical chromatic aberration and a change in the magnification chromatic aberration, and the positive lens may be made of a high-refractive material to implement the accurate optical aberration by reducing the variation of PETZVAL field curvature (also referred to as "field curvature") by using the positive lens of a high-refractive material.

In the optical system 100, the third lens group G3 may be configured as a focusing lens group that performs focusing. The focusing lens group may increase the focusing speed, and may ensure the focusing sensitivity in order to implement a reduction in the movement stroke. In addition, the focusing lens group may be lightened and may minimize the aberration variation.

The third lens group G3 may be configured to have a negative refractive power. The third lens group G3 may be comprised of one negative lens or a combination of a positive lens and a negative lens, and may be provided to move parallel to an optical axis in order to adjust the focusing. In addition, the lens of a negative refractive power in the third lens group G3 may be made of a low-dispersion material in order to thereby suppress the variation of the magnification chromatic aberration. The system may be lightened by configuring the third lens group G3 as described above.

In addition, the first lens group G1, the second lens group G2, and the third lens group G3 may be configured to increase the focusing sensitivity with a small aberration variation through appropriate distribution of the refractive power.

In the optical system 100, the fourth lens group G4 may be provided to have a positive refractive power. The fourth lens group G4 may be configured as a compensator lens group for the compensator.

It is preferable that a change in the combination refractive power of the third lens group G3 and the fourth lens group G4 is not very big when the optical system 100 adjusts the magnification from the wide angle end to the telephoto end. In addition, the lens is preferably made of an anomalous dispersion material to have a positive refractive power.

The second lens group G2, the third lens group G3, and the fourth lens group G4 may move from the image to the object without inflection when adjusting the magnification of the optical system 100, and may satisfy the aforementioned conditions in order to thereby suppress the aberration variation, as will be described in greater below.

In the optical system 100, the fifth lens group G5 may be configured as a master lens group.

The fifth lens group G5 may include an aperture, and may be configured to have a positive refractive power. In addition, the fifth lens group G5 is fixed when adjusting the magnification of the optical system 100.

The fifth lens group G5 may include a lens group 5A (G5A) having a positive refractive power, a lens group 5B (G5B) having a negative refractive power, and a lens group 5C (G5C) having a positive refractive power.

The lens group G5A may be comprised of two or more lenses of a positive refractive power, and the lenses of the lens group G5A, which have a positive refractive power, may be made of an anomalous dispersion material for the chromatic aberration correction.

The lens group G5B may be comprised of a composite lens, or may be configured by adding one negative lens to the composite lens in order to thereby increase the negative refractive power so that the displacement during the image stabilization may be reduced. Although the lens group G5B has been described to have one or two lenses, it may be comprised of three lenses. However, the lens group G5B of three lenses may not be preferable for the lightening of the system. Thus, the lens group G5B may have good balance for correcting the chromatic aberration caused by the eccentricity and for reducing the weight of the image stabilization group when it is comprised of two lenses.

The lens group G5C plays the role of forming final images in the master lens group, and may be configured to appropriately correct the residual aberration of the entire optical system 100 and the aberration caused by the eccentricity of the lens group G5B. The lens group G5C may properly adjust the sensitivity of the image stabilization group and may correct the residual astigmatism on the periphery by mainly allocating a positive power to the object and by mainly allocating a negative power to the image.

A proper air gap may be formed between the lens group G5A and the lens group G5B to reduce the effective aperture of the lens group G5B and in order to thereby reduce the weight of the movement group. In addition, the last surface of the lens group G5A is configured to be concave with respect to the image plane and a lens of a negative refractive power, which has a concave surface with respect to the object, is disposed in the lens group G5C to correct the coma-aberration caused by the eccentricity of the lens group G5B. In addition, the lens of a negative refractive power in the lens group G5C may be made of a crown-family material to correct the magnification chromatic aberration that is easily caused by the eccentricity.

As described above, when disposing the lens group G5A, the lens group G5B, and the lens group G5C in the fifth lens group G5, the image stabilization may be executed by moving two lenses through a proper disposition of power and materials, and the image stabilization of 0.4 degrees at the telephoto end may be dealt with by minimizing the coma-aberration, the magnification chromatic aberration, and the image-plane curvature variation.

Hereinafter, an operation of the optical system 100 will be described.

As described above, the optical system 100, relates to a large-aperture telephoto zoom lens.

The size of the focusing lens group or the amount of focusing displacement may significantly influence the entire configuration and usability of the optical system 100 in the large-aperture telephoto zoom lens. Thus, the optical system 100 may be configured to lighten the focusing lens group; minimize the short-distance aberration variation; and provide an appropriate focusing sensitivity in order to thereby increase the focusing speed and in order to thereby enable the short-distance photographing.

Recently, there has been a growing user demand for video recording as well as still photographing. Thus, a small change in the photographing angle of view in the case of the focusing is essential for natural images. Therefore, a change in the angle of view according to the movement of the focusing lens may be configured to be small and natural.

In addition, the optical system 100 may be configured to minimize the aberration variation while zooming in and out in the optical system 100; have a high center-periphery balance at the front zoom end; optimize the lens configuration of the first lens group G1 in order to thereby reduce the weight of the whole optical system 100; and effectively correct the telephoto end spherical aberration and the vertical chromatic aberration in order to thereby secure a high imagery performance. In addition, the optical system 100 may lighten the lens group for the image stabilization by configuring the same with two lenses, and may effectively correct the coma-aberration, the astigmatism, and the magnification chromatic aberration upon the correction of 0.4 degrees at the telephoto end.

The optical system 100 (also referred to as a "telephoto zoom optical system") includes the first lens group G1, which has a positive refractive power; the second lens group G2, which has a negative refractive power; the third lens group G3, which has a negative refractive power; the fourth lens group G4, which has a positive refractive power; and the fifth lens group G5, which includes one or more lens groups, wherein the first lens group G1 and the fifth lens group G5 are fixed and the third lens group G3 moves parallel to the optical axis to perform focusing while adjusting the magnification of the optical system 100.

As noted above, conventional optical systems require a large driving source that exhibits a high power consumption and a big driving noise because the focusing lens group thereof is heavy, whereas the optical system 100, configures the third lens group G3 of a negative refractive power to move in parallel to the optical axis in order to thereby perform focusing. In addition, the second lens group G2, the third lens group G3, and the fourth lens group G4 may move toward the image plane without inflection to satisfy the conditional equations, which will be described below, while zooming in/out and focusing.

The third lens group G3 may be comprised of one negative lens, a combined lens of a positive lens and a negative lens, or a combination of a positive lens and a negative lens.

One negative lens may be included in the third lens group G3 in order to lighten the optical system 100, which may be configured to enable the aberration correction according to a change in the object distance even when the third lens group G3 has one negative lens.

The optical system 100 of the present disclosure may enable the aberration correction according to Equations (1) and (2).

$$|fT/f12T|<0.3 \quad (1)$$

$$0.4<|(R1+R2)/(R1-R2)|<0.8 \quad (2)$$

Here, fT may represent a focal distance of the whole system at the telephoto end, and f12T may represent a composite focal distance of the first lens group G1 and the second lens group G2 at the telephoto end. In addition, R1 may denote a radius of curvature of a first lens surface of the third lens group G3 from the object, and R2 may denote a radius of curvature of a last lens surface of the third lens group G3 from the object.

The optical system 100 can minimize the aberration variation according to a photographing distance change while focusing, and can perform the short-distance photographing by disposing power to satisfy Equations (1) and (2) above.

Equation (1) allows a composite refractive power of the first lens group G1 and the second lens group G2 to be close to that of the afocal type of lens at the telephoto end to minimize the spherical aberration variation and the coma-aberration variation at the telephoto end even when focusing by means of a single lens. In addition, since there is no change in the effective aperture of the focusing lens group even in the case of the short-distance focusing, it may be the optimal condition for the lightening of the focusing group.

If the value of Equation (1) exceeds an upper limit value of 0.3, the spherical aberration and the coma-aberration will be under a reference in the case of the short-distance photographing at the telephoto end so that a sufficient performance may not be secured in a short distance. The various embodiments of the disclosure may explain an example in which the value of Equation (1) is less than or equal to 0.2. Since the optical system 100 is configured such that the value of Equation (1) is less than or equal to 0.2, the focusing aberration variation and the lightening of the lenses may be optimized.

Equation (2) relates to the radius of curvature of the surface directed to the object or the image plane of the focusing lens group (which may correspond to "the third lens group G3"). The third lens group G3 is preferably configured in the form of a double-concave lens or a plane-concave lens for the aberration correction. When the optical system 100 satisfies Equation (2), it is possible to reduce the image plane curvature variation at the wide-angle end and to reduce the coma-aberration variation at the telephoto end in the case of the focusing of the optical system 100.

Equation (3):

$$(1-m_{focus,T}^2) \cdot m_{rear,T}^2 \cdot f3/fT < -0.4 \text{ and} \quad (3)$$

Equation (4):

$$0.7 \leq \frac{\{(1-m_{focus,T}^2) \cdot m_{rear,T}^2\}}{\{(1-m_{focus,W}^2) \cdot m_{rear,W}^2\}} \leq 1.4 \quad (4)$$

Here, fT may represent a focal distance of the whole system at the telephoto end, and f3 may represent a focal distance of the third lens group G3, $m_{focus,T}$ may denote the magnification of the third lens group G3 at the telephoto end, and $m_{rear,T}$ may denote the magnification of the lens groups positioned after the third lens group G3 at the telephoto end. $m_{focus,W}$ may denote the magnification of the third lens group G3 at the wide-angle end, and $m_{rear,W}$ may denote the magnification of the lens groups positioned after the third lens group G3 at the wide-angle end.

If the third lens group G3 is configured to satisfy Equation (3) above, the aberration variation according to the focusing may be reduced and the focusing speed may increase.

If the value of Equation (3) exceeds the upper limit value of −0.4, the focus sensitivity becomes low so that the focusing stroke may become too long or the negative refractive power of the third lens group G3 may become big to then result in a large aberration variation while focusing. The optical system 100 may be described with reference to an example in which the value of Equation (3) is less than or equal to −0.6. When the value of Equation (3) is less than or equal −0.6, the aberration variation according to the focusing may be minimized and the focusing sensitivity may increase.

Equation (4) shows a proper ratio of the focusing sensitivity at the wide-angle end and the telephoto end. When the optical system 100 satisfies Equation (4), it is easy to control the focusing, such as focusing tracking, while zooming in and out.

Equation (5):

$$|fT/f34T|<1.0 \qquad (5)$$

Equation (6):

$$-0.4<fW/f34W+fT/f34T<0.2 \qquad (6)$$

Here, fT may represent a focal distance of the whole system at the telephoto end, and f34T may represent a composite focal distance of the third lens group G3 and the fourth lens group G4 at the telephoto end. fW may represent a focal distance of the whole system at the wide-angle end, and f34 W may represent a composite focal distance of the third lens group G3 and the fourth lens group G4 at the wide-angle end.

Equations (5) and (6) are intended to suppress the aberration variation while adjusting the magnification of the optical system 100.

The third lens group G3 and the fourth lens group G4 may implement a compensator function. In addition, it has been described that Equation (1) allows a composite refractive power of the first lens group G1 and the second lens group G2 to be close to that of the afocal type of lens at the telephoto end. If a composite focal distance of the third lens group G3 and the fourth lens group G4 at the telephoto end exceeds a focal distance of the entire optical system 100 as shown in Equation (5), the first lens group G1 to the fourth lens group G4 at the telephoto end may be close to the afocal type of lens. Thus, the sensitivity to the eccentricity of the optical system 100 may be lowered, and the residual aberration of the first lens group G1 to the fourth lens group G4 may be effectively eliminated by the fifth lens group G5 while adjusting the magnification.

In the optical system 100 it may prove advantageous to determine the value of Equation (5) to be less than or equal to 0.6 for the aberration control.

In addition, in the optical system 100 of the present disclosure, Equation (6) relates to a change in the composite refractive power of the third lens group G3 and the fourth lens group G4 while adjusting the magnification of the optical system 100, and when the optical system 100 satisfies Equation (6), the image-plane curvature change may be suppressed while adjusting the magnification.

In addition to Equation (6), for example, when the optical system 100 satisfies Equation (6a) below, the image-plane curvature variation may be minimized while adjusting the magnification.

Equation 6a:

$$-0.2<fW/f34W+fT/f34T<0.1. \qquad (6a)$$

Here, fT may represent a focal distance of the whole system at the telephoto end, and f34T may represent a composite focal distance of the third lens group G3 and the fourth lens group G4 at the telephoto end. fW may represent a focal distance of the whole system at the wide-angle end, and f34 W may represent a composite focal distance of the third lens group G3 and the fourth lens group G4 at the wide-angle end.

In the optical system 100 the first lens group G1 may implement the condensing of light at the telephoto end, and may include the largest aperture lens in the optical system 100. Thus, the first lens group G1 is a large part of the entire optical system 100 in weight. In addition, it is important to configure the first lens group G1 to effectively correct the spherical aberration and the vertical chromatic aberration at the telephoto end.

The first lens group G1 of conventional large-aperture telephoto zoom lenses is comprised of one or two lenses of a negative refractive power and three lenses of a positive refractive power. This configuration may enable the spherical aberration and the vertical chromatic aberration to be effectively corrected at the telephoto end, whereas the weight thereof may increase.

Therefore, the first lens group G1 may be configured with: the first lens that has a negative refractive power; the second lens that has a positive refractive power; and the third lens that has a positive refractive power. Since the first lens group G1 adopts the first lens of a negative refractive power, the second lens of a positive refractive power, and the third lens of a positive refractive power, it is possible to effectively correct the aberration generated at the telephoto end while reducing the weight of the optical system 100.

Equation (7):

$$1E-4<1/(fp1\times Vdp1)+1/(fp2+Vdp2)<1.5E-4 \qquad (7)$$

Equation (8):

$$4.5E-6<\Delta Pg,Fp1/(fp1\times Vdp1)+\Delta Pg,Fp2/(fp2\times Vdp2)<6.5E-6 \qquad (8)$$

Equations (7) and (8) relate to the configuration of the first lens group G1.

If the optical system 100 is configured to exceed the upper limit value of Equation (7), the first spectrum correction may be excessive, whereas if the optical system 100 is configured to be less than the lower limit value of Equation (7), the power of the first lens group G1 may not be sufficient so that the total length and the amount of movement of the second lens group G2 may increase.

If the optical system 100 is configured to exceed the upper limit value of Equation (8), the second spectrum correction may be excessive, whereas if the optical system 100 is configured to be less than the lower limit value of Equation (8), the second spectrum correction may not be sufficient so that the g-line correction may not be enough.

As mentioned above, the fifth lens group G5 may include an aperture; have a positive refractive power; and be fixed while adjusting the magnification.

The fifth lens group G5 includes the lens group G5A, which has a positive refractive power; the lens group G5B, which has a negative refractive power; and the lens group G5C, which has a positive refractive power. The last surface of the lens group G5A may be configured to be concave with respect to the image plane and a lens of a negative refractive power, which has a concave surface with respect to the object, is disposed in the lens group G5C to correct the coma-aberration caused by the eccentricity of the lens group G5B. In addition, the lens of a negative refractive power in the lens group G5C may be made of a crown-family material to correct the magnification chromatic aberration that is frequently caused by the eccentricity.

Equation (9):

$$Vnd > 60 \qquad (9)$$

Equation (10):

$$|fT/f15BT| < 0.7 \qquad (10)$$

Equation (11):

$$0.05 < |(D5 \times f5B)/(f5A \times f5C)| < 0.25 \qquad (11)$$

Here, Vnd may represent the Abbe number of the negative lens, and f15BT may represent a composite focal distance of the lens group G5B at the telephoto end in the first lens group G1. D5 may denote the air gap between the lens group G5A and the lens group G5B, and f5A may denote a focal distance of the lens group G5A. In addition, f5B may denote a focal distance of the lens group G5B, and f5C may denote a focal distance of the lens group G5C.

Equation (9) relates to a lens of a negative refractive power of the lens group G5C. In addition, Equation (10) is intended to minimize a change in the astigmatism when the image stabilization lens group is eccentricated. In addition, Equation (11) relates to the disposition of power between sub-groups of the fifth lens group G5.

If the optical system 100 is configured to be less than the lower limit value of Equation (11), the refractive powers of the lens group G5A and the lens group G5C may be lowered. Therefore, it may be difficult to lighten the optical system 100 because the effective aperture of the lens group G5B increases. In addition, if the optical system 100 is configured to exceed the upper limit value of Equation (11), the effective aperture of the lens group G5B may become small, but it may be difficult to correct the aberration caused by the eccentricity of the lens group G5B.

In addition, since the lens group G5C plays the role of forming the final image in the master lens group, it should appropriately correct the residual aberration of the entire optical system 100 and the aberration caused by the eccentricity of the lens group G5B. Therefore, the fifth lens group G5 may dispose a positive power with respect to the object, and may dispose a negative power with respect to the image in order to thereby properly adjust the sensitivity of the image stabilization group and in order to thereby correct the residual astigmatism on the periphery.

Equation (12):

$$0.2 < B.F.L./f5C < 0.8 \qquad (12)$$

Here, B.F.L. may represent a focal distance after in-air when there is no filter around the image plane, and f5C may represent a focal distance of the lens group G5C.

If the optical system 100 is configured to be less than the lower limit value of Equation (12), the power of the lens group G5C may increase so that the sensitivity of the master lens group may increase. Thus, it may be difficult to correct the residual astigmatism on the periphery. In addition, if the optical system 100 of the present disclosure is configured to exceed the upper limit value of Equation (12), B.F.L. may be small. Thus, it may be difficult to configure the exchange lens.

As described above, the image stabilization may be executed by moving two lenses in the fifth lens group G5 through a proper disposition of power and materials inside the fifth lens group G5, and the image stabilization of 0.4 degrees at the telephoto end may be dealt with by minimizing the coma-aberration, the magnification chromatic aberration, and the image-plane curvature variation.

Equation (13):

$$0.150 < N3p - N3n \qquad (13)$$

Here, N3n may represent a refractive index of a negative lens that has the minimum refractive power among the lenses of the third lens group G3, and N3p may represent a refractive index of a positive lens that has the maximum refractive power among the lenses of the third lens group G3.

Equation (13) refers to a condition to more effectively eliminate the chromatic aberration that is generated when adjusting the magnification and focusing in the case where the third lens group G3, which performs the focusing, is configured with two lenses.

A change in the angle of view according to the movement of the focusing lens is important for the video recording of the optical system 100. When the focus bleeding is severe, the video is not natural.

Equation (14):

$$-0.05 < (wT(0.1) - wT(0))/wT(0) < 0.15 \qquad (14)$$

Here, wT(M) may denote a degree of a half-angle of view at the telephoto end when the object-to-image magnification is M.

If the optical system 100 is configured to be less than the lower limit value of Equation (14), the imagery magnification of a close object may increase so that the image may not be natural while focusing. In addition, if the optical system 100 is configured to exceed the upper limit value of Equation (14), there may be a big change in the angle of view when wobbling. As described above, the optical system 100, may include (in sequence from the object): the first lens group G1, which has a positive refractive power; the second lens group G2, which has a negative refractive power; the third lens group G3, which has a negative refractive power; the fourth lens group G4, which has a positive refractive power; and the fifth lens group G5, which includes one or more lens groups, wherein the first lens group G1 and the fifth lens group G5 are fixed and the third lens group G3 moves parallel to the optical axis to perform focusing when adjusting the magnification of the optical system 100 from the wide-angle end to the telephoto end, and wherein the third lens group G3 is comprised of one lens or two combined lenses.

First Embodiment

Table 1 below shows numerical values according to Equation (1) to Equation (14) above, and Table 2 below shows an air gap between an infinite group and a closest group and shows the amount of shift required for the lens group G5B when the optical system 100 is corrected by 0.7 degrees, 0.55 degrees, and 0.4 degrees at the wide-angle end, the middle end, and the telephoto end, respectively. In addition, Table 15 shows numerical values of Equation (1) to Equation (14).

Figure 2:
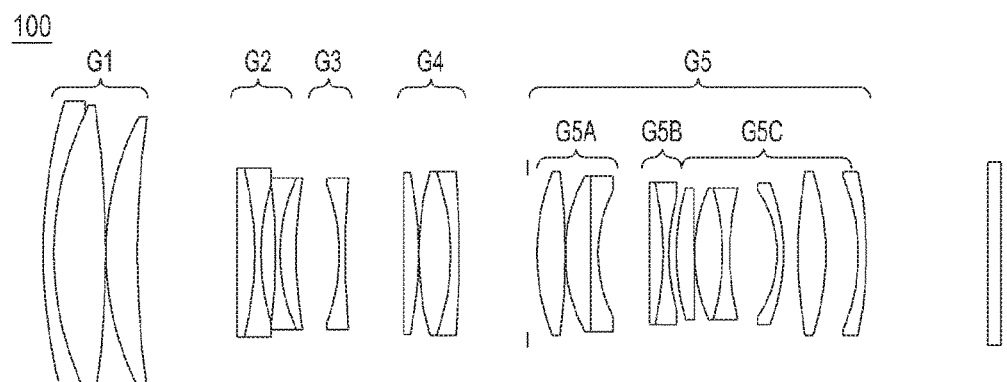
FIG. 2 is a diagram illustrating a lens array of a middle end in the optical system, according to an embodiment of the present disclosure.
Figure 3:
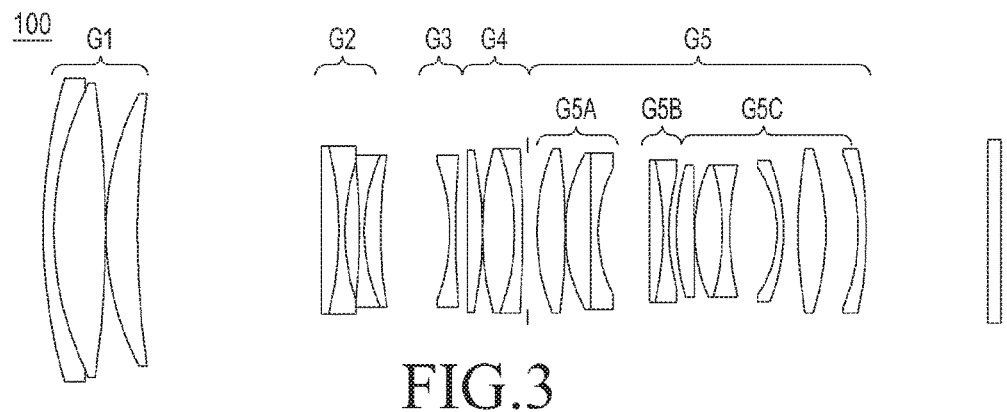
FIG. 3 is a diagram illustrating a lens array of a telephoto end in the optical system, according to an embodiment of the present disclosure.

FIG. 1 is a diagram illustrating the lens array of the wide-angle end in the optical system 100, according to an embodiment of the present disclosure. FIG. 2 is a diagram illustrating the lens array of the middle end in the optical system 100, according to an embodiment of the present disclosure. FIG. 3 is a diagram illustrating the lens array of the telephoto end in the optical system 100, according to an embodiment of the present disclosure.

Figure 4A:
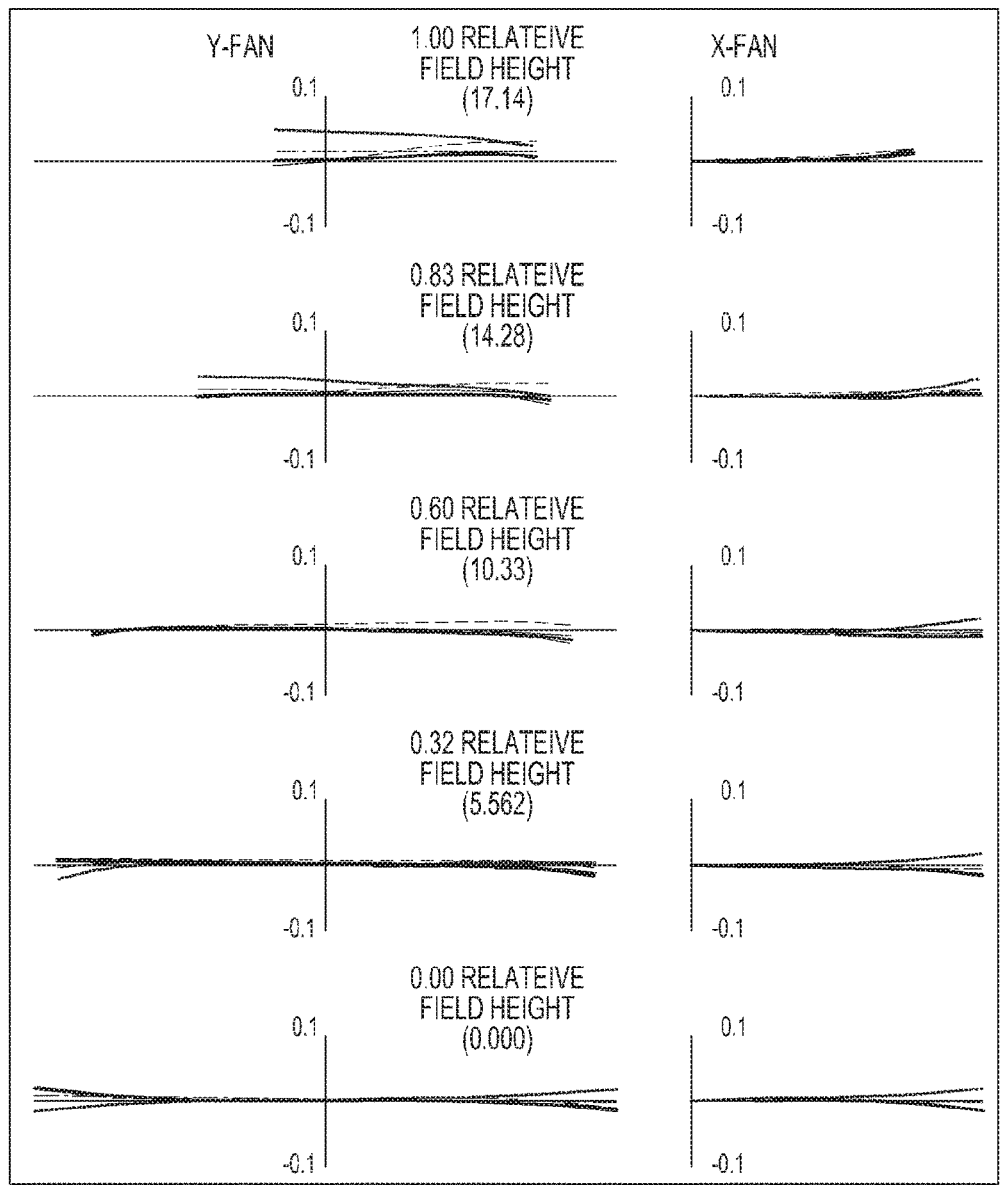
FIGS. 4A-4C are diagrams illustrating a horizontal aberration of the wide-angle end, the middle end, and the telephoto end in the case of an infinite object distance in the optical system, according to an embodiment of the present disclosure.
Figure 4B:
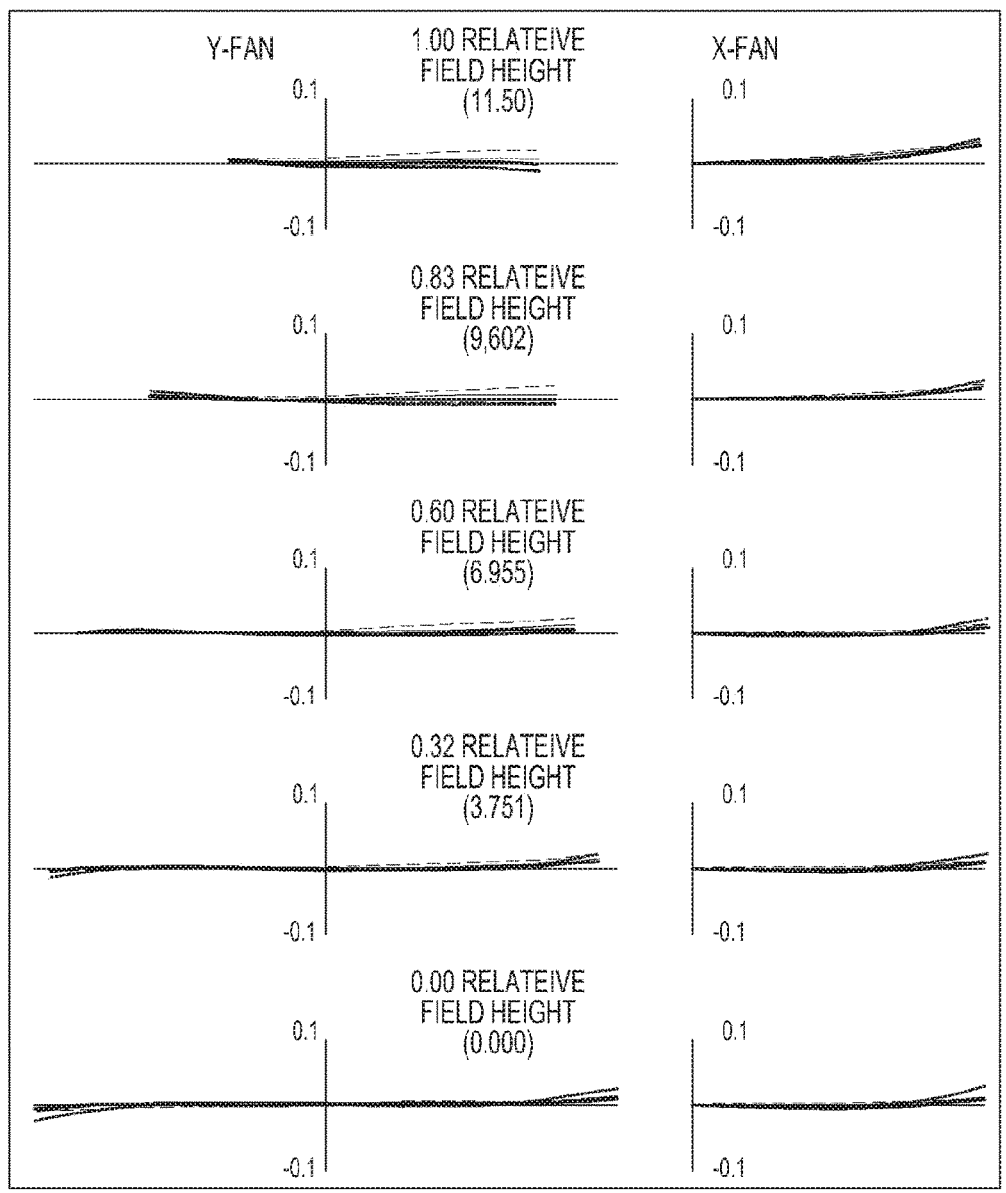
Figure 4C:
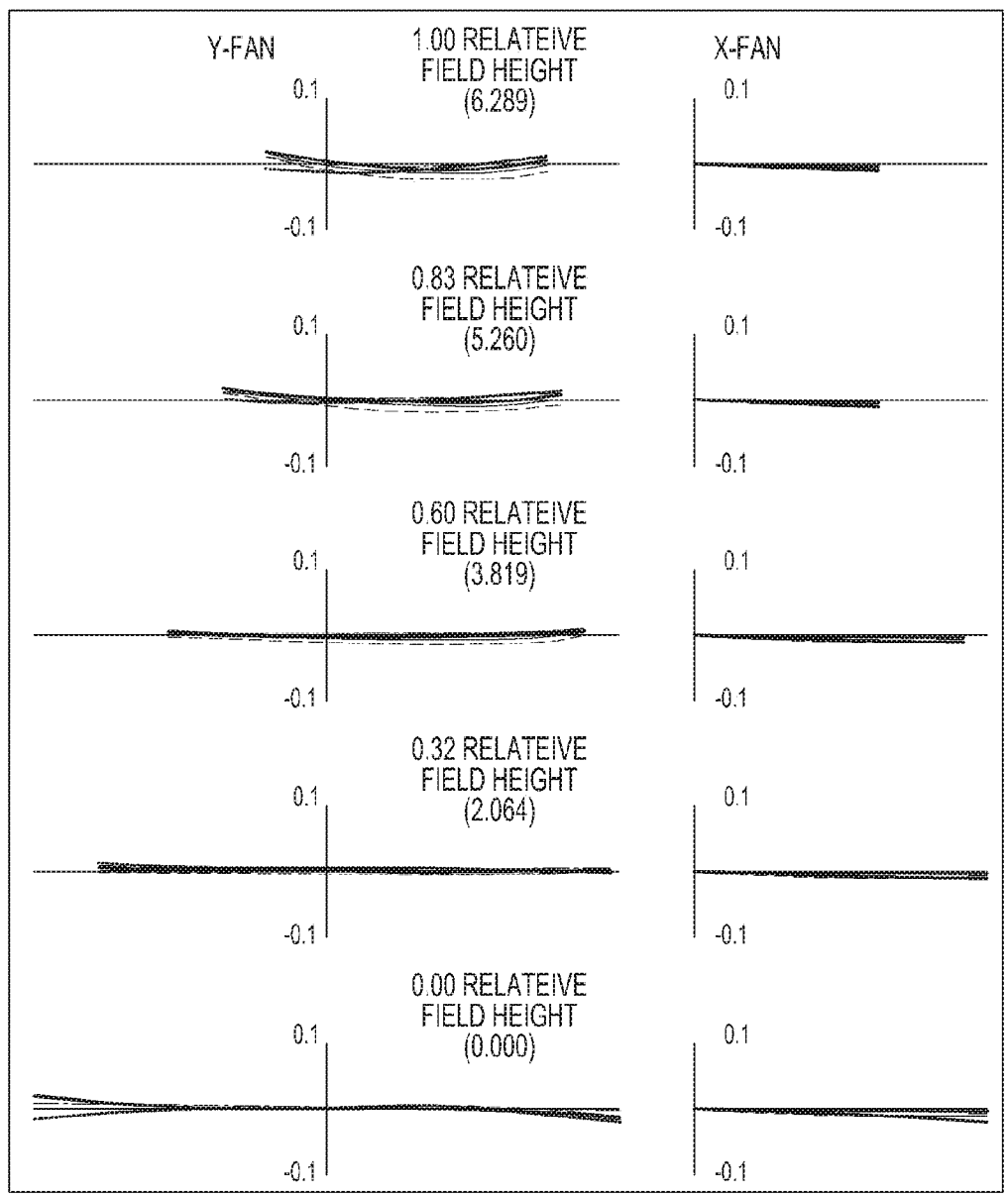
Figure 5A:
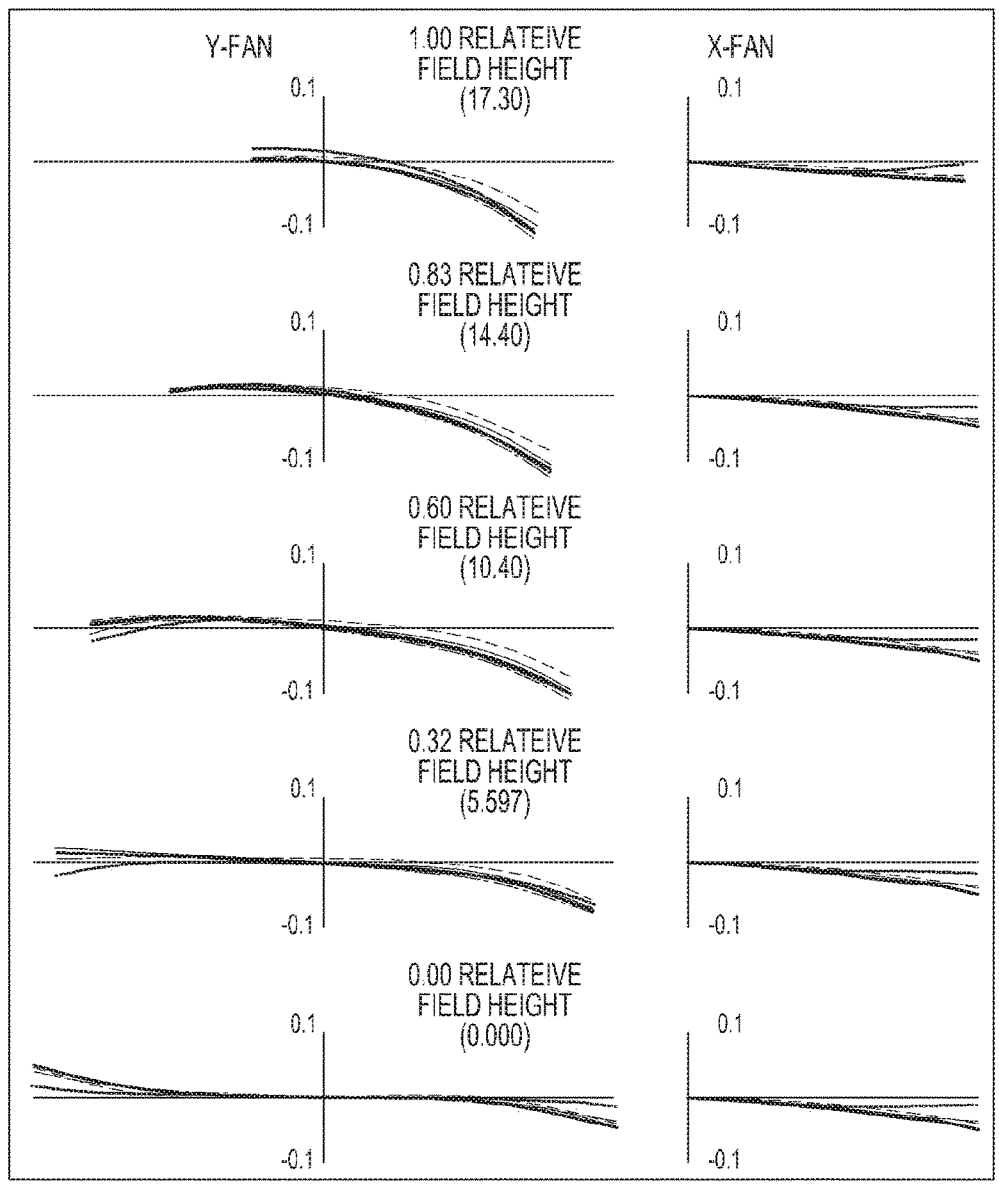
FIGS. 5A-5C are diagrams illustrating the horizontal aberration of the wide-angle end, the middle end, and the telephoto end in the case of the shortest object distance in the optical system, according to an embodiment of the present disclosure.
Figure 5B:
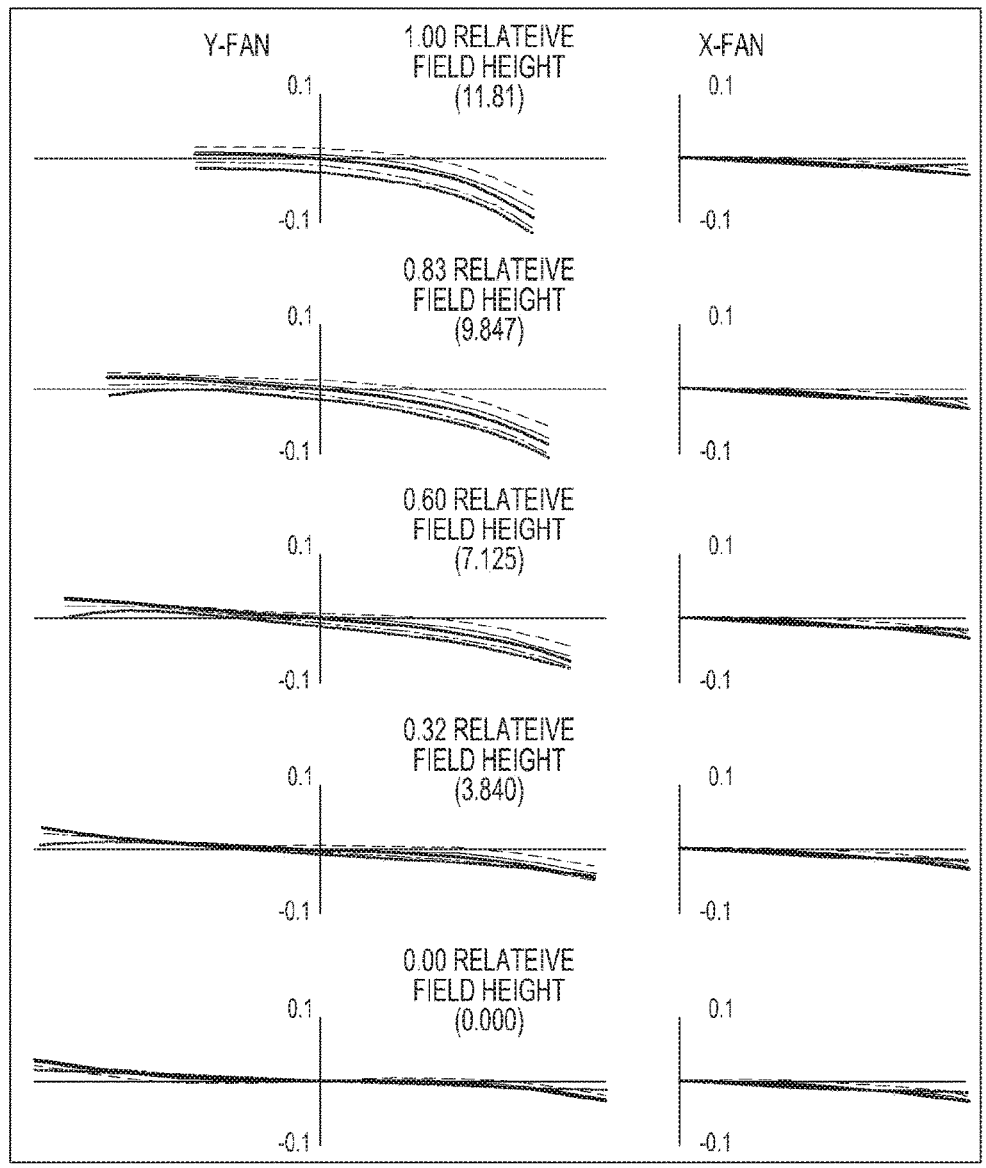
Figure 5C:
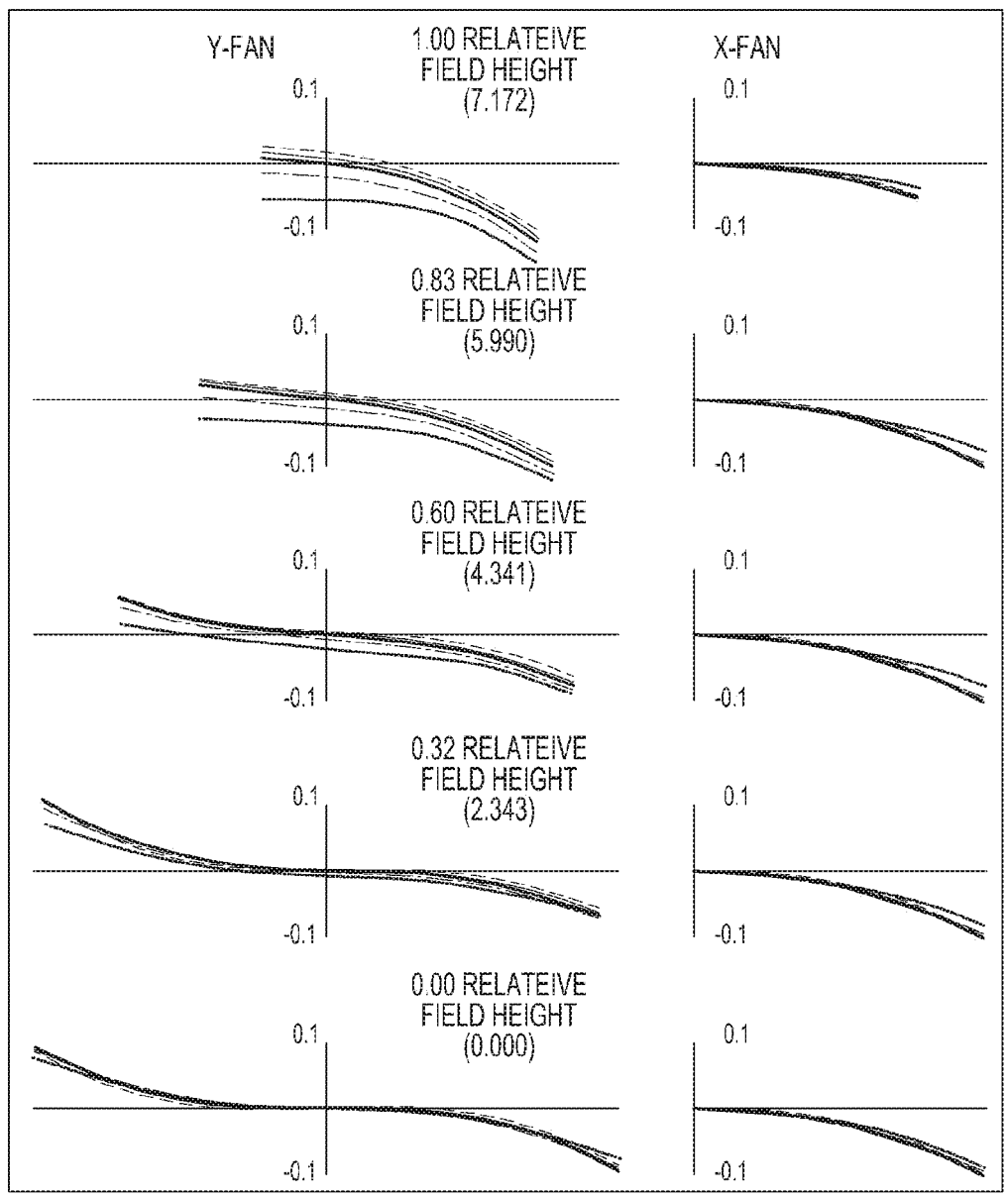
Figure 6A:
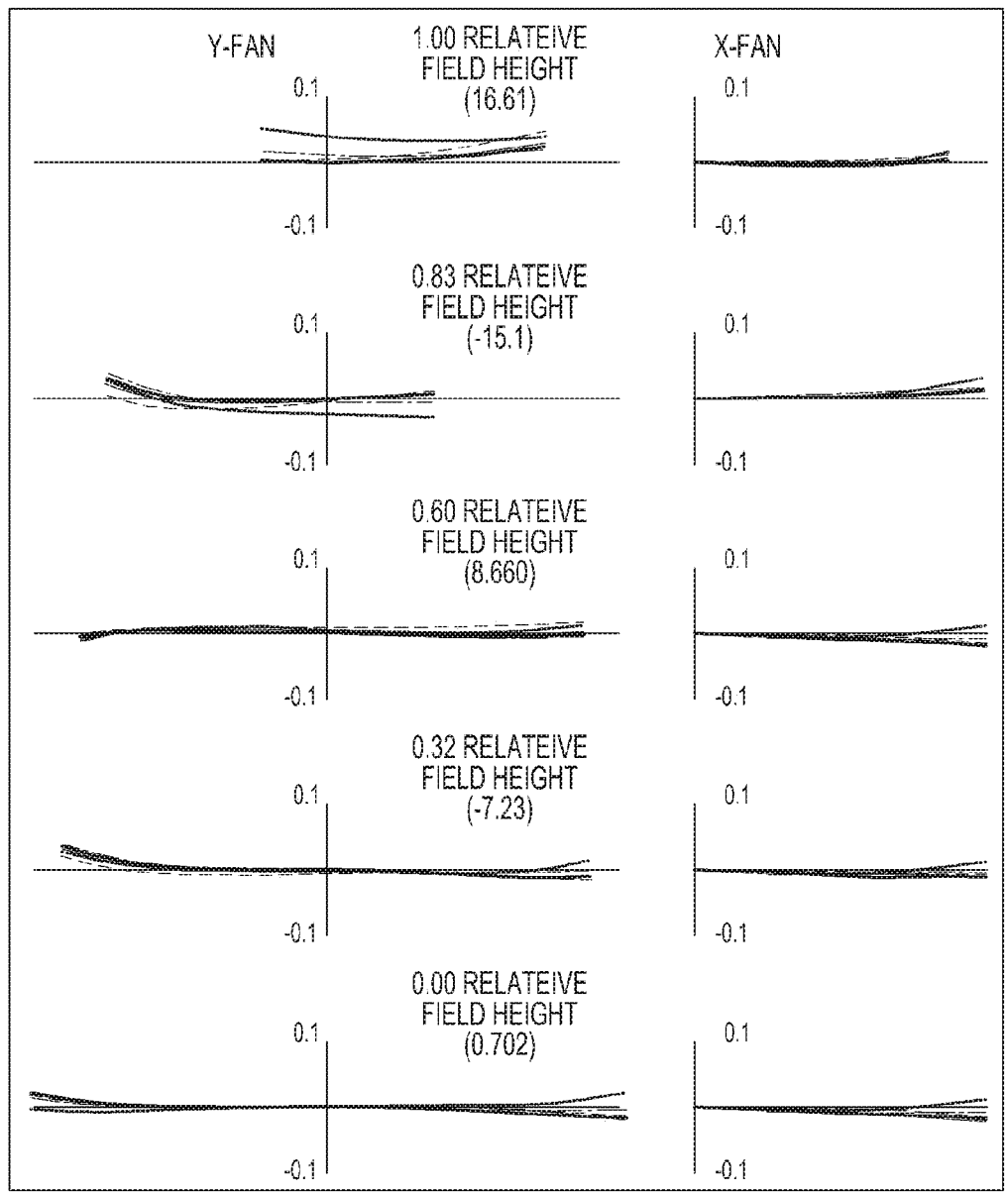
FIGS. 6A-6C are diagrams illustrating the horizontal aberration in the case of an infinite object distance and in the case of image stabilizations of 0.7 degrees, 0.55 degrees, and 0.4 degrees at a wide-angle end, a middle end, and a telephoto end, respectively, in the optical system, according to an embodiment of the present disclosure.
Figure 6B:
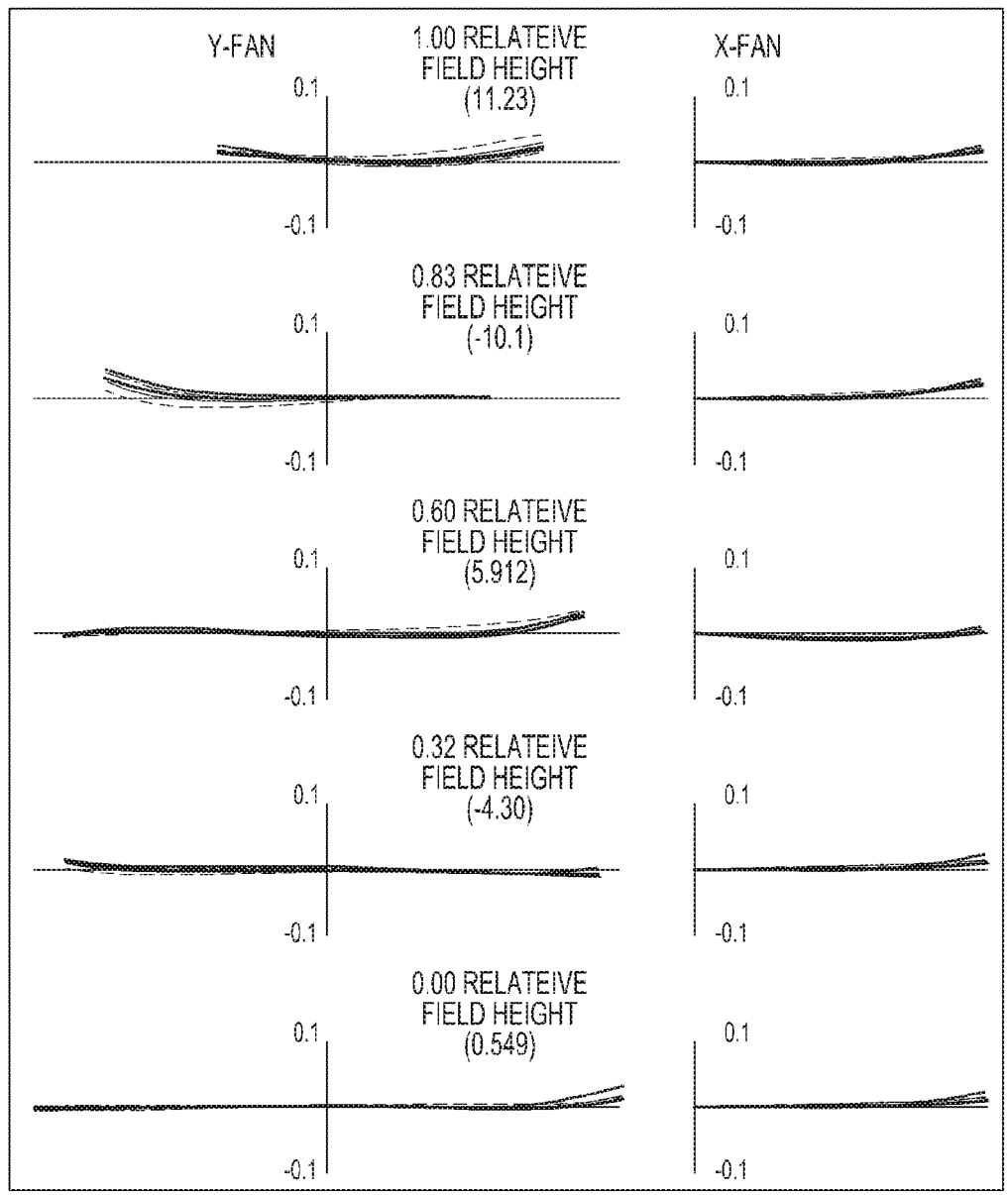
Figure 6C:
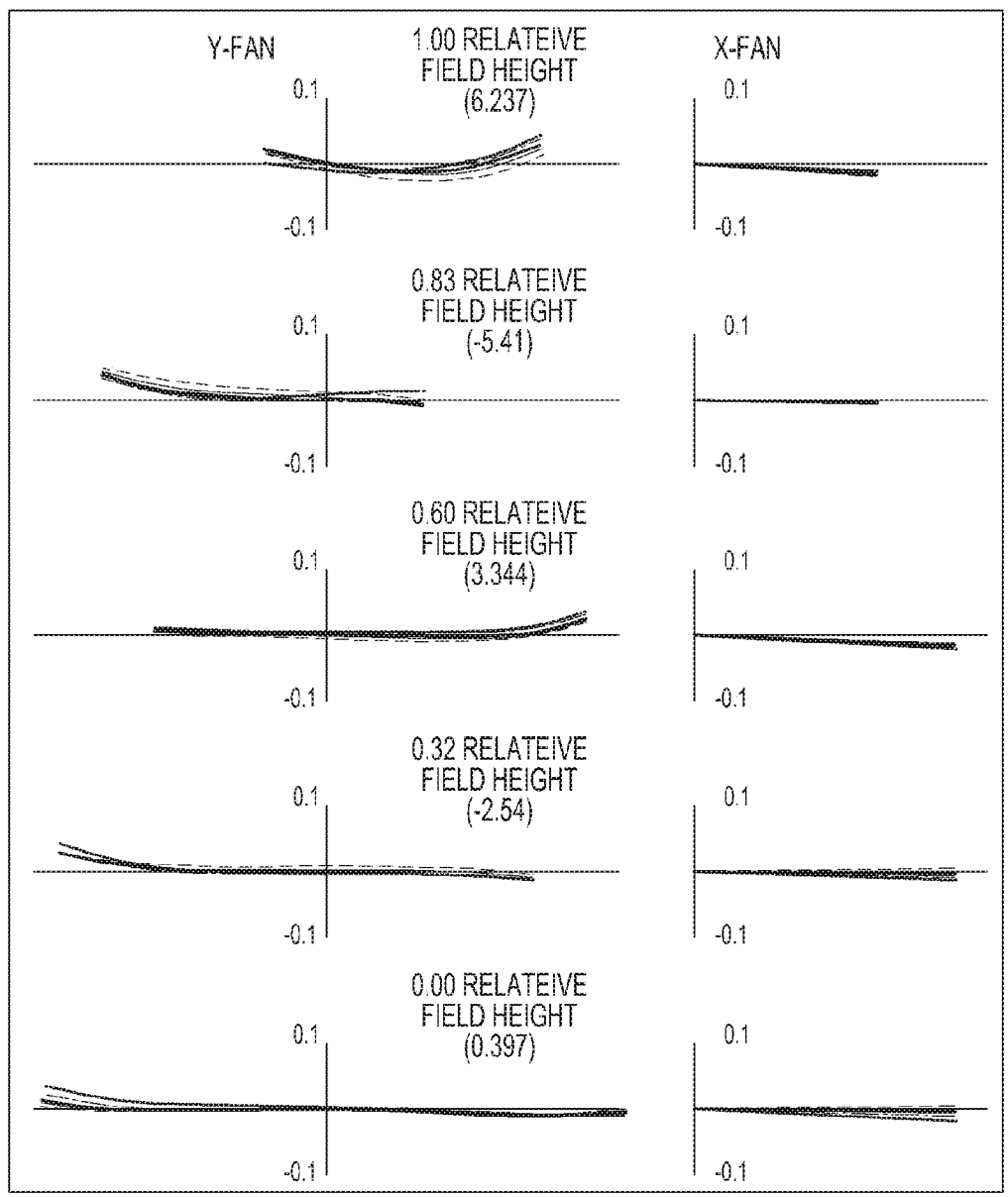

In addition, FIGS. 4A-4C are diagrams illustrating the horizontal aberration of the wide-angle end, the middle end, and the telephoto end in the case of an infinite object distance in the optical system 100, according to an embodiment of the present disclosure. FIGS. 5A-5C are diagrams illustrating the horizontal aberration of the wide-angle end, the middle end, and the telephoto end in the case of the shortest object distance in the optical system 100, according to an embodiment of the present disclosure. FIGS. 6A-6C are diagrams illustrating the horizontal aberration in the case of an infinite object distance and in the case of image stabilizations of 0.7 degrees, 0.55 degrees, and 0.4 degrees at the wide-angle end, the middle end, and the telephoto end, respectively, in the optical system 100, according to an embodiment of the present disclosure.

TABLE 1

| EFL: | 72.10 mm | FNO: | 2.89 | 2w: | 34.28 |
|---|---|---|---|---|---|
| EFL: | 194.00 mm | FNO: | 2.89 | 2w: | 12.58 |

| Surf | Radius | Thick | Ind | Abv |
|---|---|---|---|---|
| 1 | 130.877 | 2.5 | 1.78225 | 26.6 |
| 2 | 82.276 | 0.1 | | |
| 3 | 80.532 | 12.77 | 1.4381 | 95.1 |
| 4 | −278.38 | 0.2 | | |
| 5 | 73.541 | 7.72 | 1.49845 | 81.6 |
| 6 | 221.948 | D1 | | |
| 7 | 937.96 | 4.43 | 1.85941 | 24.3 |
| 8 | −84.096 | 1.6 | 1.64049 | 60.3 |
| 9 | 67.427 | 3.16 | | |
| 10 | −248.348 | 1.6 | 1.77895 | 49.3 |
| 11 | 45.33 | 3.69 | 1.85505 | 23.8 |
| 12 | 89.793 | D2 | | |
| 13 | −50.587 | 1.2 | 1.59561 | 67 |
| 14 | 238.467 | D3 | | |
| 15 | 1512.685 | 3.81 | 1.80831 | 46.5 |
| 16 | −91.878 | 0.15 | | |
| 17 | 83.093 | 8 | 1.59489 | 68.6 |
| 18 | −52.889 | 1.6 | 1.91046 | 31.4 |
| 19 | −420.957 | D4 | | |
| STO | Infinity | 2.5 | | |
| 21 | 53.688 | 6.55 | 1.49845 | 81.6 |
| 22 | −179.608 | 0.15 | | |
| 23 | 39.671 | 6.41 | 1.67845 | 58 |
| 24 | −836.768 | 1.62 | 1.7666 | 48 |
| 25 | 36.986 | 13.12 | | |
| 26 | −886.373 | 3.21 | 1.85505 | 23.8 |
| 27 | −69.391 | 1.3 | 1.67698 | 39.4 |
| 28 | 57.536 | 2.27 | | |
| 29 | 70.938 | 3.92 | 1.83945 | 42.7 |
| 30 | −377.921 | 0.56 | | |
| 31 | 42.446 | 6.85 | 1.49845 | 81.6 |
| 32 | −54.052 | 1.5 | 1.90981 | 31.2 |
| 33 | 61.312 | 12.04 | | |
| 34 | −29.899 | 1.5 | 1.5224 | 57.8 |
| 35 | −47.586 | 3.74 | | |
| 36 | 100.922 | 6.69 | 1.7603 | 28 |
| 37 | −68.357 | 8.45 | | |
| 38 | −48.149 | 1.6 | 1.7762 | 49.6 |
| 39 | −116.98 | 32.83 | | |
| IMG | | | | |

In Table 1 above, Surf denotes a surface number, and Radius denotes the radius of curvature. Thick denotes the thickness, and Ind denotes the refractive index. In addition, Adv denotes the Abbe number.

TABLE 2

| f | 72.10 | 106.85 | 194.00 | | | |
|---|---|---|---|---|---|---|
| D0 | infinity | infinity | infinity | 661.92 | 962.00 | 961.97 |
| D1 | 2.25 | 23.72 | 45.72 | 2.25 | 23.72 | 45.72 |
| D2 | 15.42 | 11.56 | 17.55 | 11.74 | 6.66 | 5.55 |

TABLE 2-continued

| D3 | 20.21 | 15.86 | 3.04 | 23.89 | 20.75 | 15.04 |
|---|---|---|---|---|---|---|
| D4 | 29.91 | 16.69 | 1.50 | 29.91 | 16.69 | 1.50 |
| | 0.7 deg | 0.55 deg | 0.4 deg | | | |
| OIS Shift | 1.18 | 1.37 | 1.79 | | | |

Second Embodiment

Table 3 below shows numerical values according to Equation (1) to Equation (14) above, and Table 4 below shows the air gap between the infinite group and the closest group and shows the amount of shift required for the lens group G5B when the optical system 100 is corrected by 0.7 degrees, 0.55 degrees, and 0.4 degrees at the wide-angle end, the middle end, and the telephoto end, respectively, in the optical system 100. In addition, Table 15 shows numerical values of Equation (1) to Equation (14).

Figure 7:
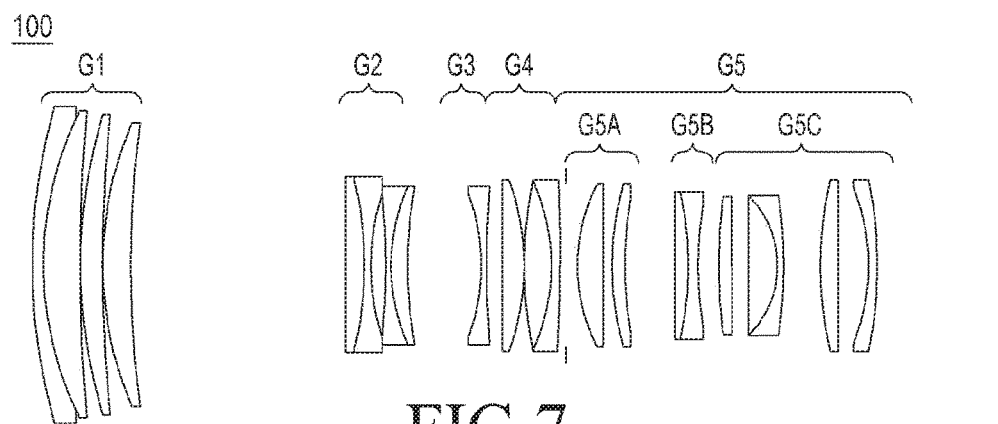
FIG. 7 is a diagram illustrating the lens array of a wide-angle end in the optical system, according to an embodiment of the present disclosure.
Figure 8:
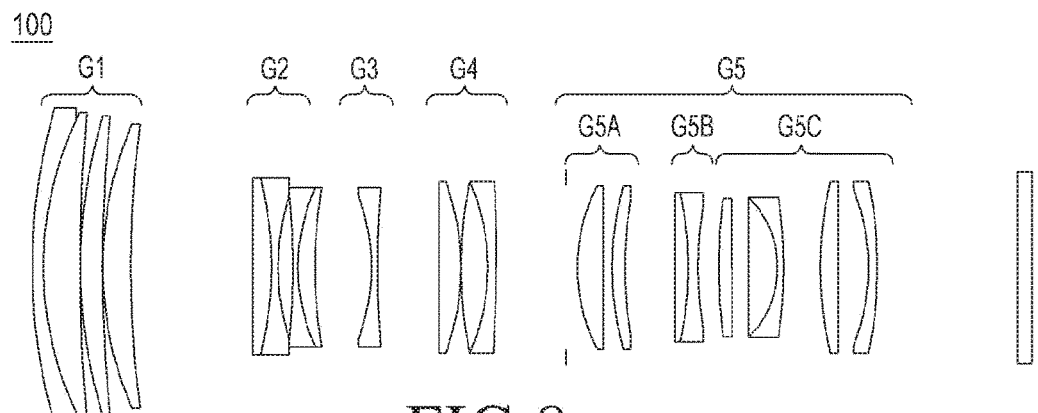
FIG. 8 is a diagram illustrating the lens array of a middle end in the optical system, according to an embodiment of the present disclosure.
Figure 9:
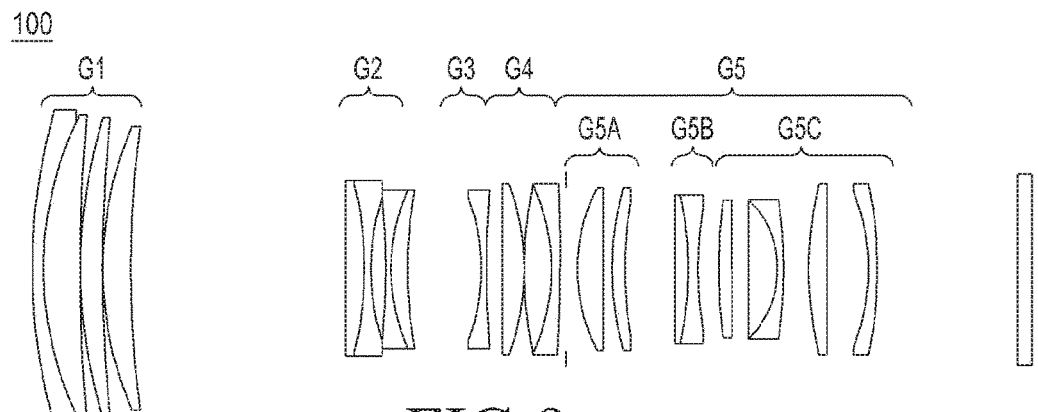
FIG. 9 is a diagram illustrating the lens array of a telephoto end in the optical system, according to an embodiments of the present disclosure.

FIG. 7 is a diagram illustrating the lens array of the wide-angle end in the optical system 100, according to an embodiment of the present disclosure. FIG. 8 is a diagram illustrating the lens array of the middle end in the optical system 100, according to an embodiment of the present disclosure. FIG. 9 is a diagram illustrating the lens array of the telephoto end in the optical system 100, according to an embodiment of the present disclosure.

Figure 10A:
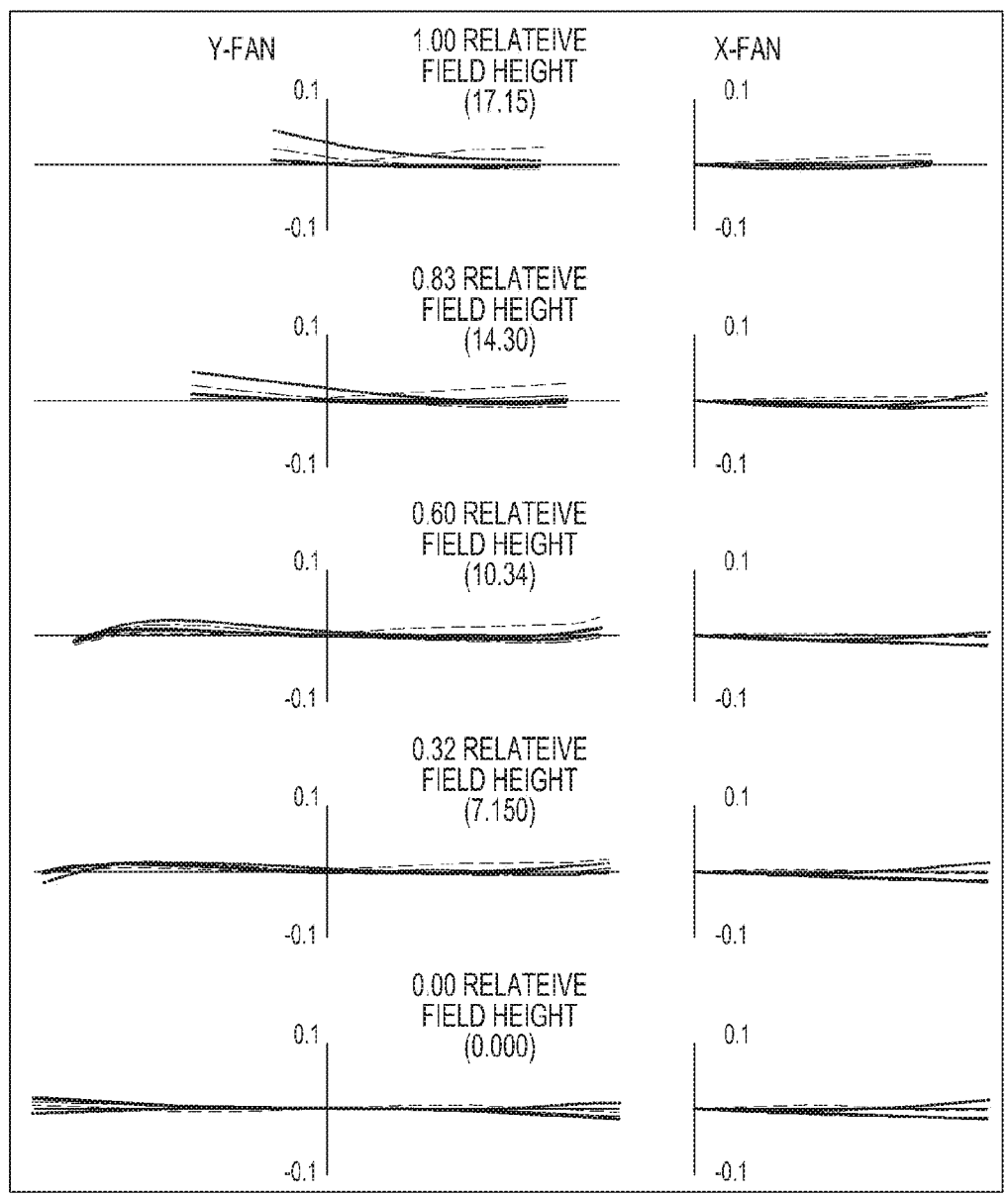
FIGS. 10A-10C are diagrams illustrating the horizontal aberration of the wide-angle end, the middle end, and the telephoto end in the case of an infinite object distance in the optical system, according to an embodiments of the present disclosure.
Figure 10B:
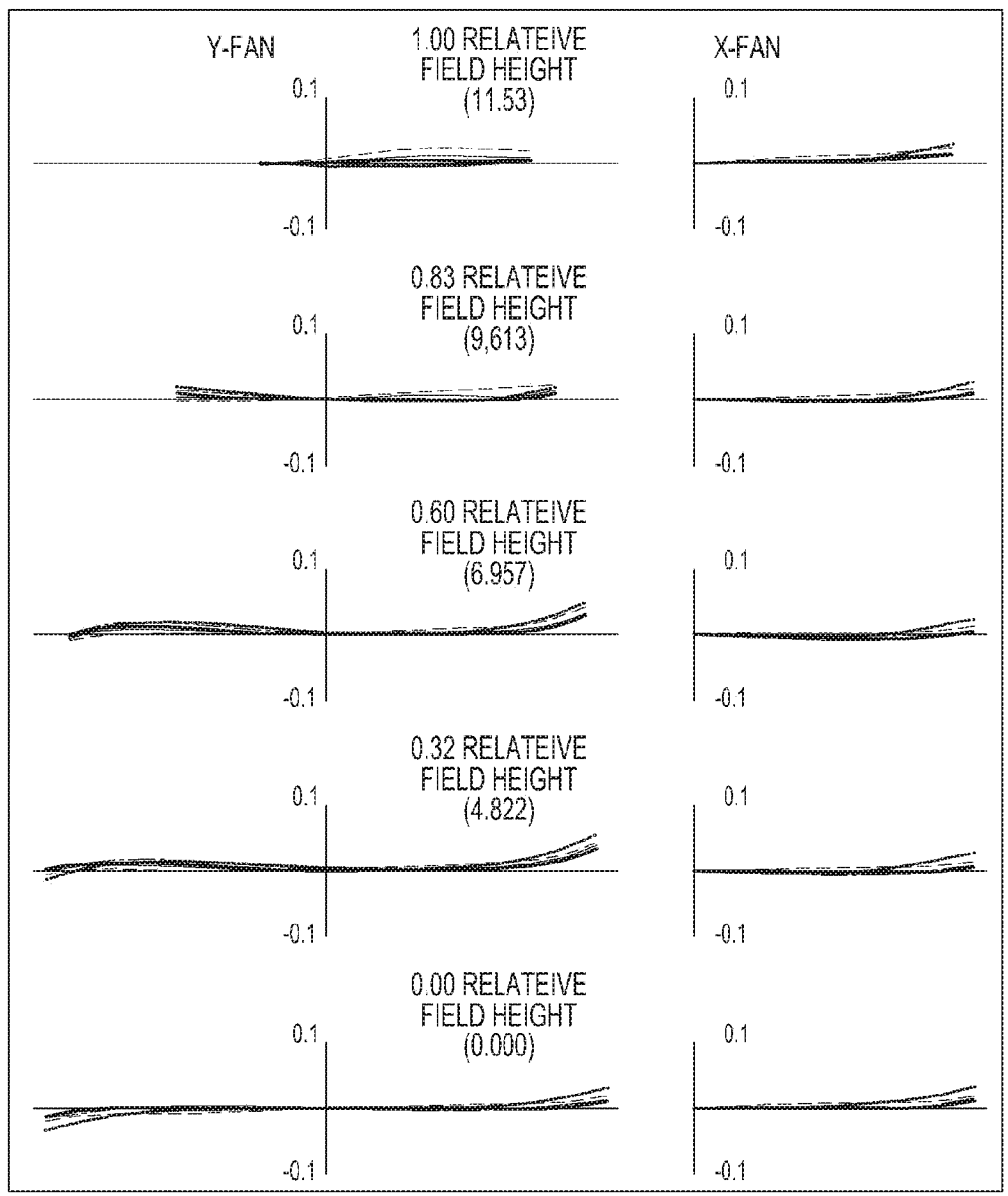
Figure 10C:
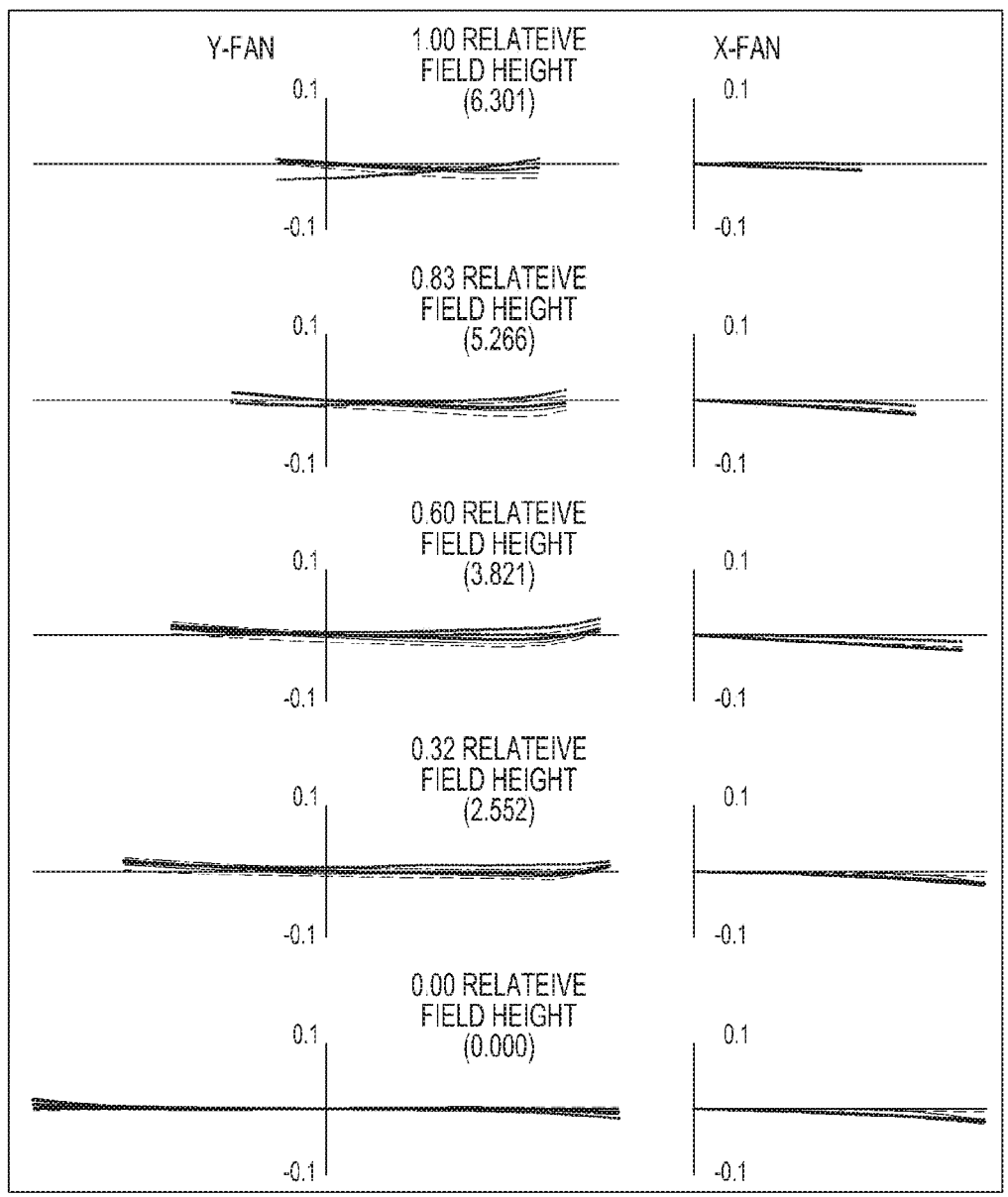
Figure 11A:
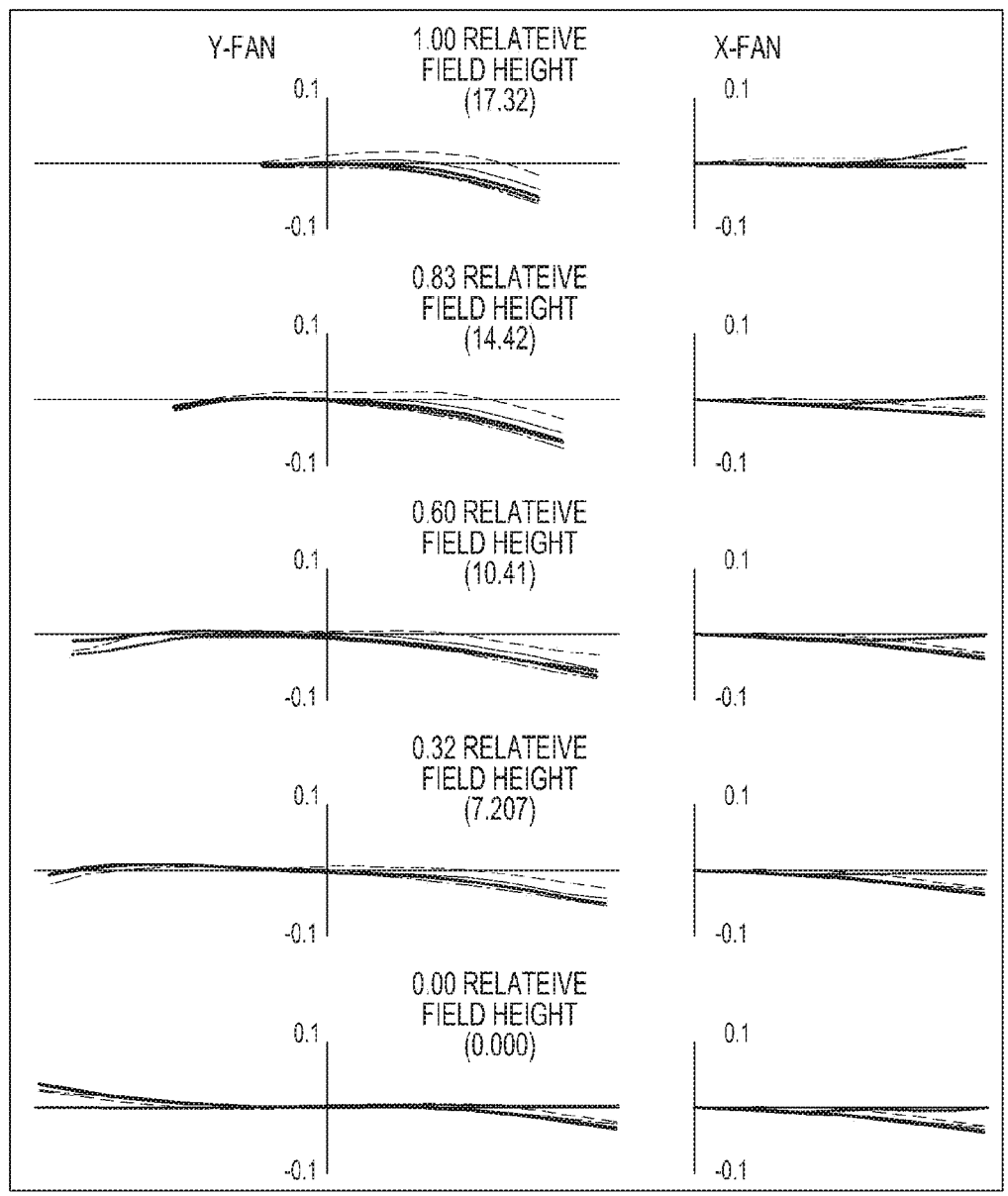
FIGS. 11A-11C are diagrams illustrating the horizontal aberration of the wide-angle end, the middle end, and the telephoto end in the case of the shortest object distance in the optical system, according to an embodiment of the present disclosure.
Figure 11B:
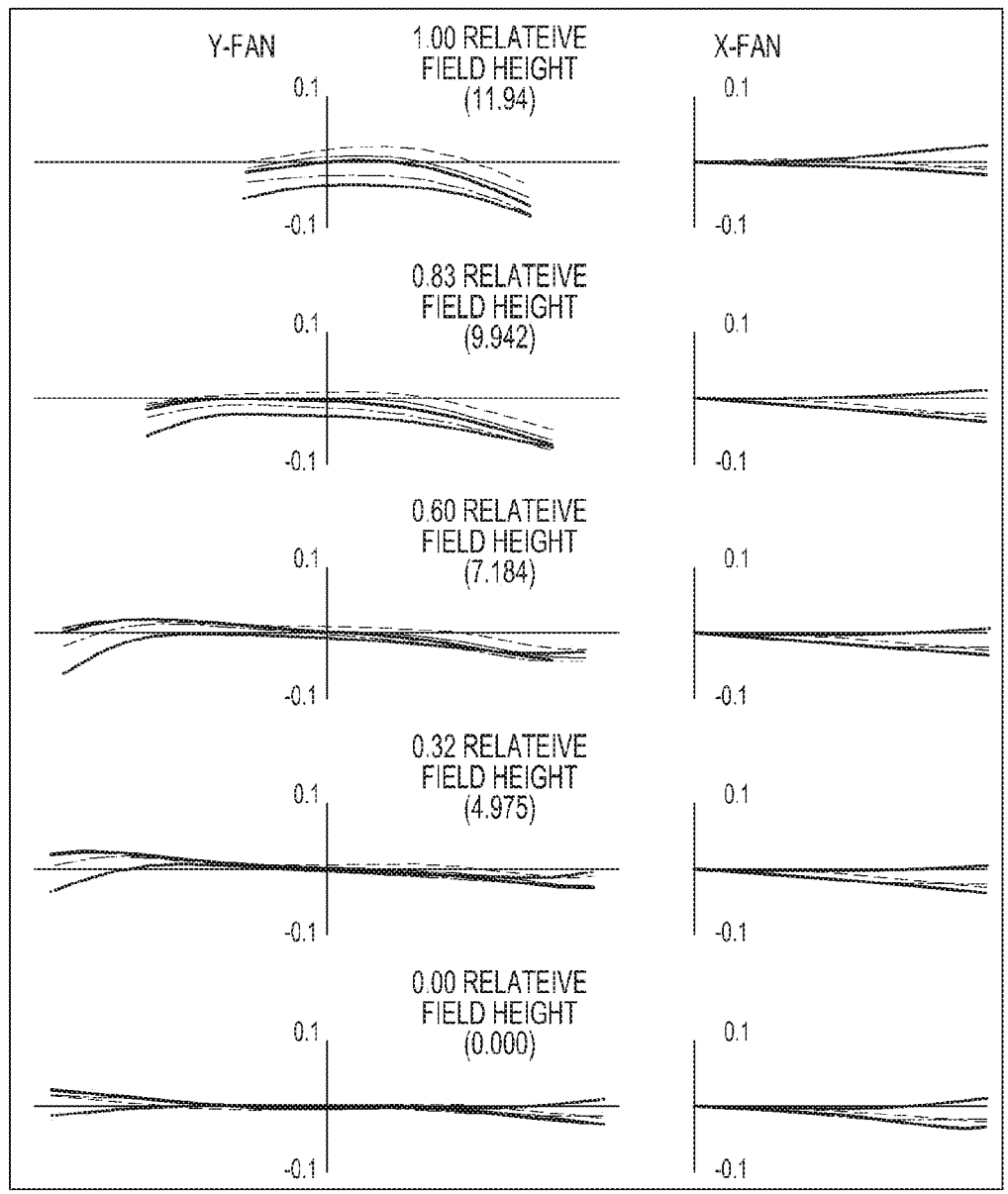
Figure 11C:
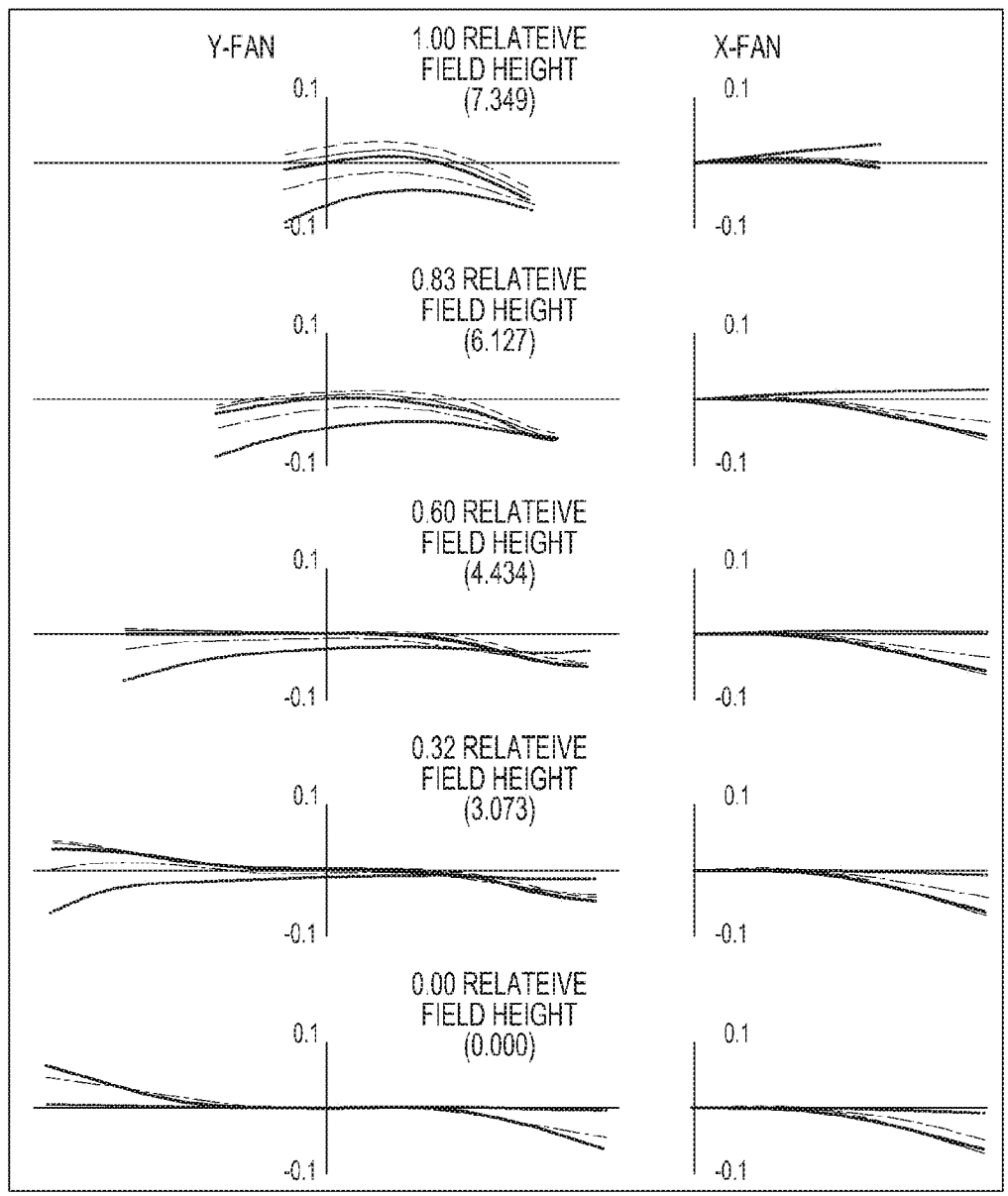
Figure 12A:
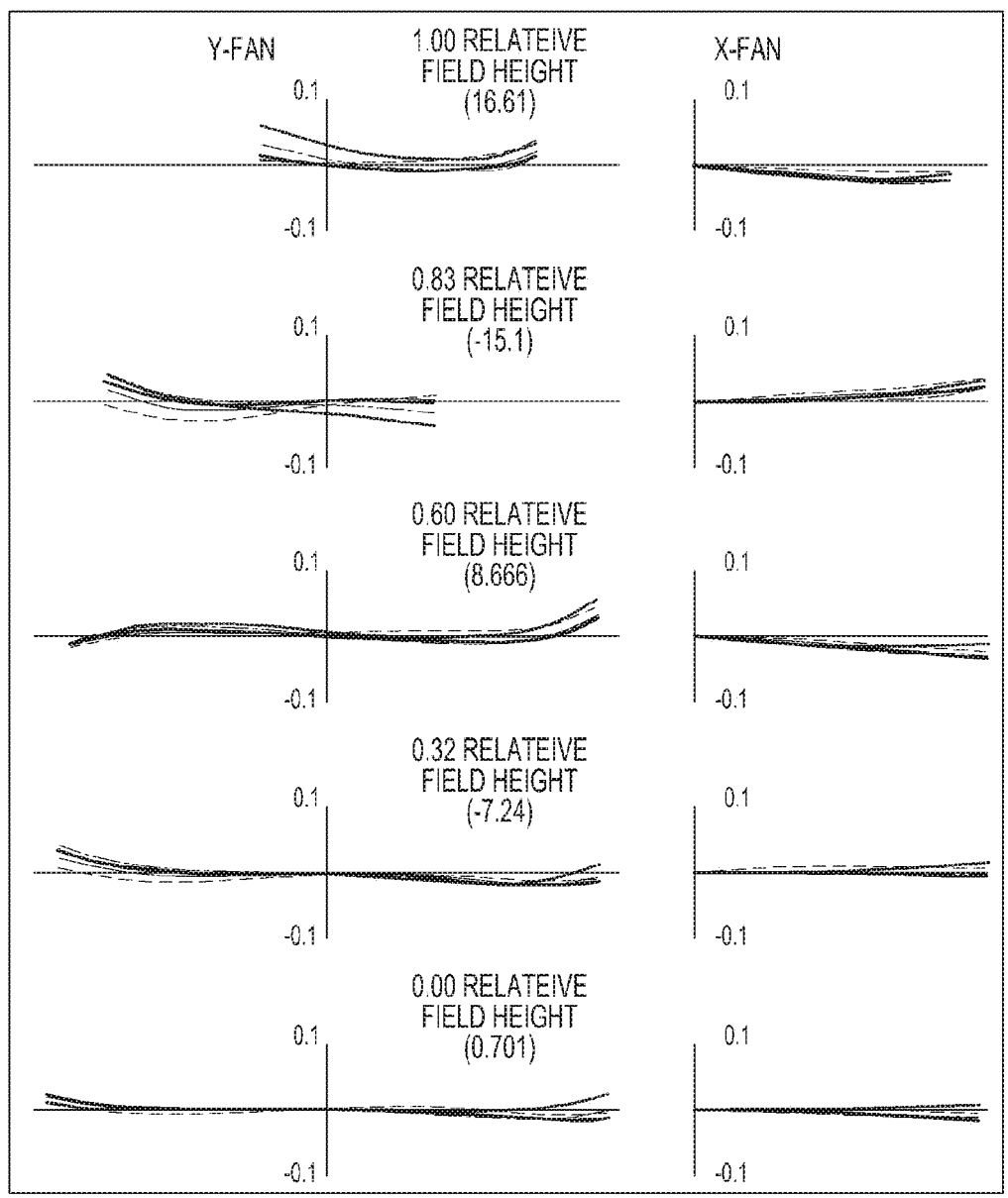
FIGS. 12A-12C illustrates the horizontal aberration in the case of an infinite object distance and in the case of image stabilizations of 0.7 degrees, 0.55 degrees, and 0.4 degrees at a wide-angle end, a middle end, and a telephoto end, respectively, in the optical system, according to an embodiment of the present disclosure.
Figure 12B:
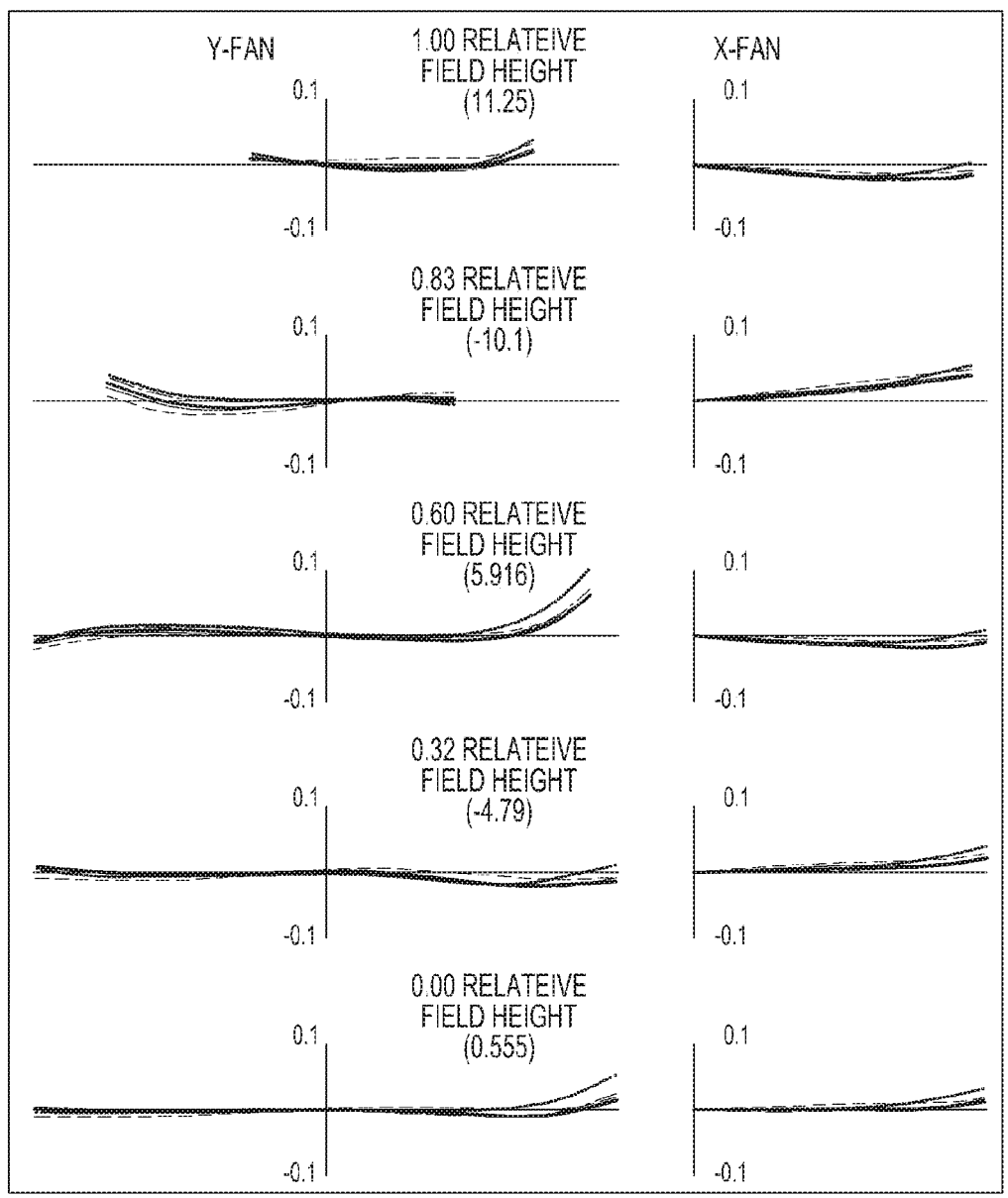
Figure 12C:
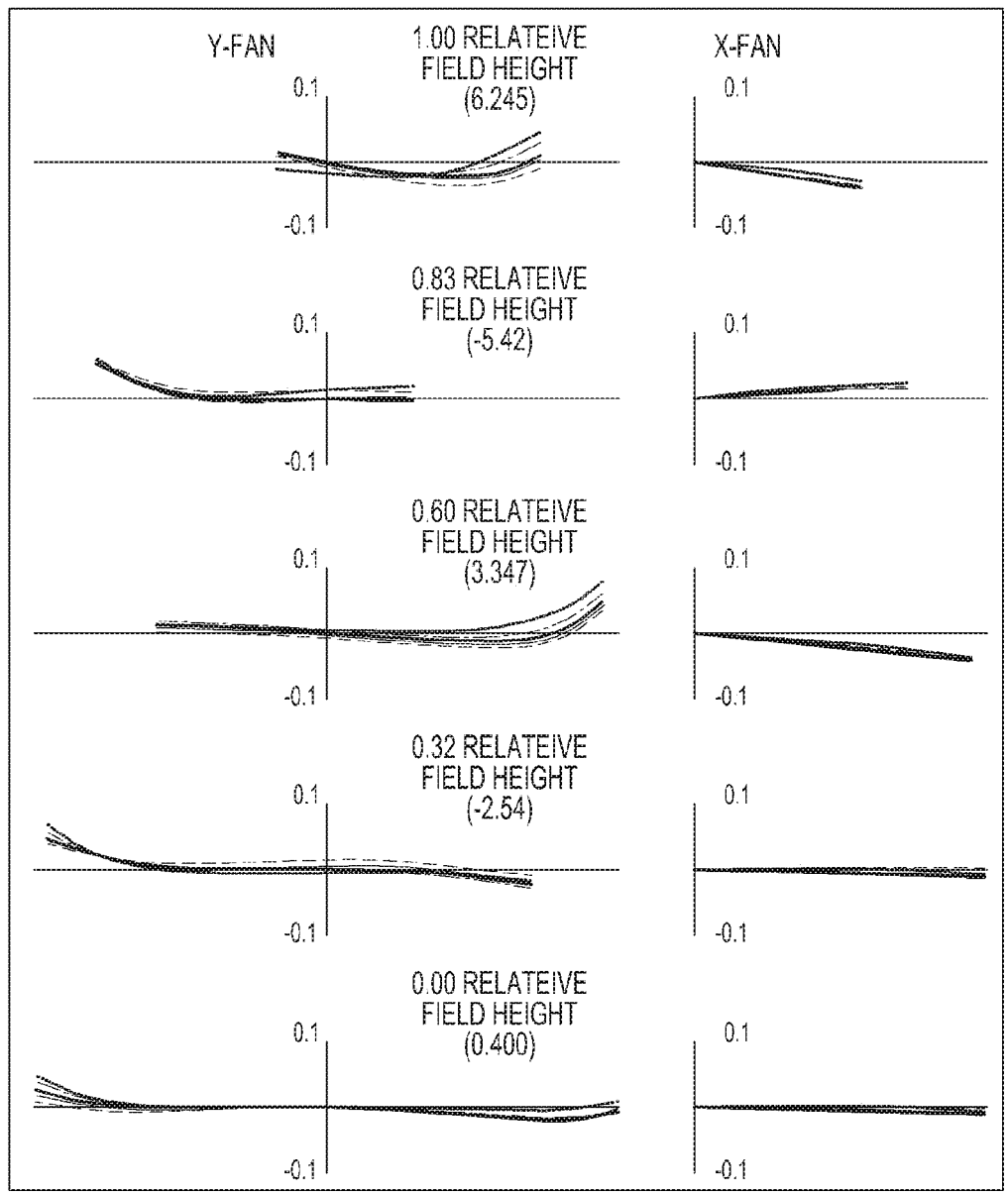

FIGS. 10A-10C are diagrams illustrating the horizontal aberration of the wide-angle end, the middle end, and the telephoto end in the case of an infinite object distance in the optical system 100, according to an embodiment of the present disclosure. FIGS. 11A-11C are diagrams illustrating the horizontal aberration of the wide-angle end, the middle end, and the telephoto end in the case of the shortest object distance in the optical system 100, according to an embodiment of the present disclosure. FIGS. 12A-12C are diagrams illustrating the horizontal aberration in the case of an infinite object distance and in the case of image stabilizations of 0.7 degrees, 0.55 degrees, and 0.4 degrees at the wide-angle end, the middle end, and the telephoto end, respectively, in the optical system 100, according to an embodiment of the present disclosure.

TABLE 3

| EFL: | 72.00 mm | FNO: | 2.89 | 2w: | 34.3 |
|---|---|---|---|---|---|
| EFL: | 194.00 mm | FNO: | 2.89 | 2w: | 12.6 |

| Surf | Radius | Thick | Ind | Abv |
|---|---|---|---|---|
| 1 | 164.421 | 1.7 | 1.73432 | 28.3 |
| 2 | 79.192 | 0.35 | | |
| 3 | 79.345 | 8.69 | 1.49845 | 81.6 |
| 4 | 474.87 | 0.2 | | |
| 5 | 125.649 | 5.2 | 1.49845 | 81.6 |
| 6 | 289.637 | 0.2 | | |
| 7 | 98.506 | 7.95 | 1.49845 | 81.6 |
| 8 | Infinity | D1 | | |
| 9 | −742.033 | 5.1 | 1.91001 | 28.1 |
| 10 | −68.258 | 1.5 | 1.6998 | 55.5 |
| 11 | 65.781 | 2.6 | | |
| 12 | 1768.968 | 1.5 | 1.73234 | 54.7 |
| 13 | 36.71 | 5.04 | 1.85505 | 23.8 |
| 14 | 98.473 | D2 | | |
| 15 | −48.004 | 1.5 | 1.68371 | 57.3 |
| 16 | 255.335 | D3 | | |
| 17 | −912.877 | 3.8 | 1.81405 | 42.3 |
| 18 | −82.239 | 0.2 | | |
| 19 | 82.877 | 7.8 | 1.59561 | 67 |
| 20 | −48.675 | 1.5 | 1.85505 | 23.8 |
| 21 | −406.81 | D4 | | |
| STO | Infinity | 2.4 | | |

TABLE 3-continued

| | | | | |
|---|---|---|---|---|
| 23 | 44.672 | 7.2 | 1.49845 | 81.6 |
| 24 | −369.578 | 1.04 | | |
| 25 | 71.449 | 3.3 | 1.73234 | 54.7 |
| 26 | 154.317 | 11.37 | | |
| 27 | −630.83 | 4.03 | 1.85505 | 23.8 |
| 28 | −53.272 | 1.5 | 1.74794 | 44.9 |
| 29 | 44.134 | 5.04 | | |
| 30 | 138.792 | 3.2 | 1.86161 | 24.2 |
| 31 | −683.756 | 4.5 | | |
| 32 | −231.213 | 6.29 | 1.49845 | 81.6 |
| 33 | −24.602 | 1.5 | 1.85505 | 23.8 |
| 34 | −115.344 | 8.79 | | |
| 35 | 78.623 | 4.04 | 1.85505 | 23.8 |
| 36 | −357.058 | 7.54 | | |
| 37 | −46.195 | 1.5 | 1.43811 | 95.1 |
| 38 | −139.397 | 39.74 | | |
| IMG | | | | |

TABLE 4

| f | 71.97 | 106.83 | 194.13 | | | |
|---|---|---|---|---|---|---|
| D0 | infinity | infinity | infinity | 956.00 | 956.00 | 956.00 |
| D1 | 2.66 | 26.00 | 49.34 | 2.66 | 26.00 | 49.34 |
| D2 | 16.91 | 13.11 | 16.52 | 14.57 | 8.64 | 5.25 |
| D3 | 20.16 | 15.82 | 4.00 | 22.50 | 20.29 | 15.27 |
| D4 | 31.83 | 16.62 | 1.70 | 31.83 | 16.62 | 1.70 |
| | 0.7 deg | 0.55 deg | 0.4 deg | | | |
| OIS Shift | 0.75 | 0.89 | 1.16 | | | |

Third Embodiment

Table 5 below shows numerical values according to Equation (1) to Equation (14), and Table 6 below shows the air gap between the infinite group and the closest group and shows the amount of shift required for the lens group G5B when the optical system 100 is corrected by 0.7 degrees, 0.55 degrees, and 0.4 degrees at the wide-angle end, the middle end, and the telephoto end, respectively, in the optical system 100. In addition, Table 15 shows numerical values of Equation (1) to Equation (14).

Figure 13:
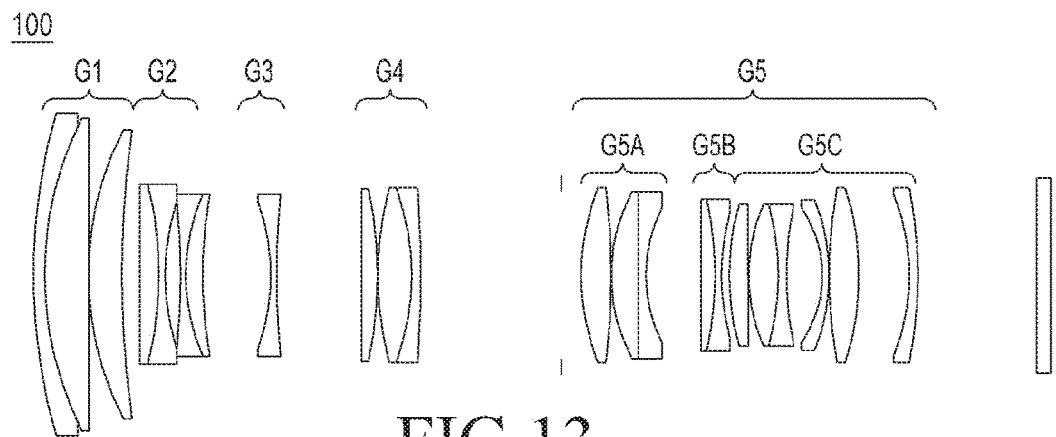
FIG. 13 is a diagram illustrating the lens array of a wide-angle end in the optical system, according to an embodiment of the present disclosure.
Figure 14:
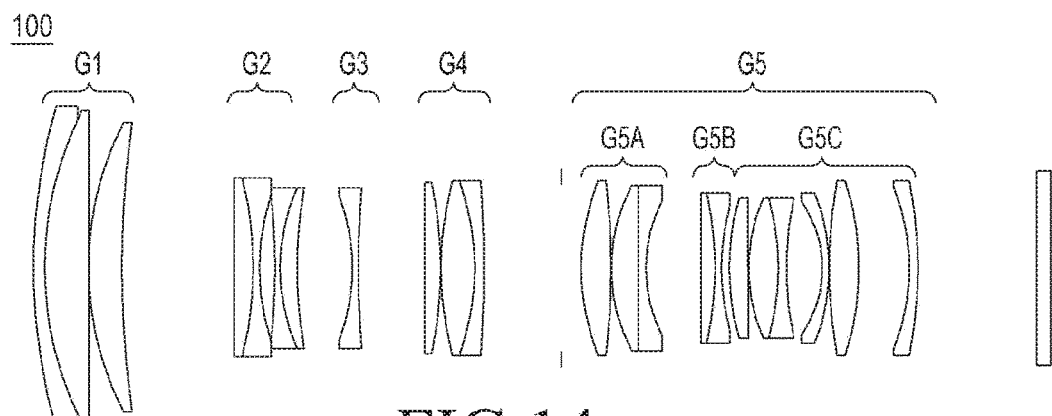
FIG. 14 is a diagram illustrating the lens array of a middle end in the optical system, according to an embodiment of the present disclosure.
Figure 15:
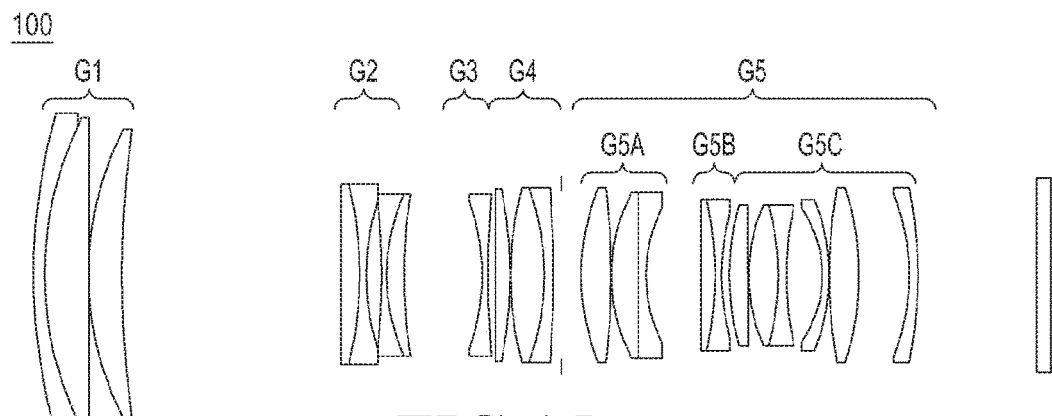
FIG. 15 is a diagram illustrating the lens array of a telephoto end in the optical system, according to an embodiment of the present disclosure.

FIG. 13 is a diagram illustrating the lens array of the wide-angle end in the optical system 100, according to an embodiment of the present disclosure. FIG. 14 is a diagram illustrating the lens array of the middle end in the optical system 100, according to an embodiment of the present disclosure. FIG. 15 is a diagram illustrating the lens array of the telephoto end in the optical system 100, according to an embodiment of the present disclosure.

Figure 16A:
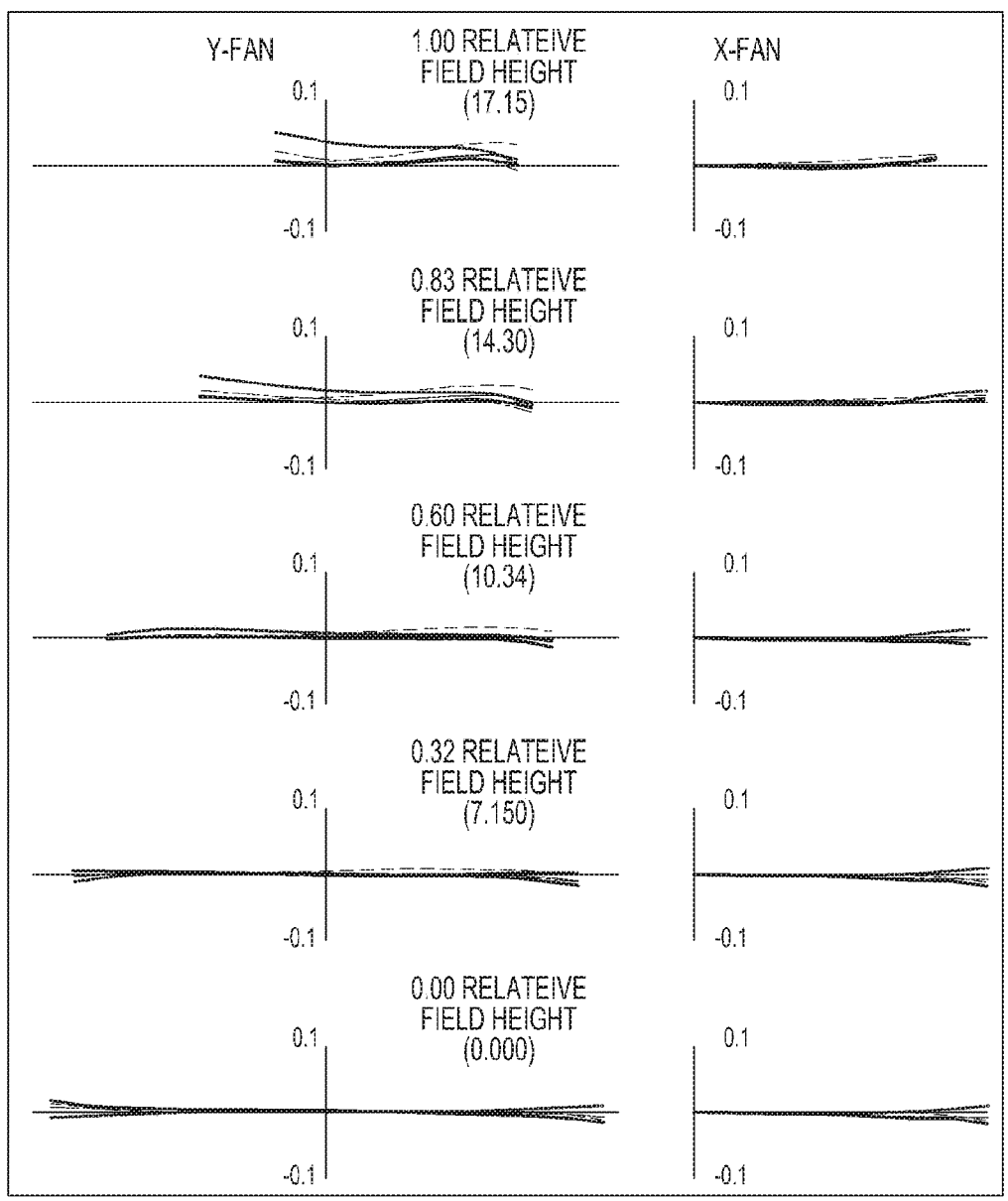
FIGS. 16A-16C are diagrams illustrating the horizontal aberration of the wide-angle end, the middle end, and the telephoto end in the case of an infinite object distance in the optical system, according to an embodiment of the present disclosure.
Figure 16B:
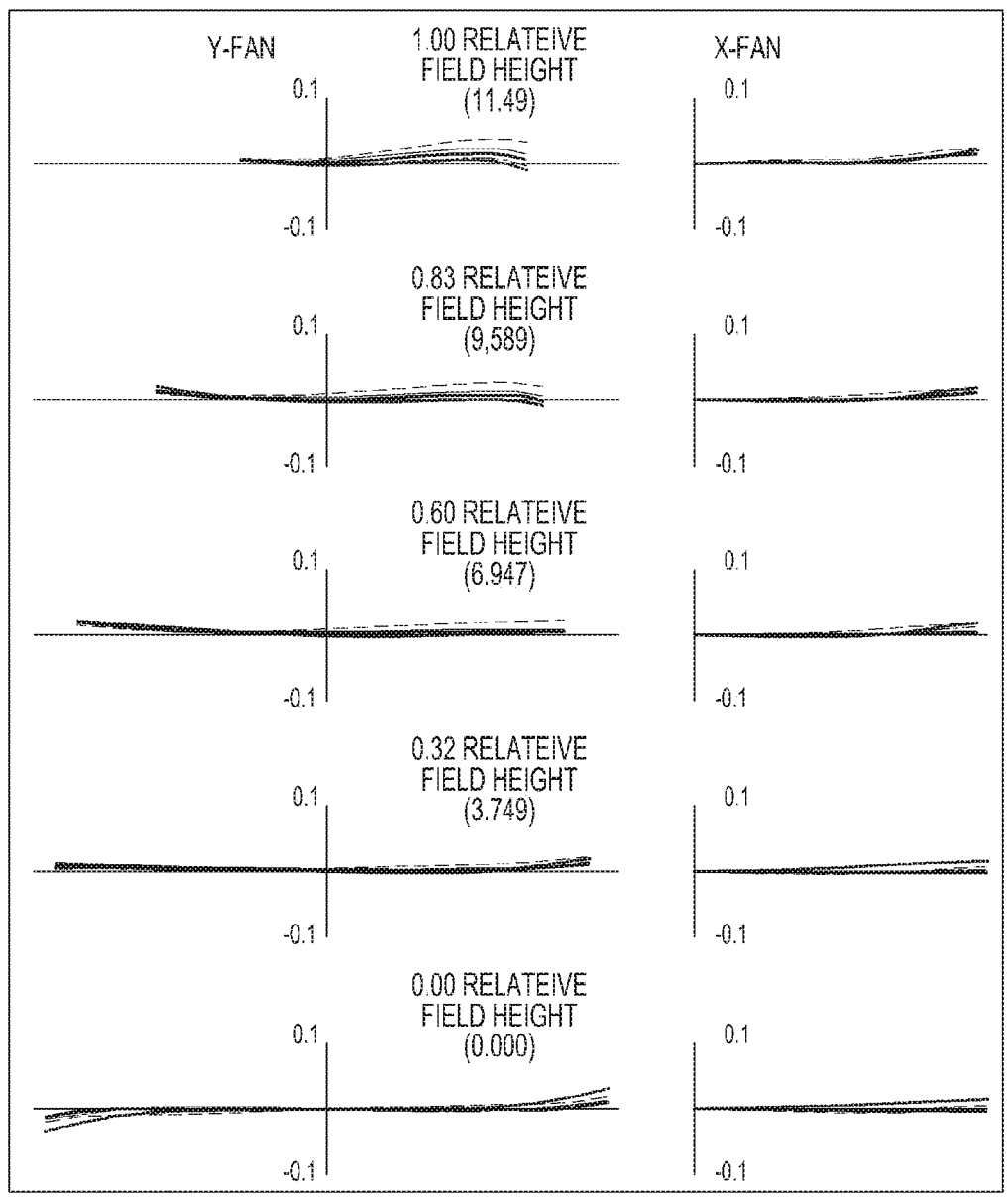
Figure 16C:
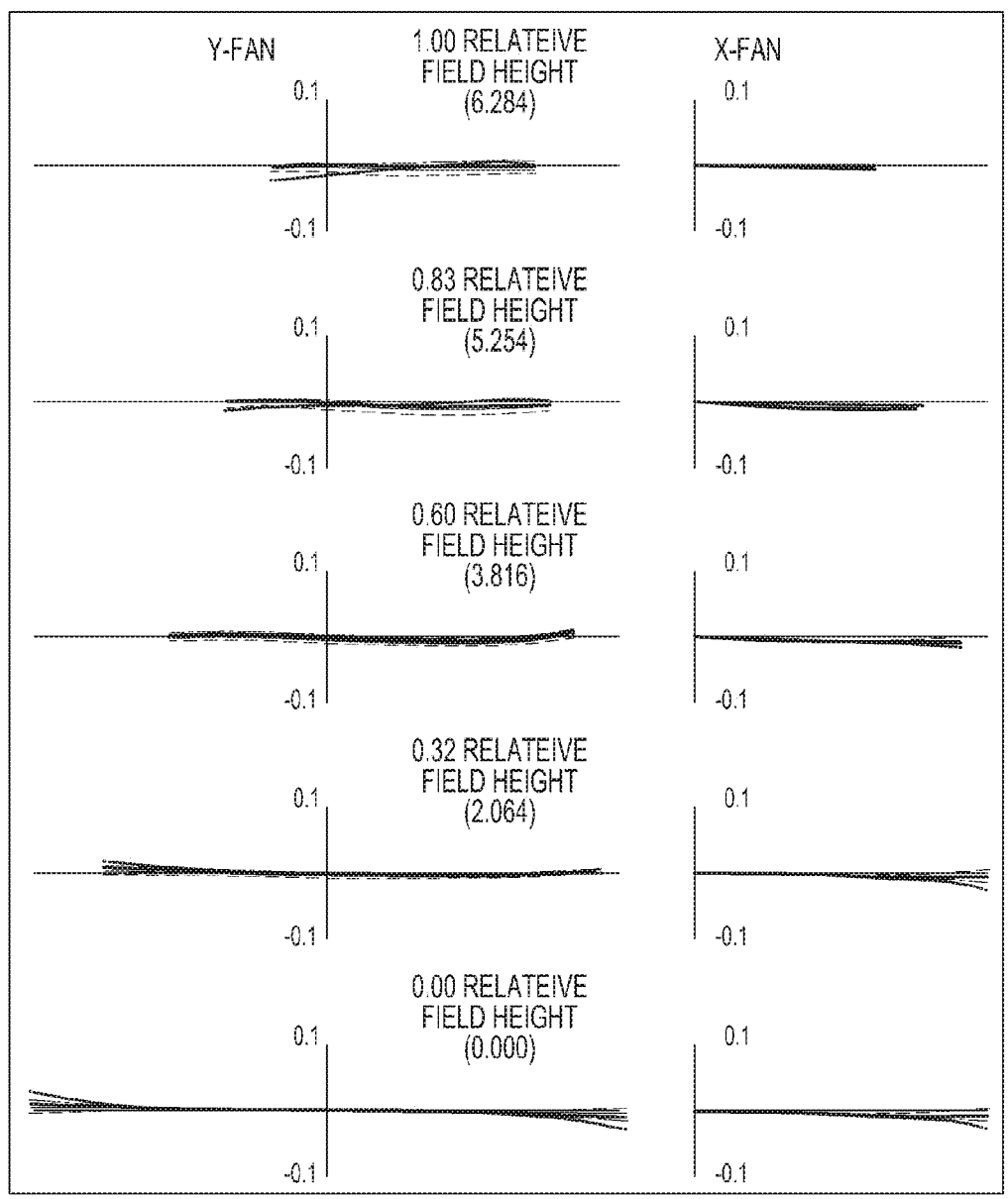
Figure 17A:
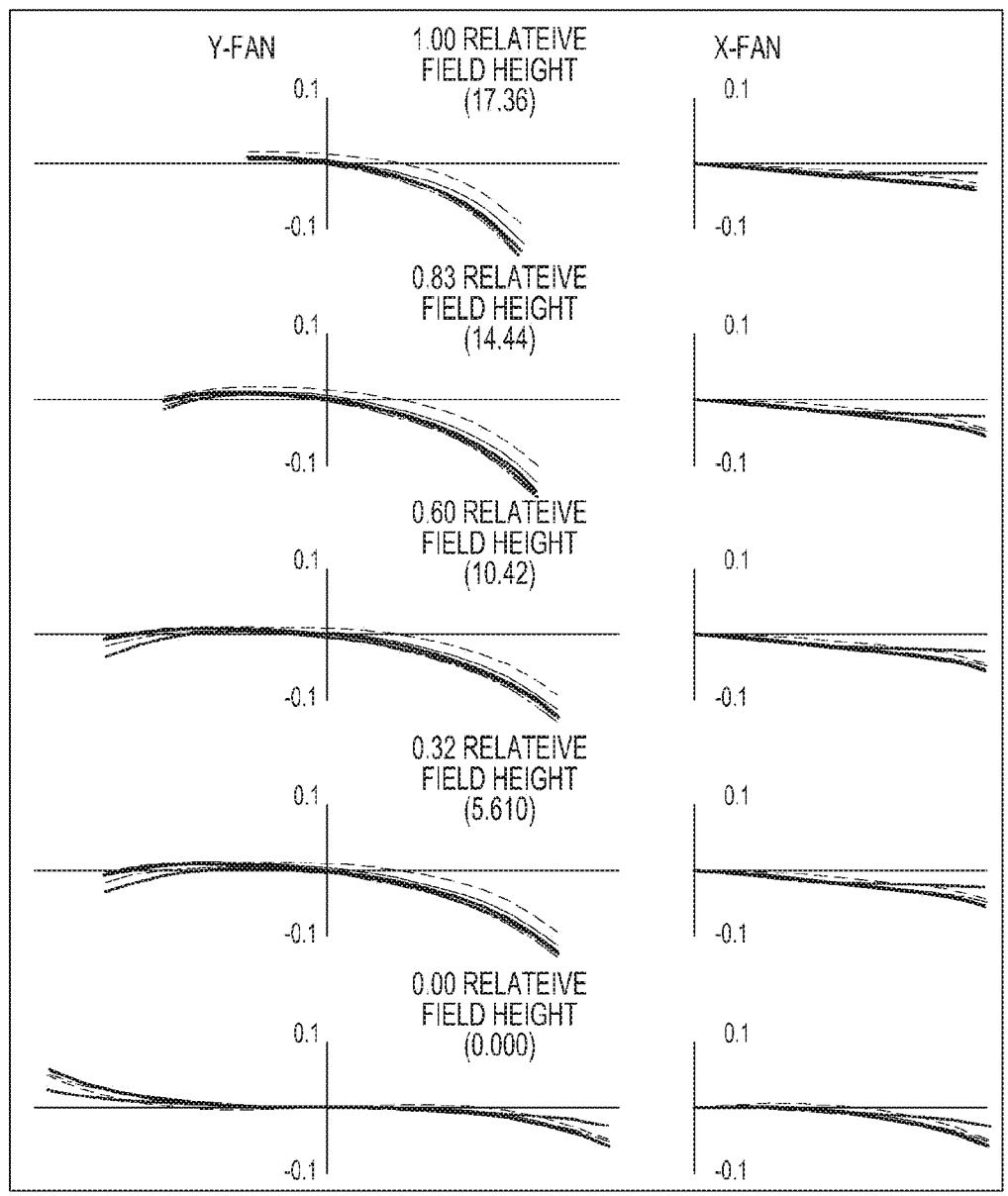
FIGS. 17A-17C are diagrams illustrating the horizontal aberration of the wide-angle end, the middle end, and the telephoto end in the case of the shortest object distance in the optical system, according to an embodiment of the present disclosure.
Figure 17B:
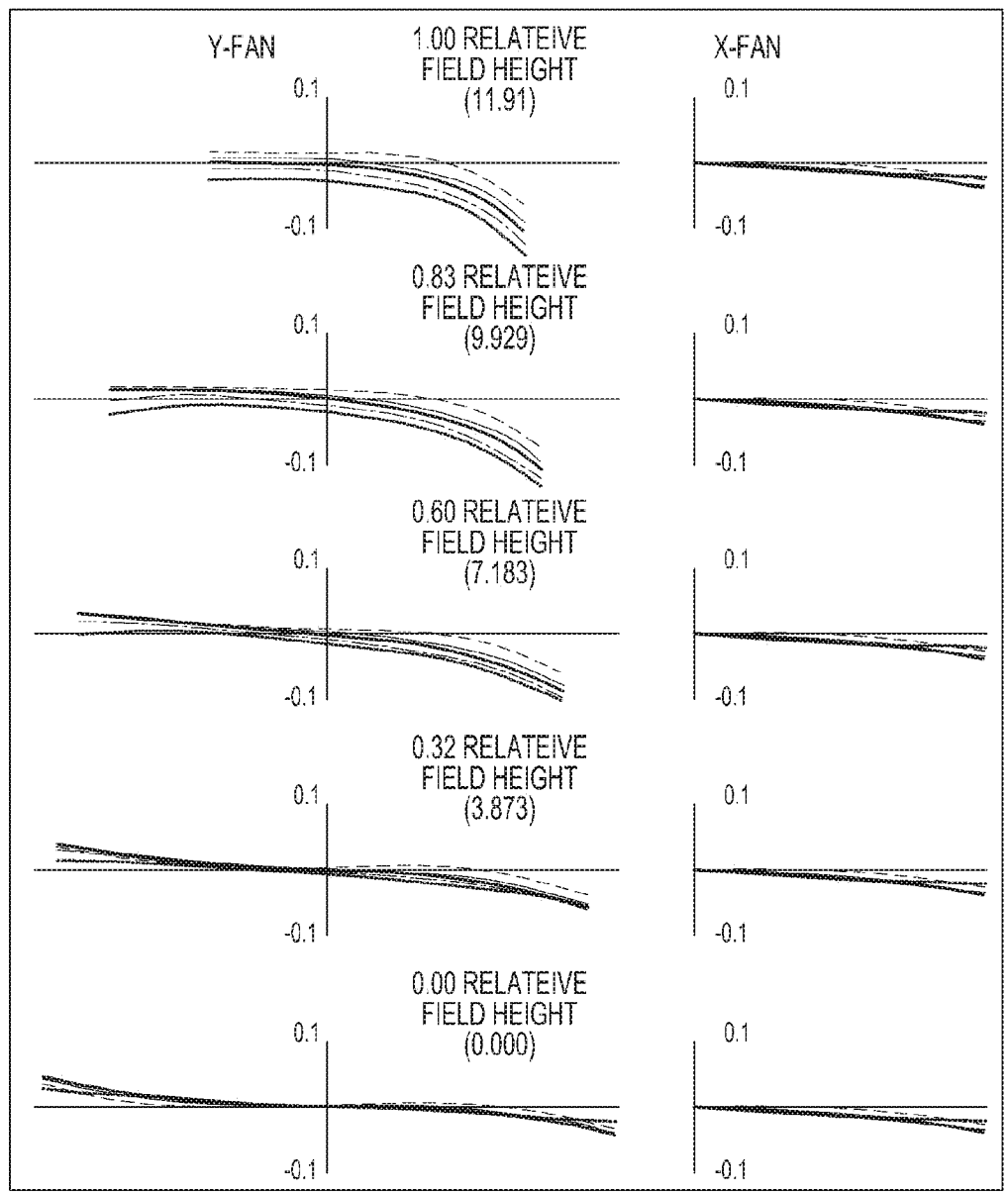
Figure 17C:
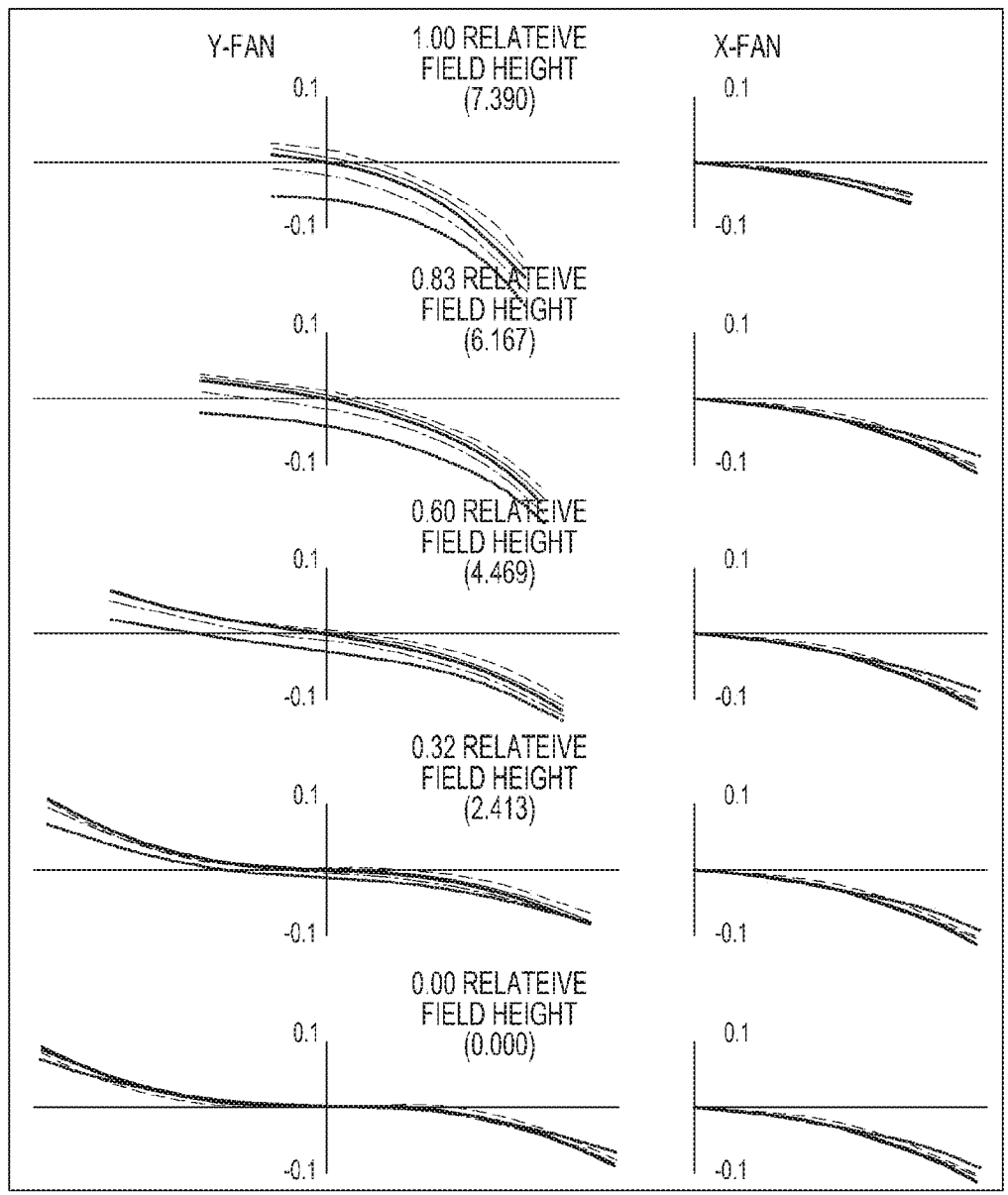
Figure 18A:
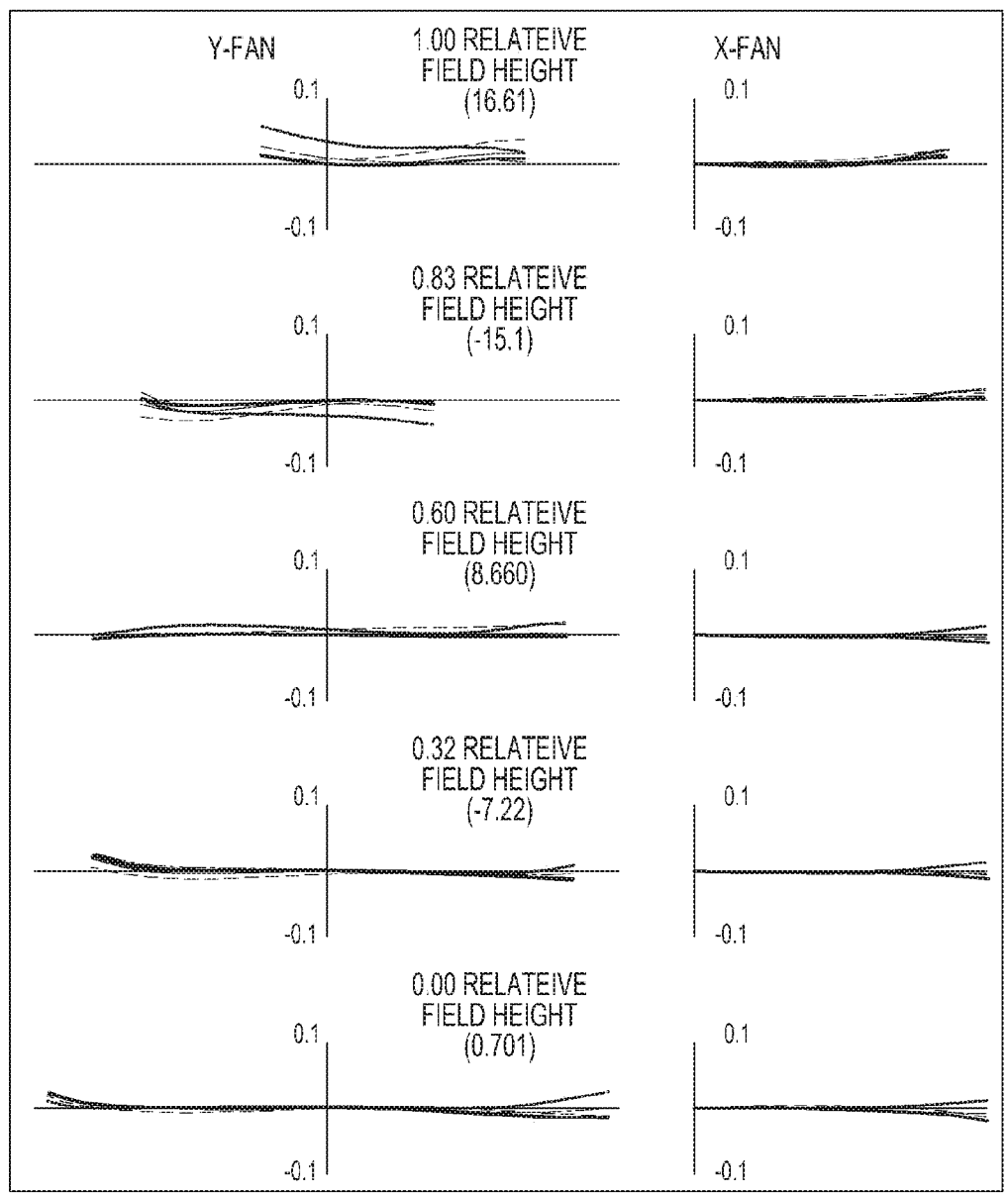
FIGS. 18A-18C are diagrams illustrating the horizontal aberration in the case of an infinite object distance and in the case of image stabilizations of 0.7 degrees, 0.55 degrees, and 0.4 degrees at a wide-angle end, a middle end, and a telephoto end, respectively, in the optical system, according to an embodiment of the present disclosure.
Figure 18B:
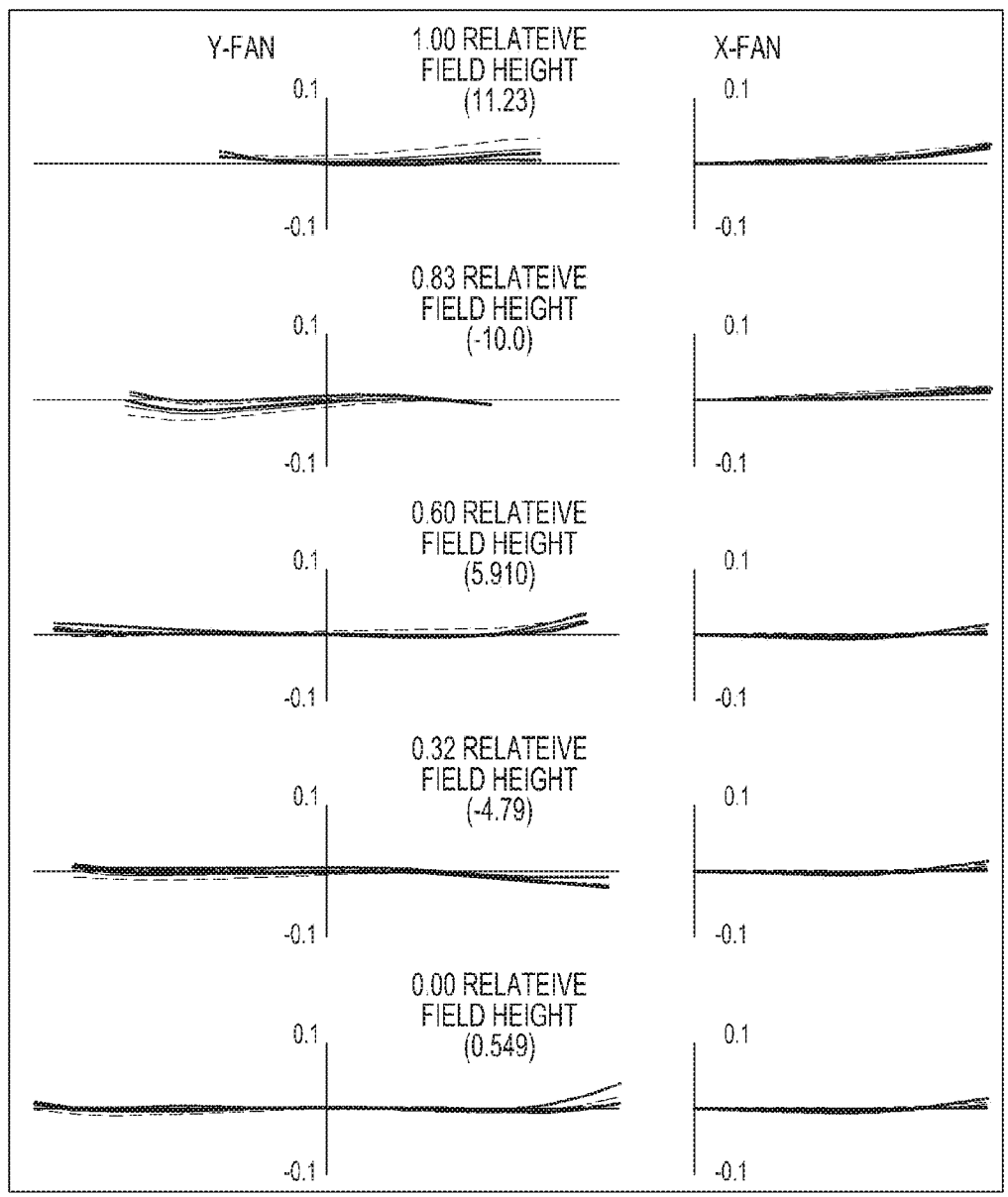
Figure 18C:
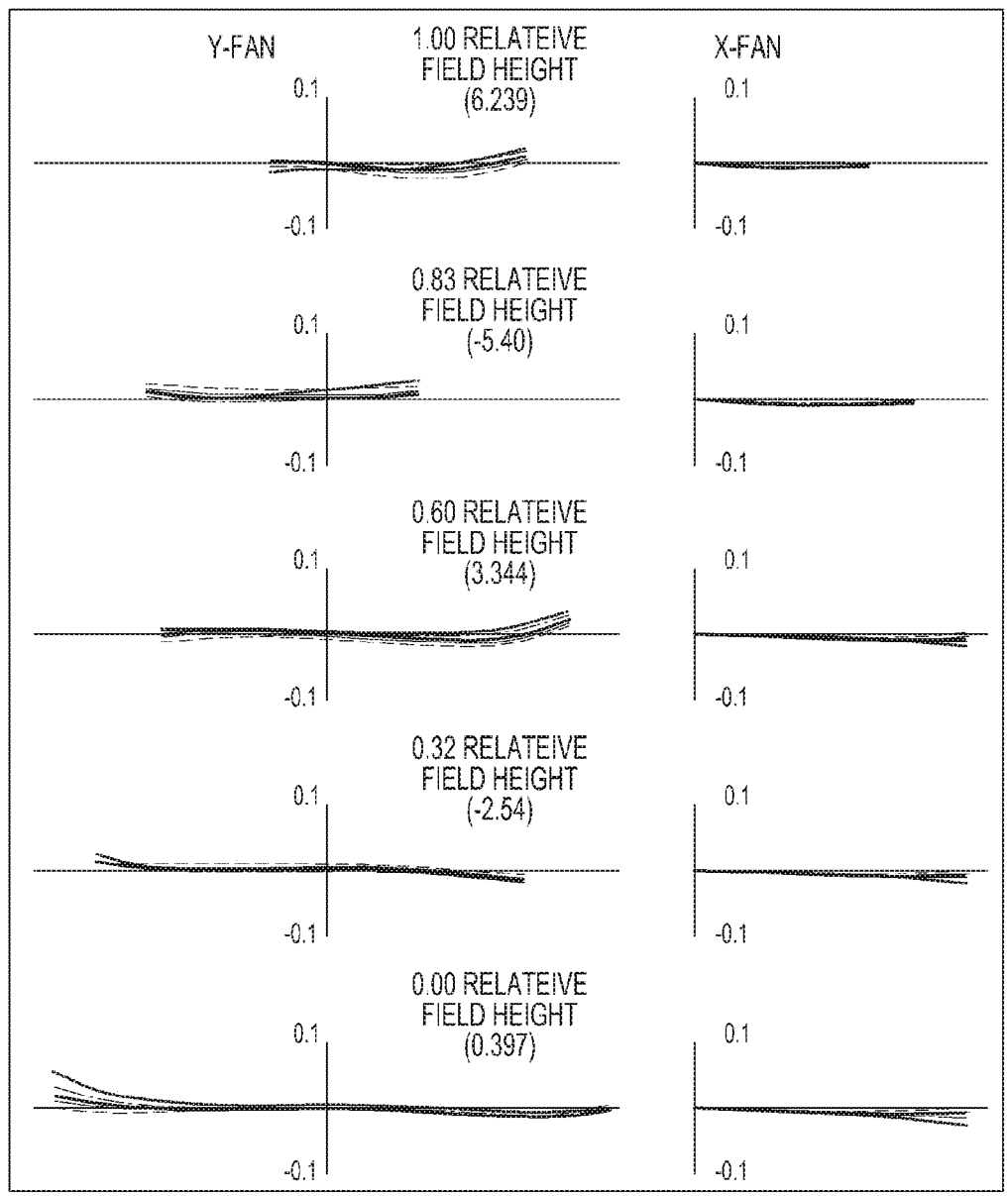

In addition, FIGS. 16A-16C are diagrams illustrating the horizontal aberration of the wide-angle end, the middle end, and the telephoto end in the case of an infinite object distance in the optical system 100, according to an embodiment of the present disclosure. FIGS. 17A-17C are diagrams illustrating the horizontal aberration of the wide-angle end, the middle end, and the telephoto end in the case of the shortest object distance in the optical system 100, according to an embodiment of the present disclosure. FIGS. 18A-18C are diagrams illustrating the horizontal aberration in the case of an infinite object distance and in the case of image stabilizations of 0.7 degrees, 0.55 degrees, and 0.4 degrees at the wide-angle end, the middle end, and the telephoto end, respectively, in the optical system 100, according to an embodiment of the present disclosure.

TABLE 5

| EFL: | 72.14 mm | FNO: | 2.88 | 2w: | 34.24 |
|---|---|---|---|---|---|
| EFL: | 194.00 mm | FNO: | 2.89 | 2w: | 12.6 |
| Surf | Radius | Thick | Ind | Abv | |
| 1 | 139.158 | 2.3 | 1.80518 | 25.5 | |
| 2 | 88.435 | 0.38 | | | |
| 3 | 92.885 | 9.6 | 1.437 | 95.1 | |
| 4 | −686.099 | 0.2 | | | |
| 5 | 80.127 | 8.61 | 1.497 | 81.6 | |
| 6 | 1030.481 | D1 | | | |
| 7 | Infinity | 4.13 | 1.90366 | 31.3 | |
| 8 | −75.173 | 1.35 | 1.6516 | 58.4 | |
| 9 | 74.054 | 3.18 | | | |
| 10 | −223.831 | 1.3 | 1.8042 | 46.5 | |
| 11 | 39.375 | 4.15 | 1.84666 | 23.8 | |
| 12 | 115.401 | D2 | | | |
| 13 | −51.068 | 1.2 | 1.59349 | 67 | |
| 14 | 205.611 | D3 | | | |
| 15 | 931.791 | 3.59 | 1.816 | 46.6 | |
| 16 | −100.093 | 0.15 | | | |
| 17 | 96.155 | 7.31 | 1.59282 | 68.6 | |
| 18 | −51.177 | 1.35 | 1.90366 | 31.3 | |
| 19 | −263.054 | D4 | | | |
| STO | Infinity | 2.7 | | | |
| 21 | 50.972 | 6.48 | 1.497 | 81.6 | |
| 22 | −1.63E+02 | 0.15 | | | |
| 23 | 32.332 | 7.59 | 1.62299 | 58.1 | |
| 24 | −322.181 | 1.84 | 1.762 | 40.1 | |
| 25 | 28.909 | 13.71 | | | |
| 26 | −302.26 | 3.47 | 1.84666 | 23.8 | |
| 27 | −44.652 | 1.2 | 1.70154 | 41.1 | |
| 28 | 51.957 | 1.97 | | | |
| 29 | 55.606 | 4.21 | 1.8061 | 40.7 | |
| 30 | −277.87 | 0.15 | | | |
| 31 | 38.366 | 7.25 | 1.497 | 81.6 | |
| 32 | −54.864 | 1.47 | 1.91082 | 35.2 | |
| 33 | 54.864 | 8.04 | | | |
| 34 | −26.651 | 1.83 | 1.59282 | 68.6 | |
| 35 | −43.359 | 0.15 | | | |
| 36 | 91.447 | 7.12 | 1.62004 | 36.3 | |
| 37 | −43.61 | 12.39 | | | |
| 38 | −34.199 | 1.6 | 1.788 | 47.4 | |
| 39 | −64.2671 | 31.68 | | | |
| IMG | | | | | |

TABLE 6

| f | 72.10 | 106.89 | 194.00 | | | |
|---|---|---|---|---|---|---|
| D0 | infinity | infinity | infinity | 462.00 | 762.00 | 762.00 |
| D1 | 2.01 | 25.11 | 48.49 | 2.01 | 25.11 | 48.49 |
| D2 | 17.20 | 13.70 | 20.04 | 12.21 | 7.74 | 5.99 |
| D3 | 19.95 | 15.49 | 2.90 | 24.93 | 21.45 | 16.95 |
| D4 | 33.76 | 18.66 | 1.50 | 33.76 | 18.66 | 1.50 |
| | 0.7 deg | 0.55 deg | 0.4 deg | | | |
| OIS Shift | 0.94 | 1.09 | 1.43 | | | |

Fourth Embodiment

Table 7 below shows numerical values according to Equation (1) to Equation (14), and Table 8 below shows the air gap between the infinite group and the closest group and shows the amount of shift required for the lens group G5B when the optical system 100 is corrected by 0.7 degrees, 0.55 degrees, and 0.4 degrees at the wide-angle end, the middle end, and the telephoto end, respectively, in the optical system 100.

Figure 19:
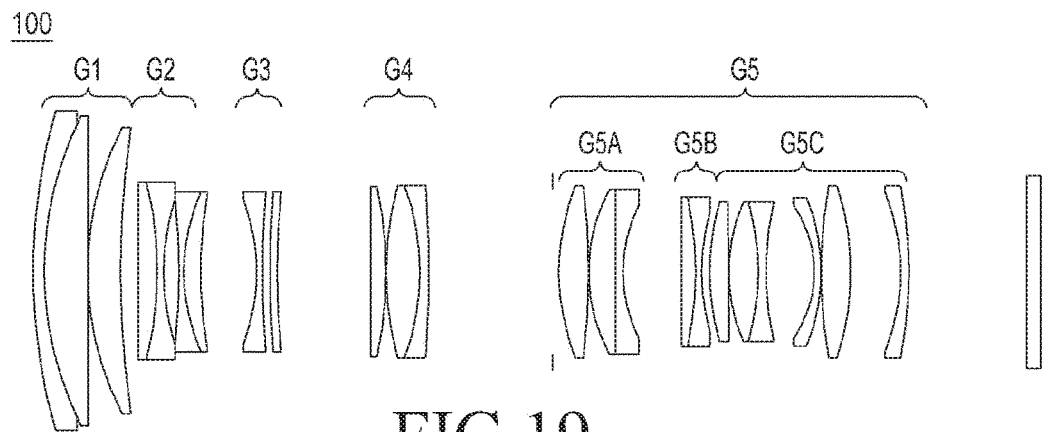
FIG. 19 is a diagram illustrating the lens array of a wide-angle end in the optical system, according to an embodiment of the present disclosure.
Figure 20:
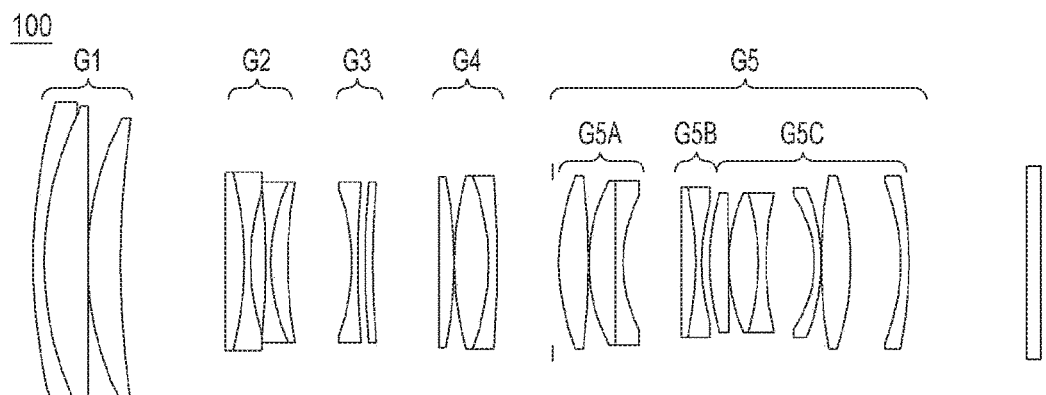
FIG. 20 is a diagram illustrates illustrating the lens array of a middle end in the optical system, according to an embodiment of the present disclosure.
Figure 21:
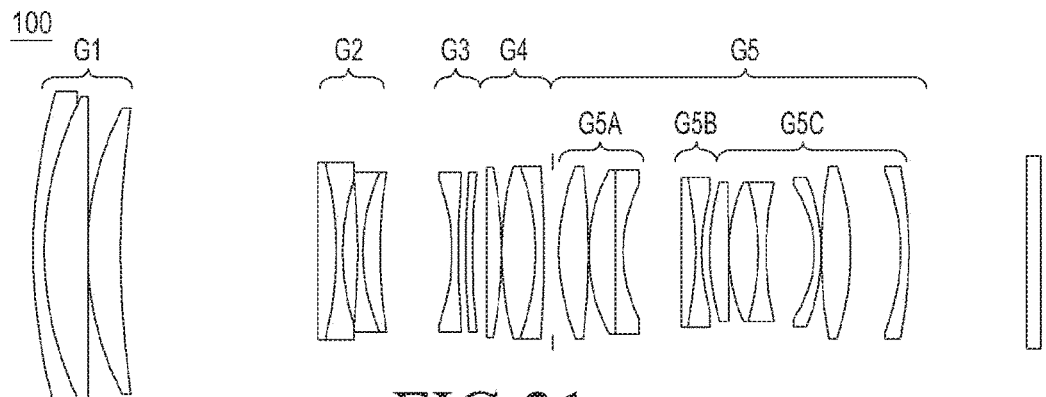
FIG. 21 is a diagram illustrating the lens array of a telephoto end in the optical system, according to an embodiment of the present disclosure.

FIG. 19 is a diagram illustrating the lens array of the wide-angle end in the optical system 100, according to an embodiment of the present disclosure. FIG. 20 is a diagram illustrating the lens array of the middle end in the optical system 100, according to an embodiment of the present disclosure. FIG. 21 is a diagram illustrating the lens array of the telephoto end in the optical system 100, according to an embodiment of the present disclosure.

Figure 22A:
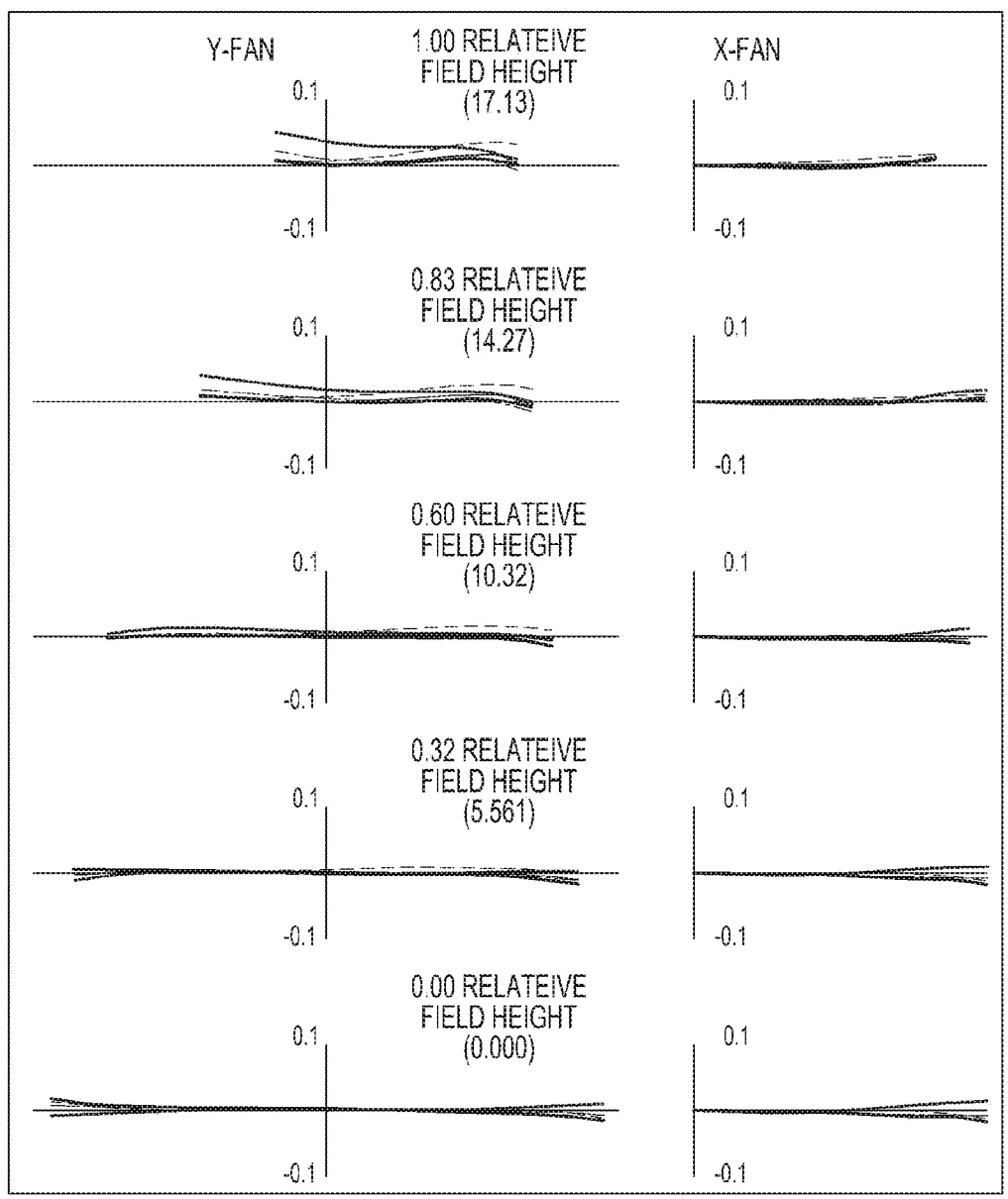
FIGS. 22A-22C are diagrams illustrating the horizontal aberration of the wide-angle end, the middle end, and the telephoto end in the case of an infinite object distance in the optical system, according to an embodiment of the present disclosure.
Figure 22B:
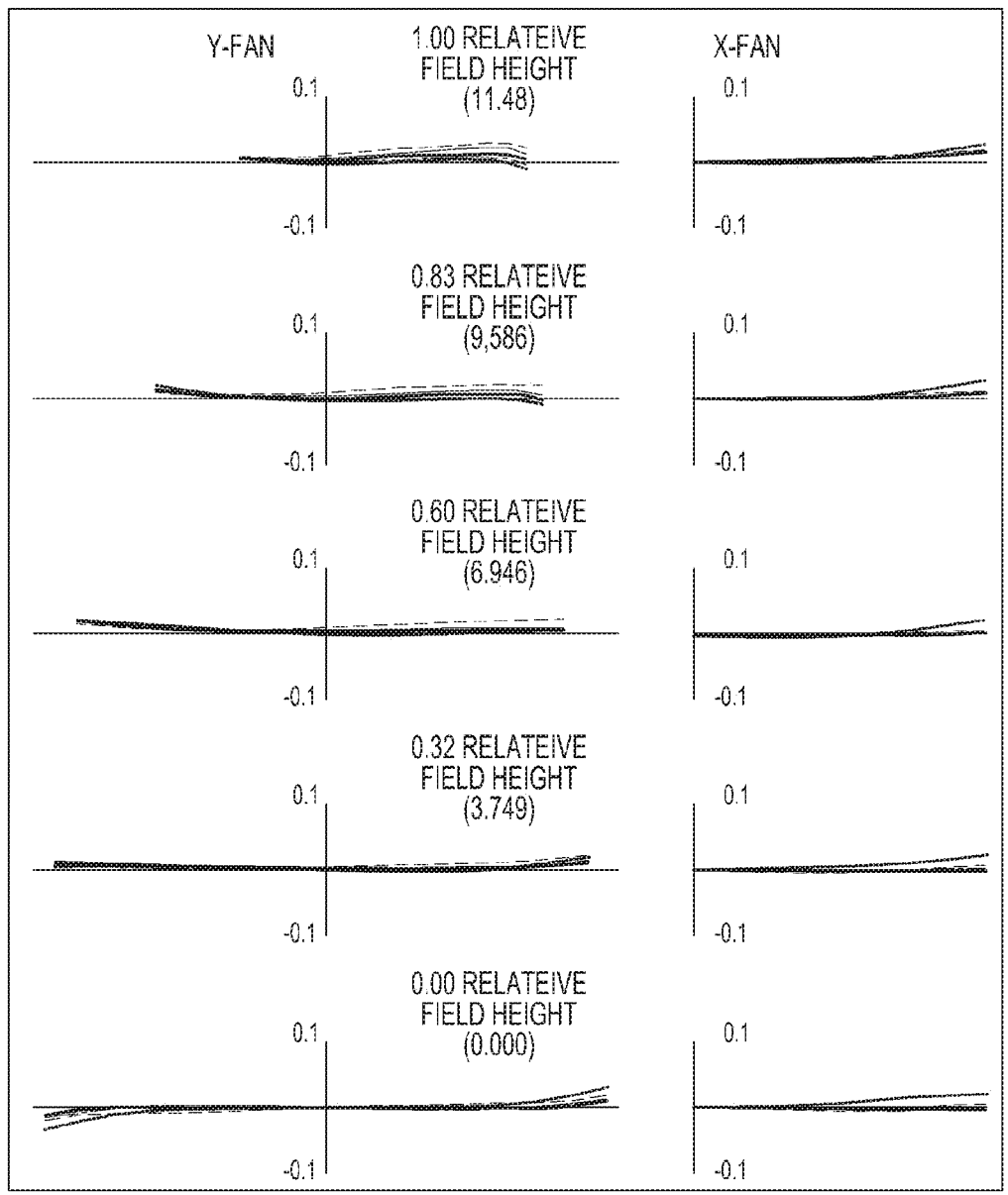
Figure 22C:
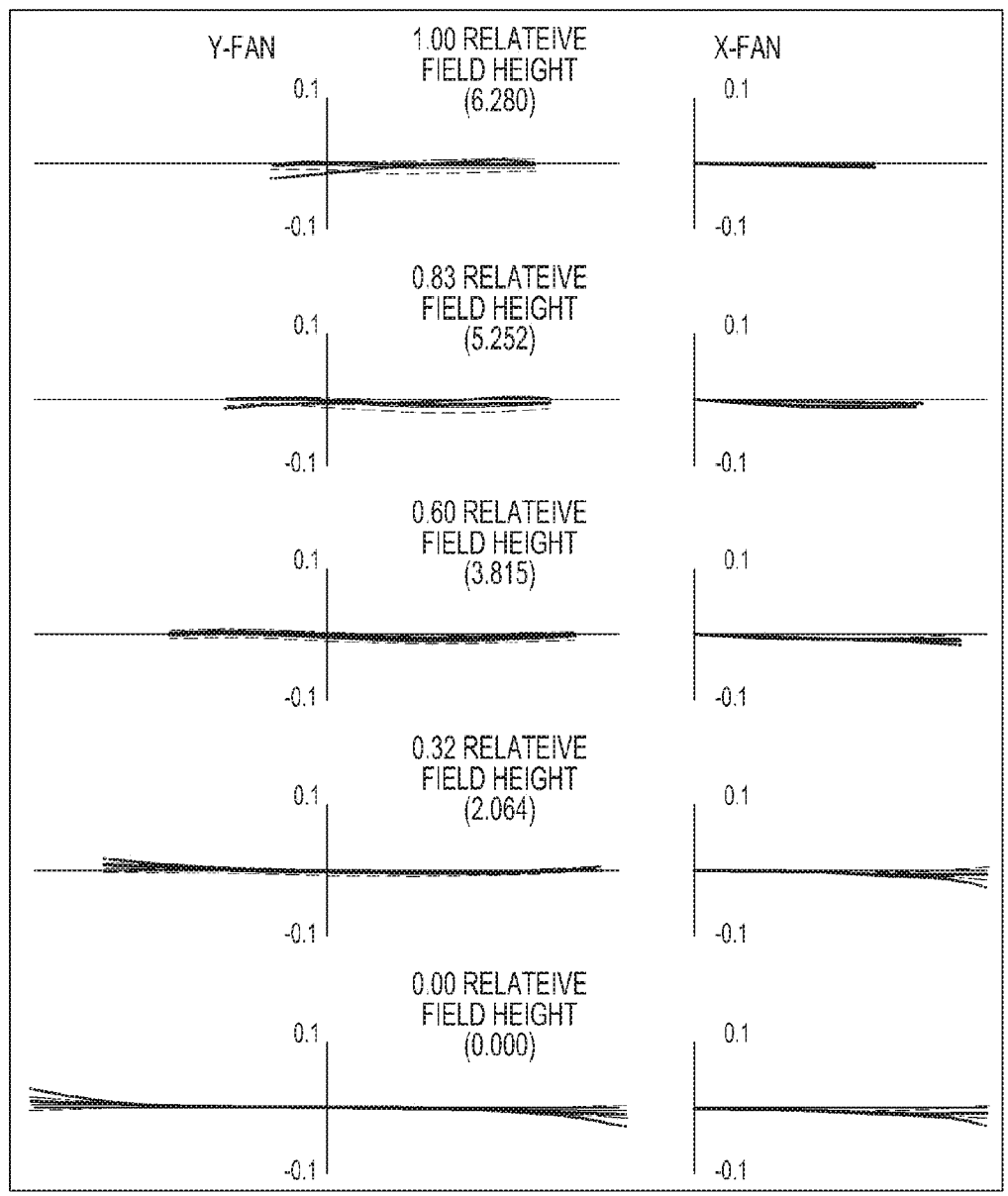
Figure 23A:
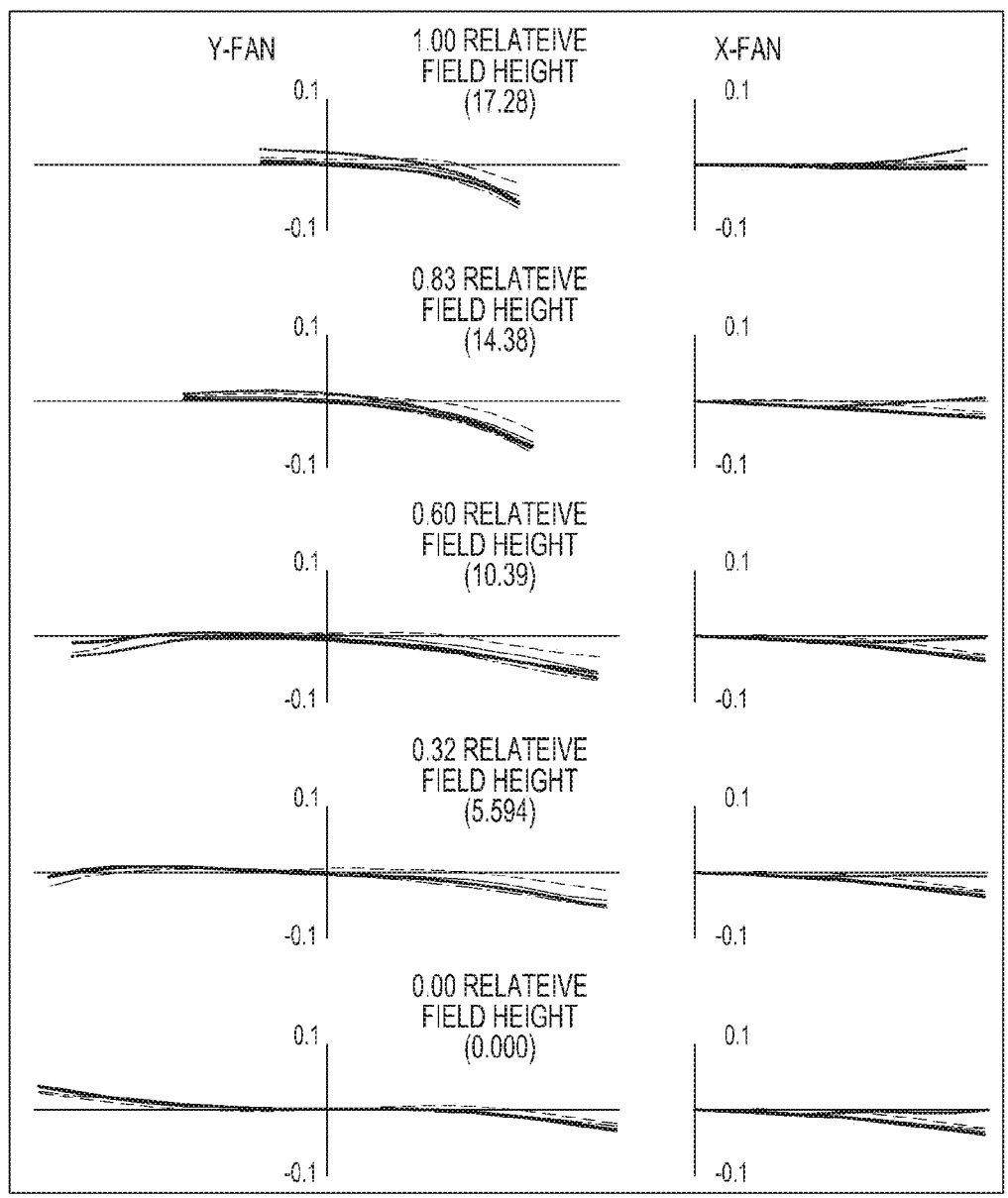
FIGS. 23A-23C are diagrams illustrating the horizontal aberration of the wide-angle end, the middle end, and the telephoto end in the case of the shortest object distance in the optical system, according to an embodiment of the present disclosure.
Figure 23B:
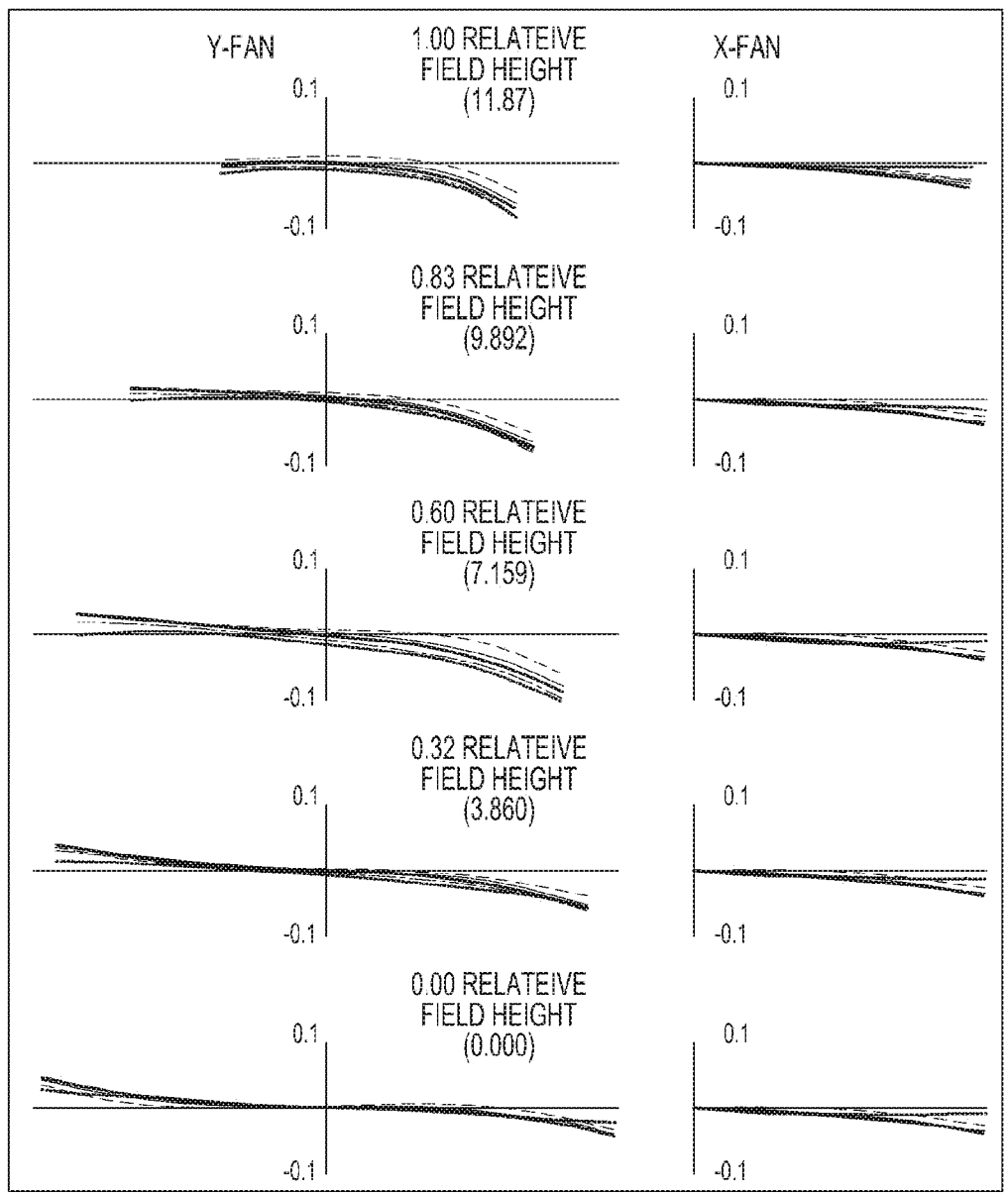
Figure 23C:
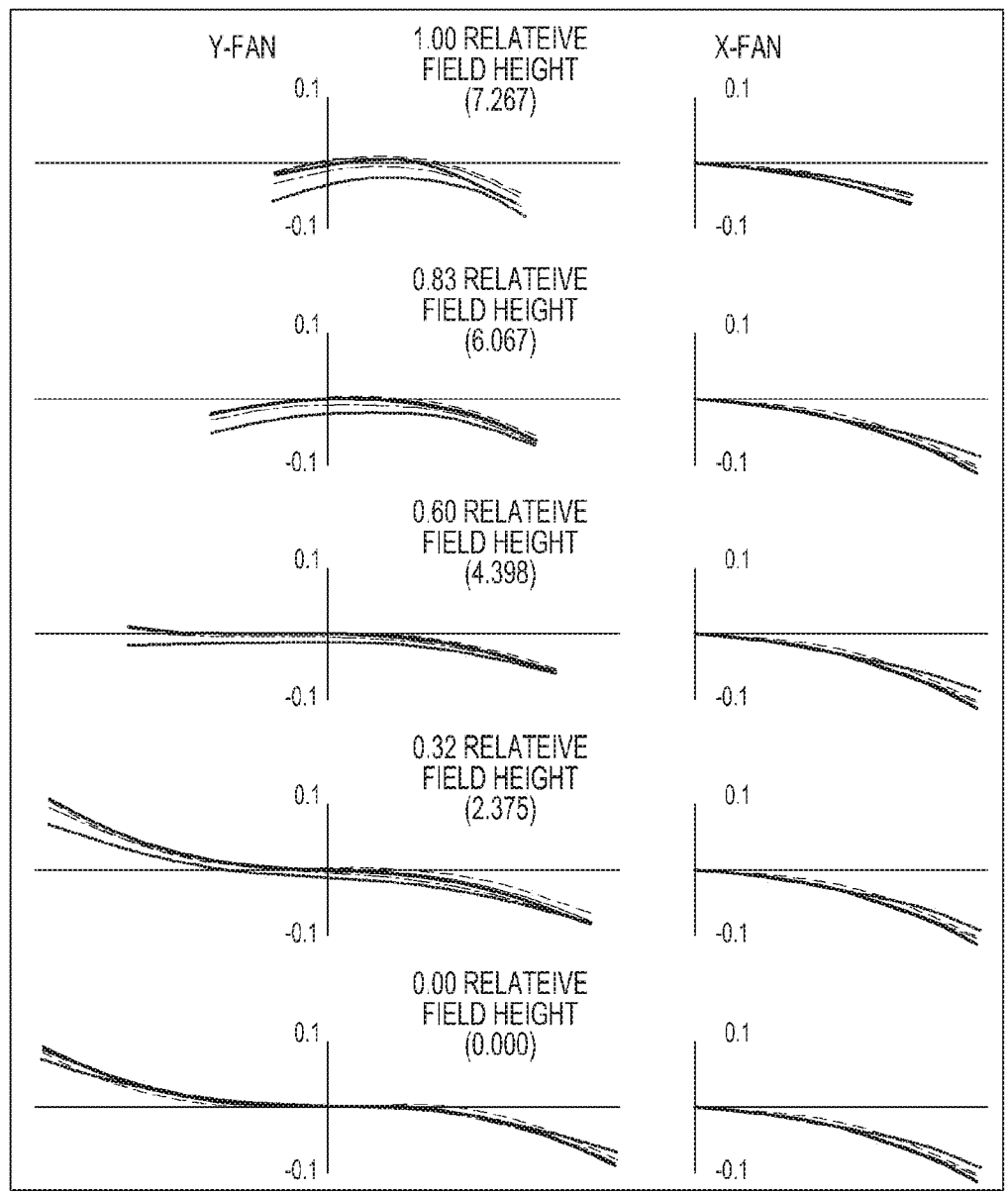
Figure 24A:
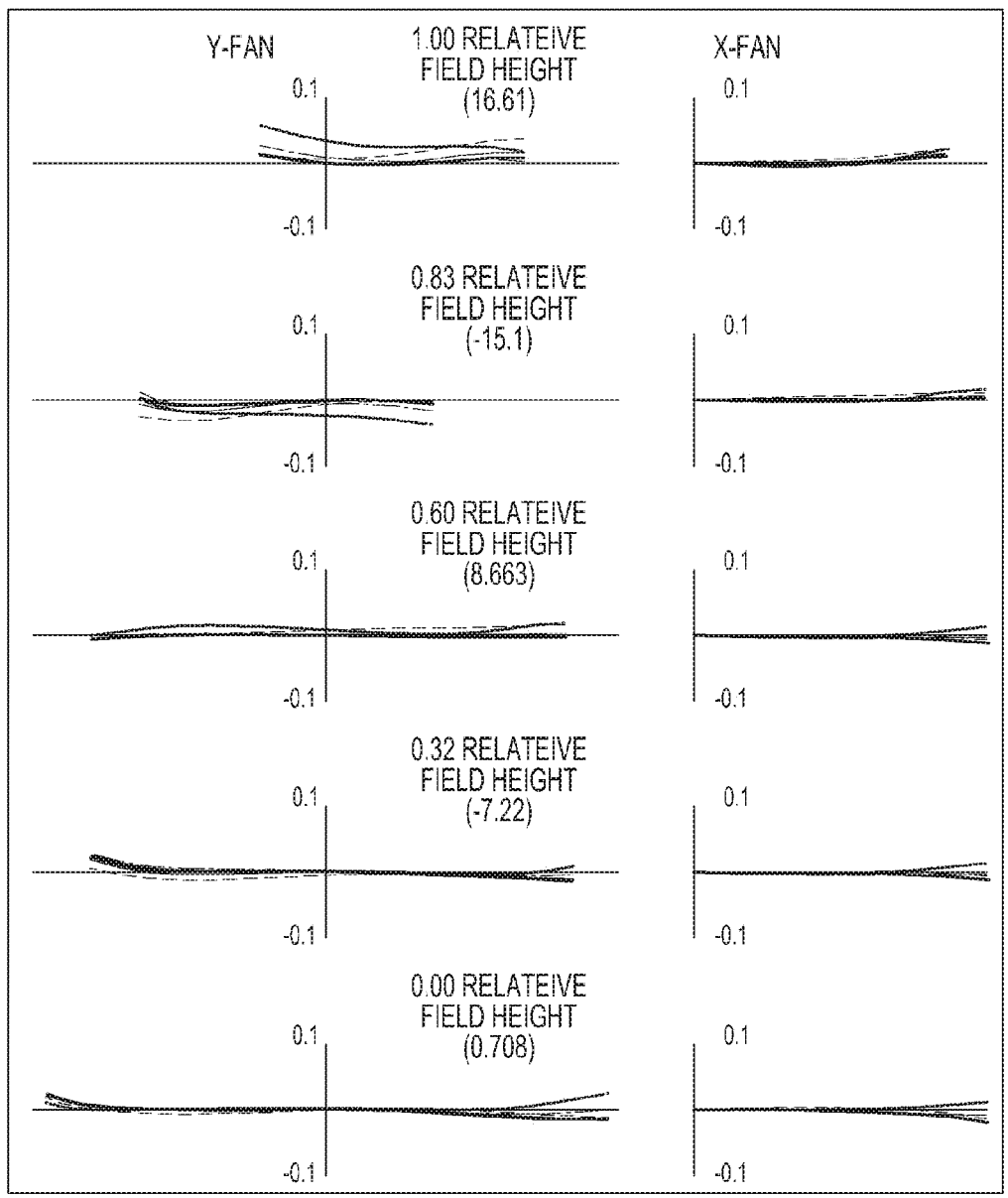
FIGS. 24A-24C are diagrams illustrating the horizontal aberration in the case of an infinite object distance and in the case of image stabilizations of 0.7 degrees, 0.55 degrees, and 0.4 degrees at a wide-angle end, a middle end, and a telephoto end, respectively, in the optical system, according to an embodiment of the present disclosure.
Figure 24B:
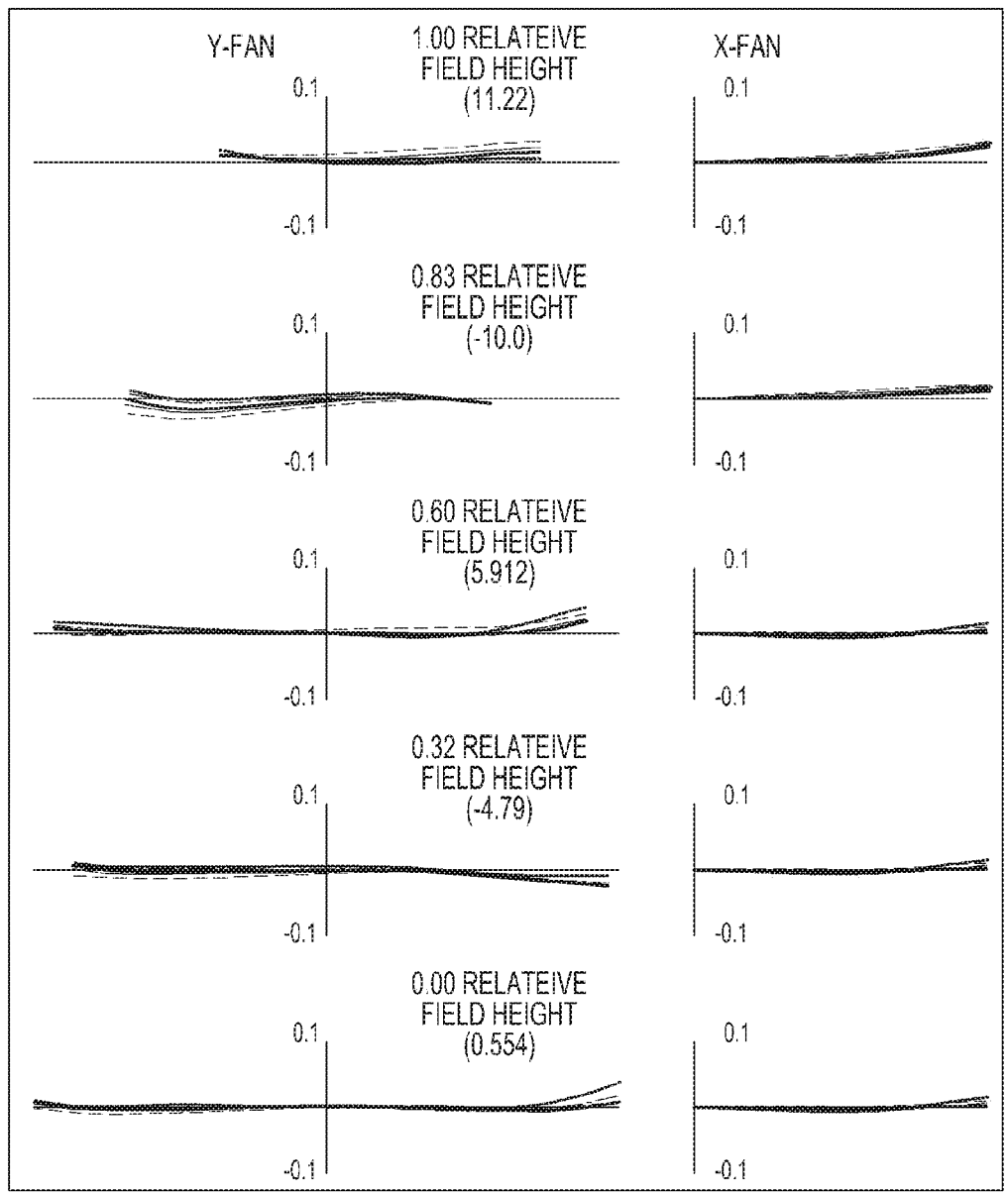
Figure 24C:
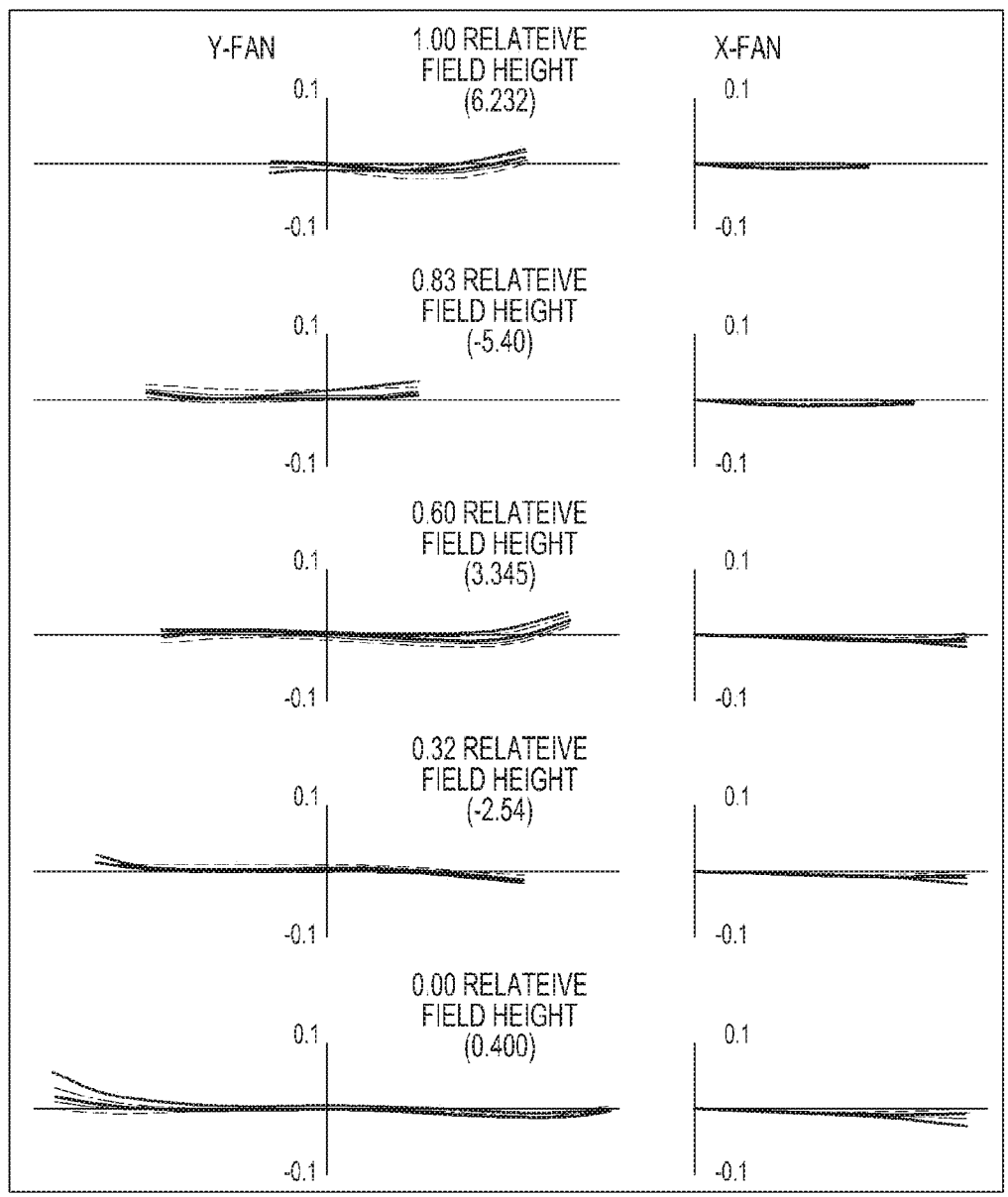

FIGS. 22A-22C are diagrams illustrating the horizontal aberration of the wide-angle end, the middle end, and the telephoto end in the case of an infinite object distance in the optical system 100, according to an embodiment of the present disclosure. FIGS. 23A-23C are diagrams illustrating the horizontal aberration of the wide-angle end, the middle end, and the telephoto end in the case of the shortest object distance in the optical system 100, according to an embodiment of the present disclosure. FIGS. 24A-24C are diagrams illustrating the horizontal aberration in the case of an infinite object distance and in the case of image stabilizations of 0.7 degrees, 0.55 degrees, and 0.4 degrees at the wide-angle end, the middle end, and the telephoto end, respectively, in the optical system 100, according to an embodiment of the present disclosure.

TABLE 7

| EFL: | 72.10 mm | FNO: | 2.88 | 2w: | 34.26 |
|---|---|---|---|---|---|
| EFL: | 194.00 mm | FNO: | 2.88 | 2w: | 12.56 |

| Surf | Radius | Thick | Ind | Abv |
|---|---|---|---|---|
| 1 | 133.494 | 2.3 | 1.8247 | 24.7 |
| 2 | 88.435 | 0.38 | | |
| 3 | 92.885 | 9.6 | 1.4381 | 95.1 |
| 4 | −635.319 | 0.2 | | |
| 5 | 80.776 | 8.61 | 1.49845 | 81.6 |
| 6 | 1066.886 | 2 | | |
| 7 | −3476.995 | 4.13 | 1.91048 | 31.3 |
| 8 | −81.445 | 1.35 | 1.65995 | 58.1 |
| 9 | 75.09 | 2.91 | | |
| 10 | −354.646 | 1.3 | 1.80831 | 46.5 |
| 11 | 44.47 | 4.15 | 1.85505 | 23.8 |
| 12 | 106.066 | 17.52 | | |
| 13 | −53.277 | 1.3 | 1.59561 | 67 |
| 14 | 93.577 | 1.3 | | |
| 15 | 99.247 | 2.3 | 1.80608 | 29.9 |
| 16 | 180 | 22.57 | | |
| 17 | 664.821 | 3.59 | 1.7949 | 47.7 |
| 18 | −106.514 | 0.15 | | |
| 19 | 86.05 | 7.31 | 1.59489 | 68.6 |
| 20 | −56.154 | 1.35 | 1.91048 | 31.3 |
| 21 | −502.056 | 28.27 | | |
| STO | Infinity | 2.7 | | |
| 23 | 49.066 | 6.48 | 1.49845 | 81.6 |
| 24 | −180.4 | 0.15 | | |
| 25 | 33.264 | 7.59 | 1.62475 | 51.2 |
| 26 | −253.608 | 1.84 | 1.76651 | 40.1 |
| 27 | 29.328 | 12.73 | | |
| 28 | −281.83 | 3.47 | 1.85505 | 23.8 |
| 29 | −43.3 | 1.2 | 1.71174 | 39.6 |
| 30 | 53.814 | 2.09 | | |
| 31 | 59.477 | 4.21 | 1.81081 | 40.7 |
| 32 | −228.781 | 0.15 | | |
| 33 | 38.933 | 7.25 | 1.49845 | 81.6 |
| 34 | −52.742 | 1.47 | 1.91695 | 35.2 |
| 35 | 53.07 | 10.22 | | |
| 36 | −27.265 | 1.83 | 1.59489 | 68.6 |
| 37 | −41.791 | 0.15 | | |
| 38 | 81.411 | 7.12 | 1.62167 | 37.9 |
| 39 | −48.909 | 12.26 | | |
| 40 | −36.788 | 1.6 | 1.79196 | 47.4 |
| 41 | −67.21 | 31.93 | | |
| IMG | | | | |

TABLE 8

| f | 72.07 | 106.86 | 194.07 | | | |
|---|---|---|---|---|---|---|
| D0 | infinity | infinity | infinity | 962.00 | 962.00 | 962.00 |
| D1 | 2.00 | 24.31 | 46.54 | 2.00 | 24.31 | 46.54 |
| D2 | 17.52 | 13.91 | 19.59 | 14.74 | 8.51 | 6.13 |

TABLE 8-continued

| D3 | 22.57 | 17.35 | 2.90 | 25.35 | 22.74 | 16.37 |
|---|---|---|---|---|---|---|
| D4 | 28.27 | 14.80 | 1.30 | 28.27 | 14.80 | 1.30 |
| | 0.7 deg | 0.55 deg | 0.4 deg | | | |
| OIS Shift | 0.94 | 1.09 | 1.43 | | | |

Fifth Embodiment

Table 9 below shows numerical values according to Equation (1) to Equation (14), and Table 10 below shows the air gap between the infinite group and the closest group and shows the amount of shift required for the lens group G5B when the optical system 100 is corrected by 0.7 degrees, 0.55 degrees, and 0.4 degrees at the wide-angle end, the middle end, and the telephoto end, respectively, in the optical system 100.

Figure 25:
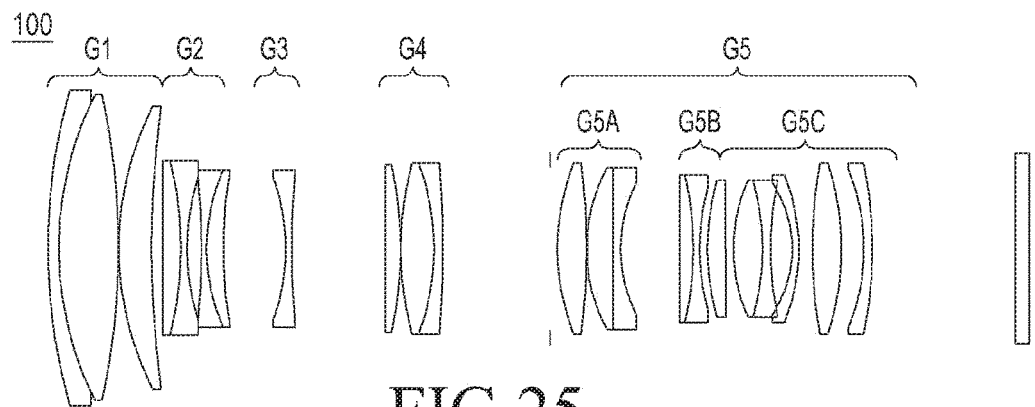
FIG. 25 is a diagram illustrating the lens array of a wide-angle end in the optical system, according to an embodiment of the present disclosure.
Figure 26:
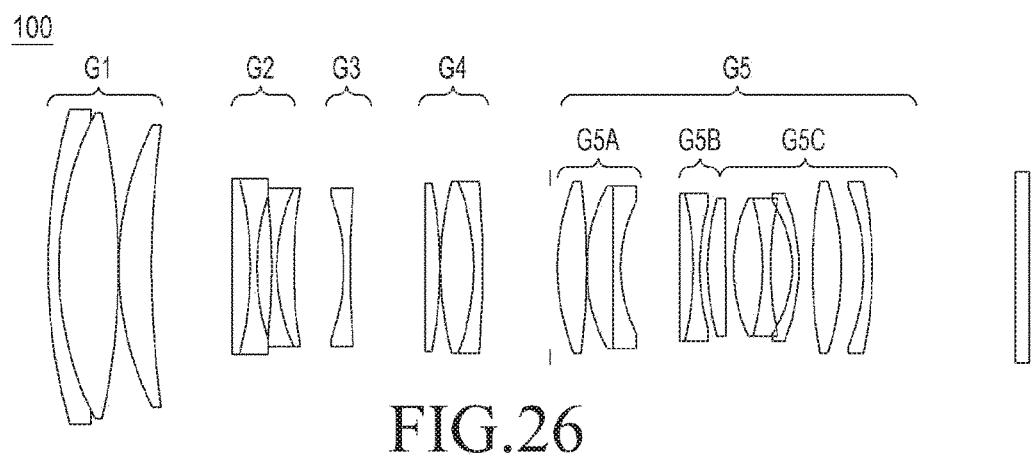
FIG. 26 is a diagram illustrating the lens array of a middle end in the optical system, according to an embodiment of the present disclosure.
Figure 27:
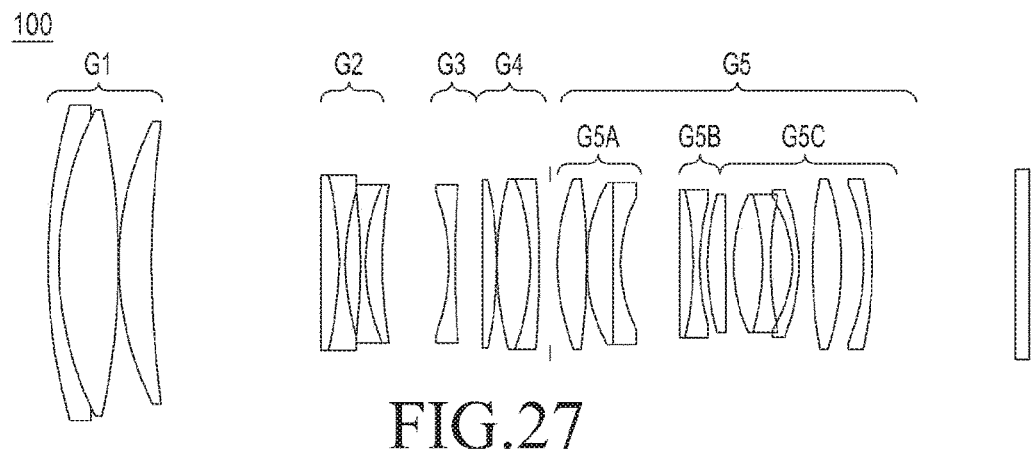
FIG. 27 is a diagram illustrating the lens array of a telephoto end in the optical system, according to an embodiment of the present disclosure.

FIG. 25 is a diagram illustrating the lens array of the wide-angle end in the optical system 100, according to an embodiment of the present disclosure. FIG. 26 is a diagram illustrating the lens array of the middle end in the optical system 100, according to an embodiment of the present disclosure. FIG. 27 is a diagram illustrating the lens array of the telephoto end in the optical system 100, according to an embodiment of the present disclosure.

Figure 28A:
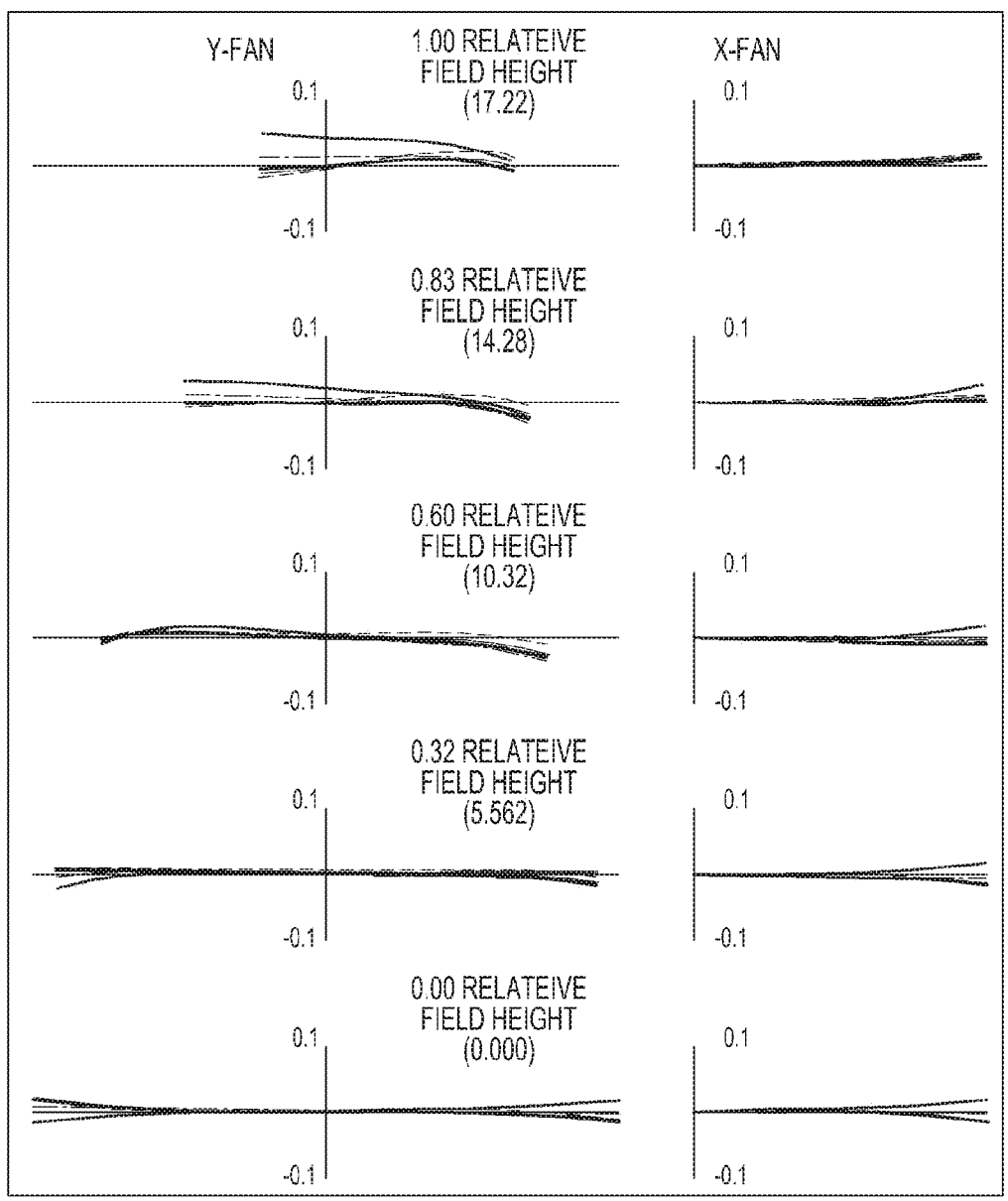
FIGS. 28A-28C are diagrams illustrating the horizontal aberration of the wide-angle end, the middle end, and the telephoto end in the case of an infinite object distance in the optical system, according to an embodiment of the present disclosure.
Figure 28B:
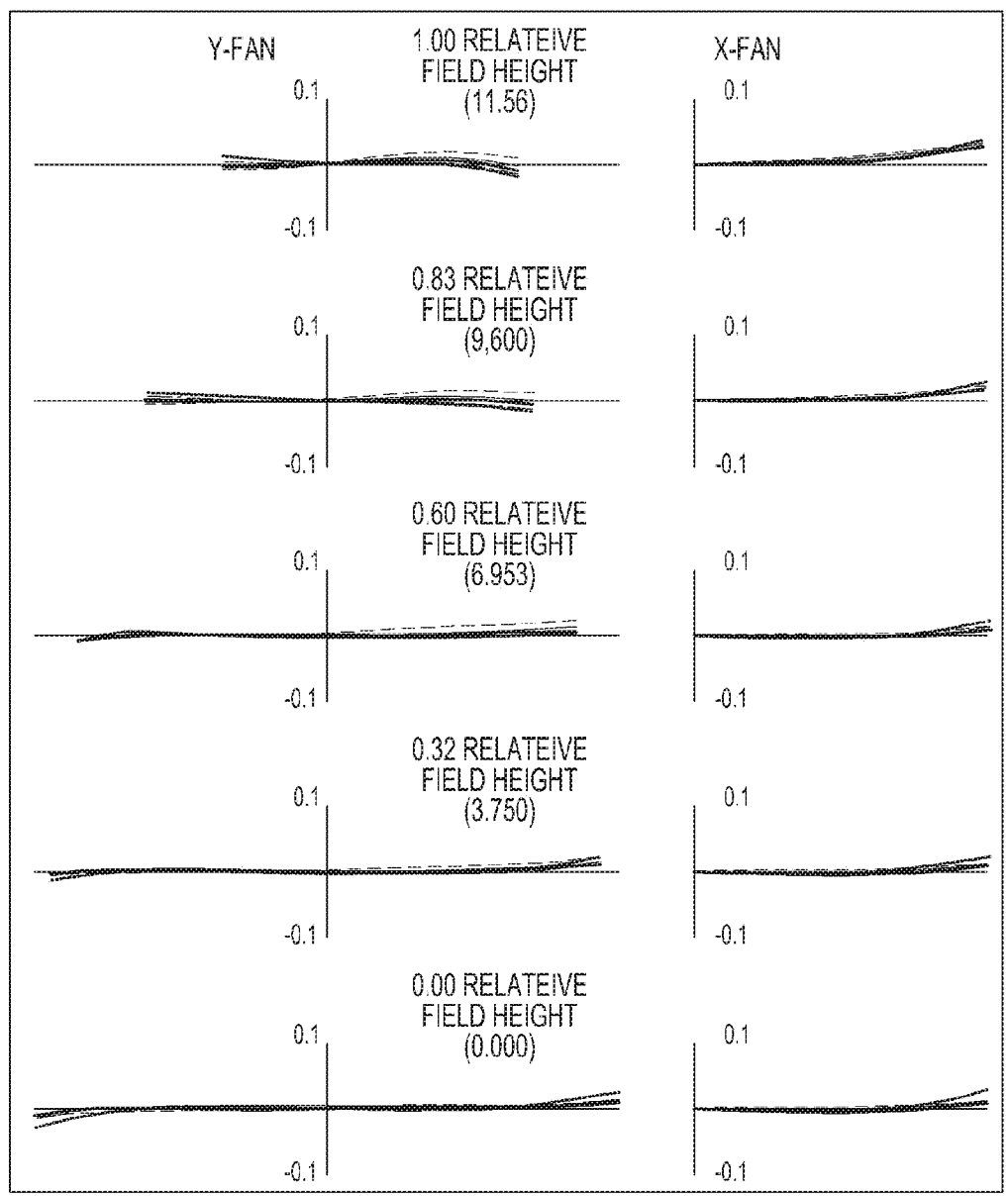
Figure 28C:
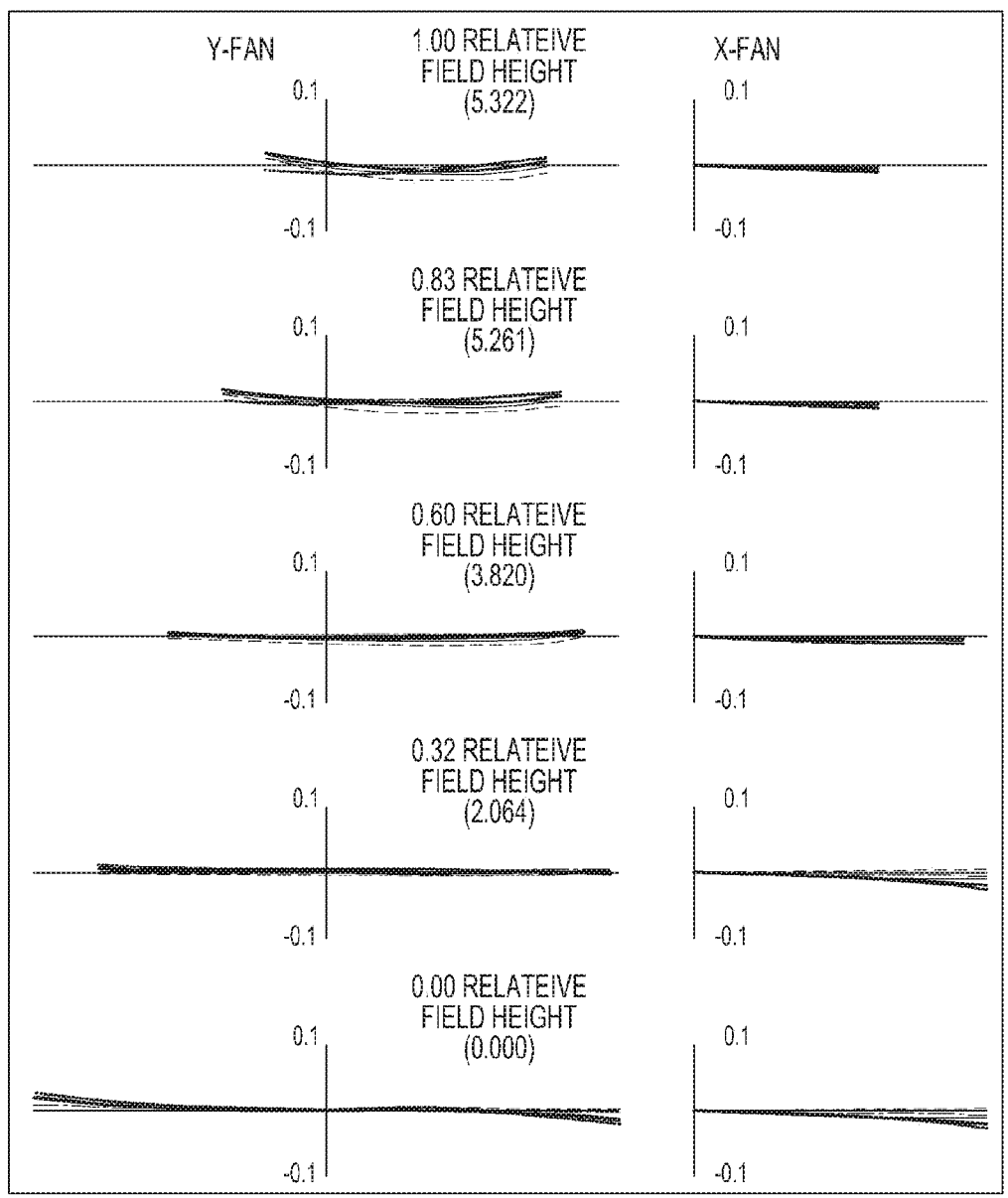
Figure 29A:
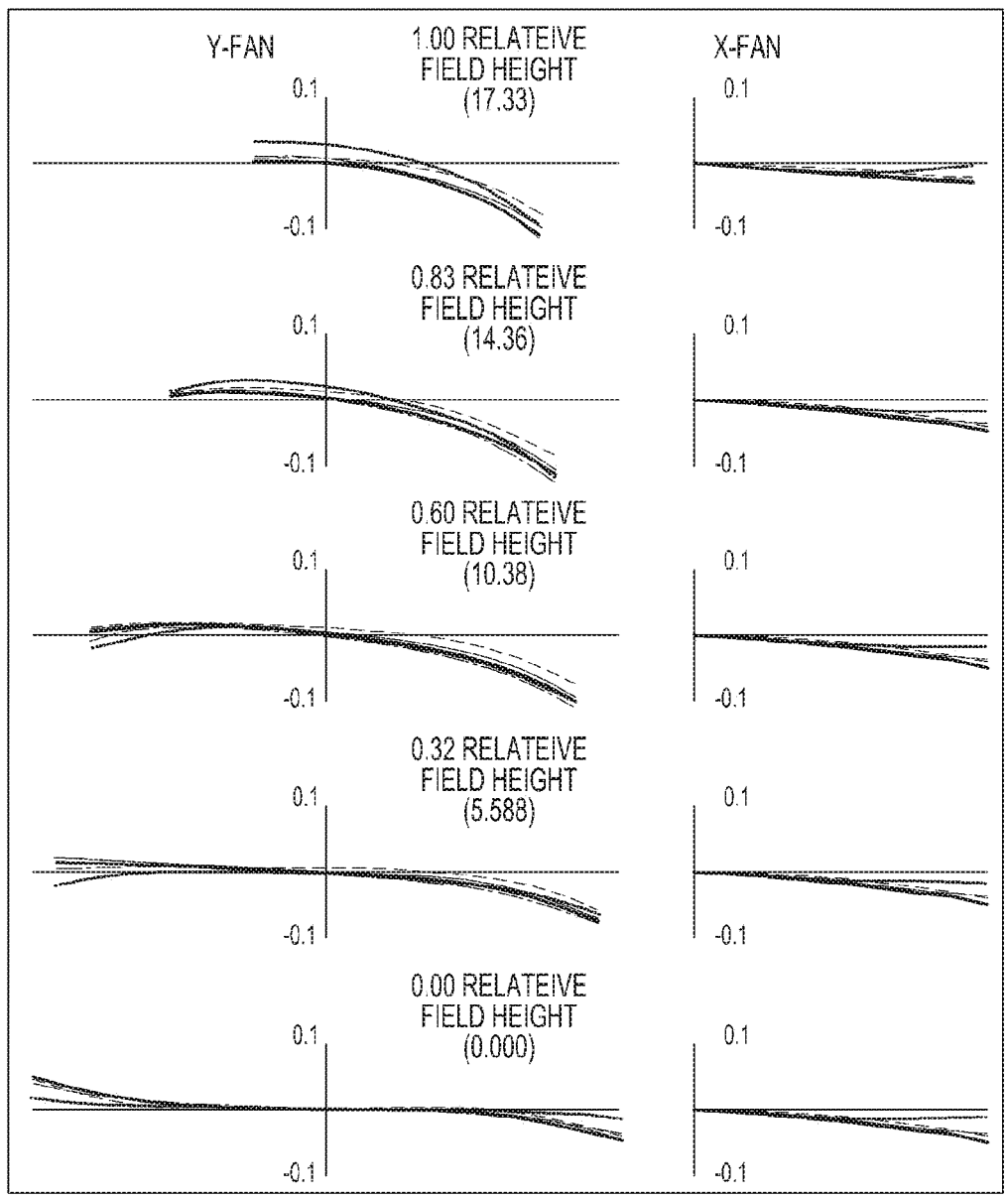
FIGS. 29A-29C are diagrams illustrating the horizontal aberration of the wide-angle end, the middle end, and the telephoto end in the case of the shortest object distance in the optical system, according to an embodiment of the present disclosure.
Figure 29B:
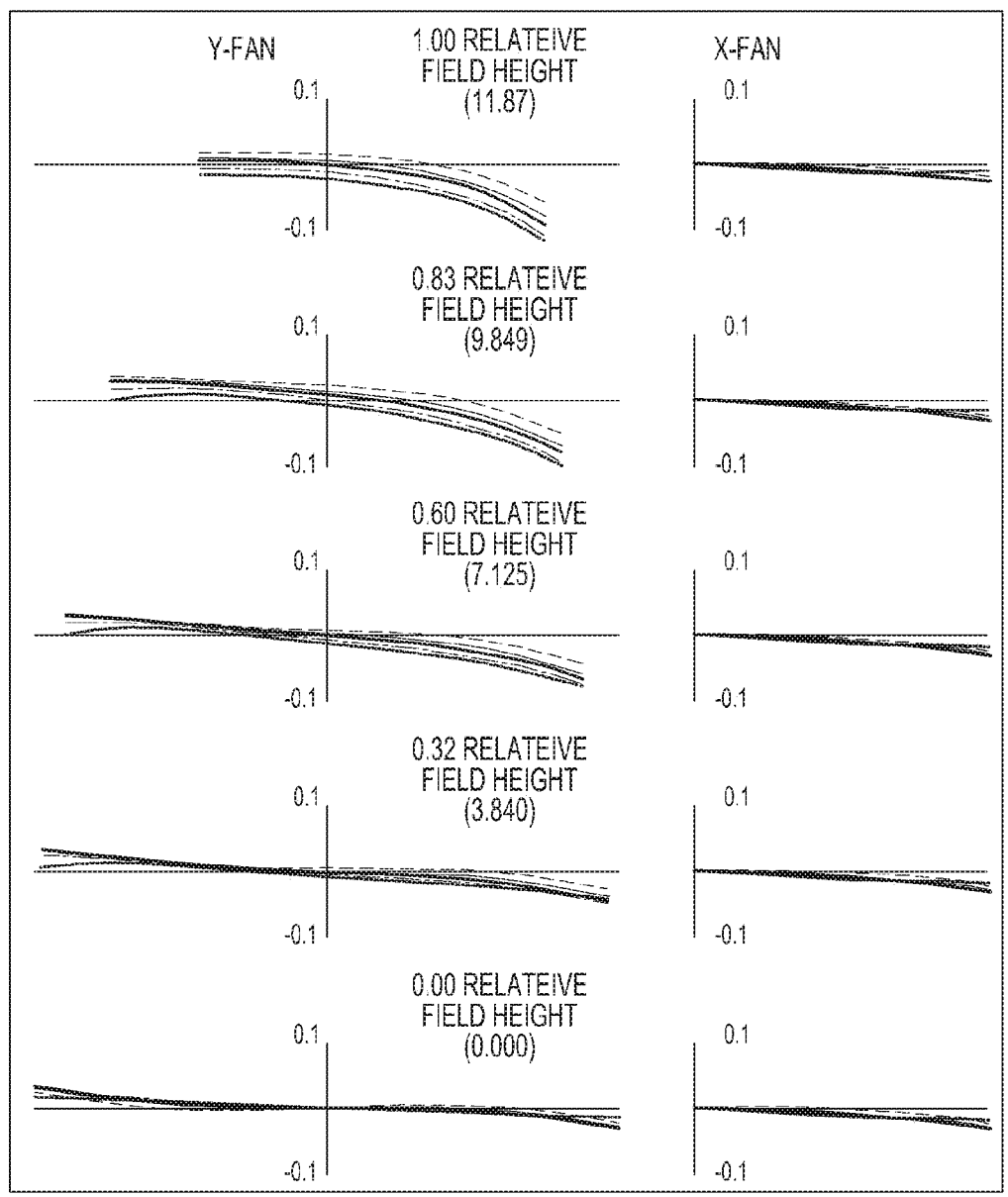
Figure 29C:
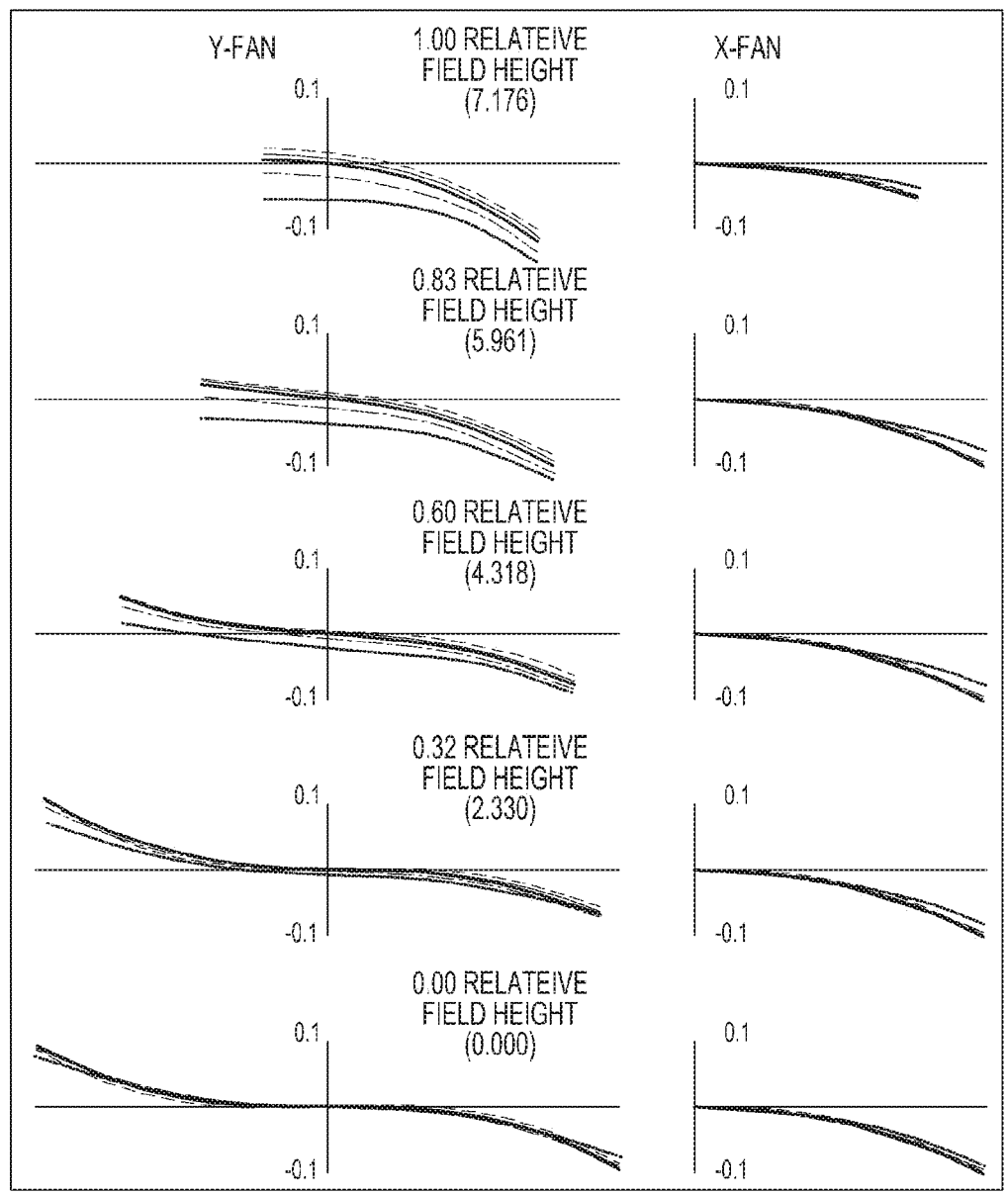
Figure 30A:
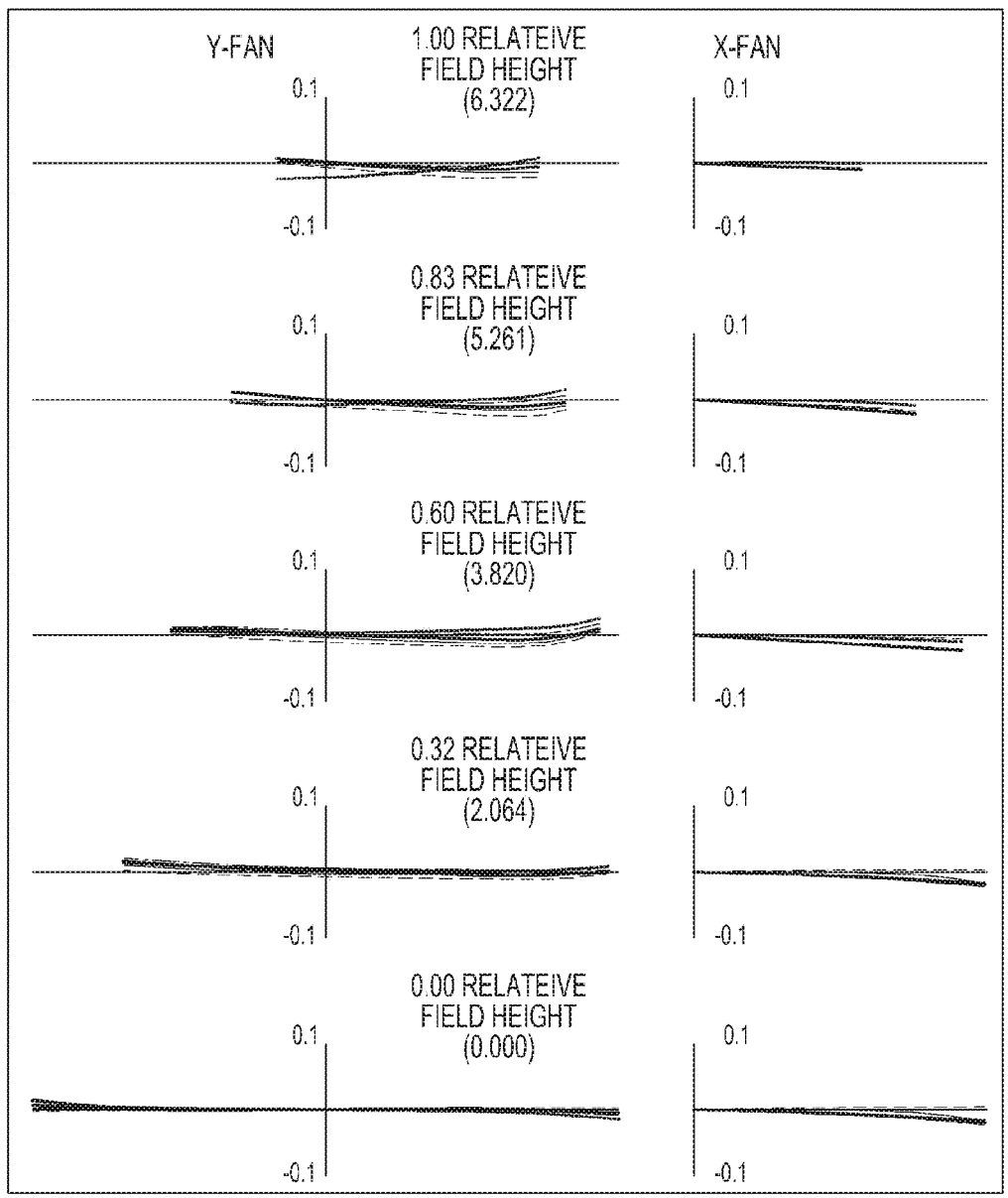
FIGS. 30A-30C are diagrams illustrating the horizontal aberration in the case of an infinite object distance and in the case of image stabilizations of 0.7 degrees, 0.55 degrees, and 0.4 degrees at a wide-angle end, a middle end, and a telephoto end, respectively, in the optical system, according to an embodiment of the present disclosure.
Figure 30B:
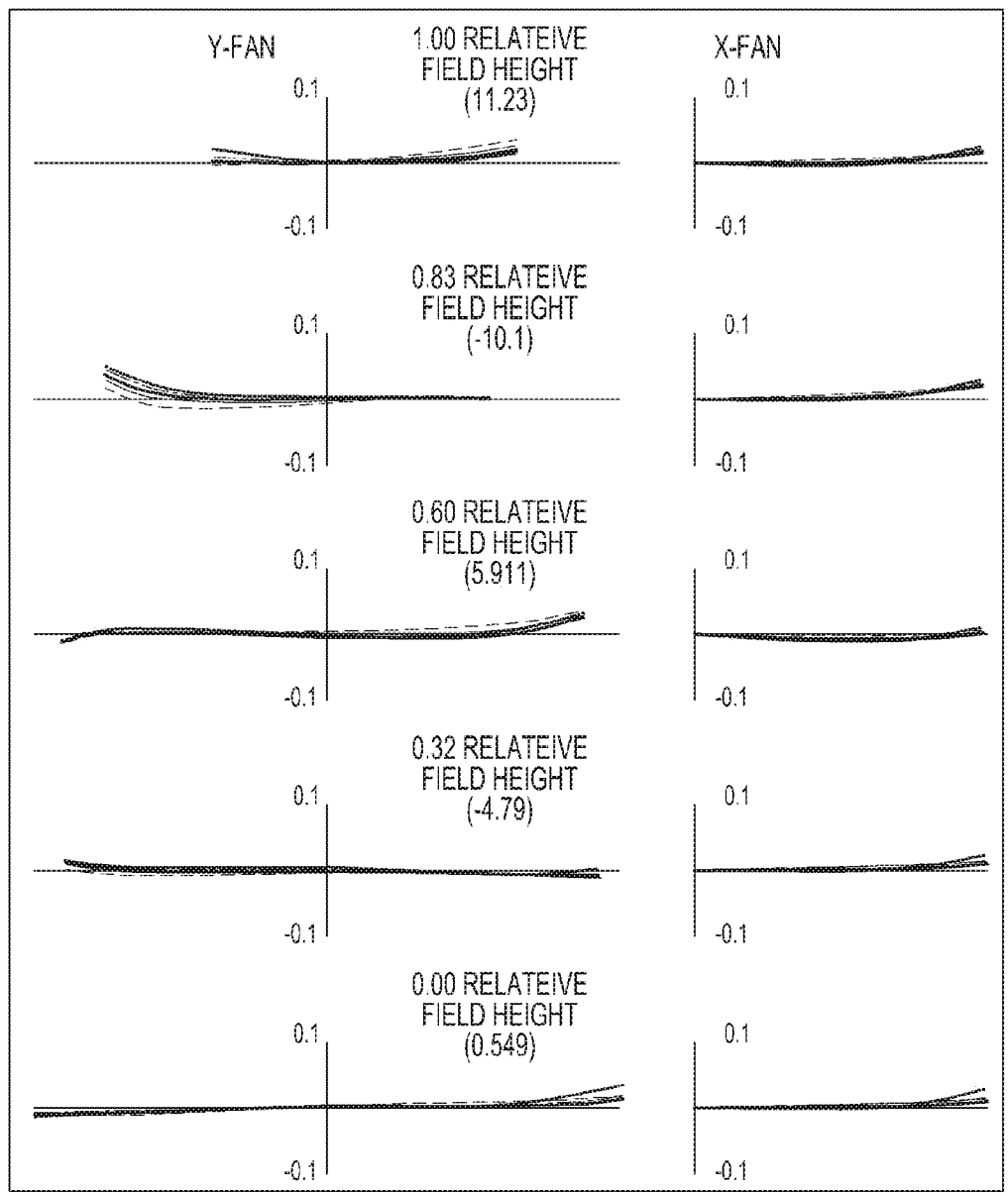
Figure 30C:
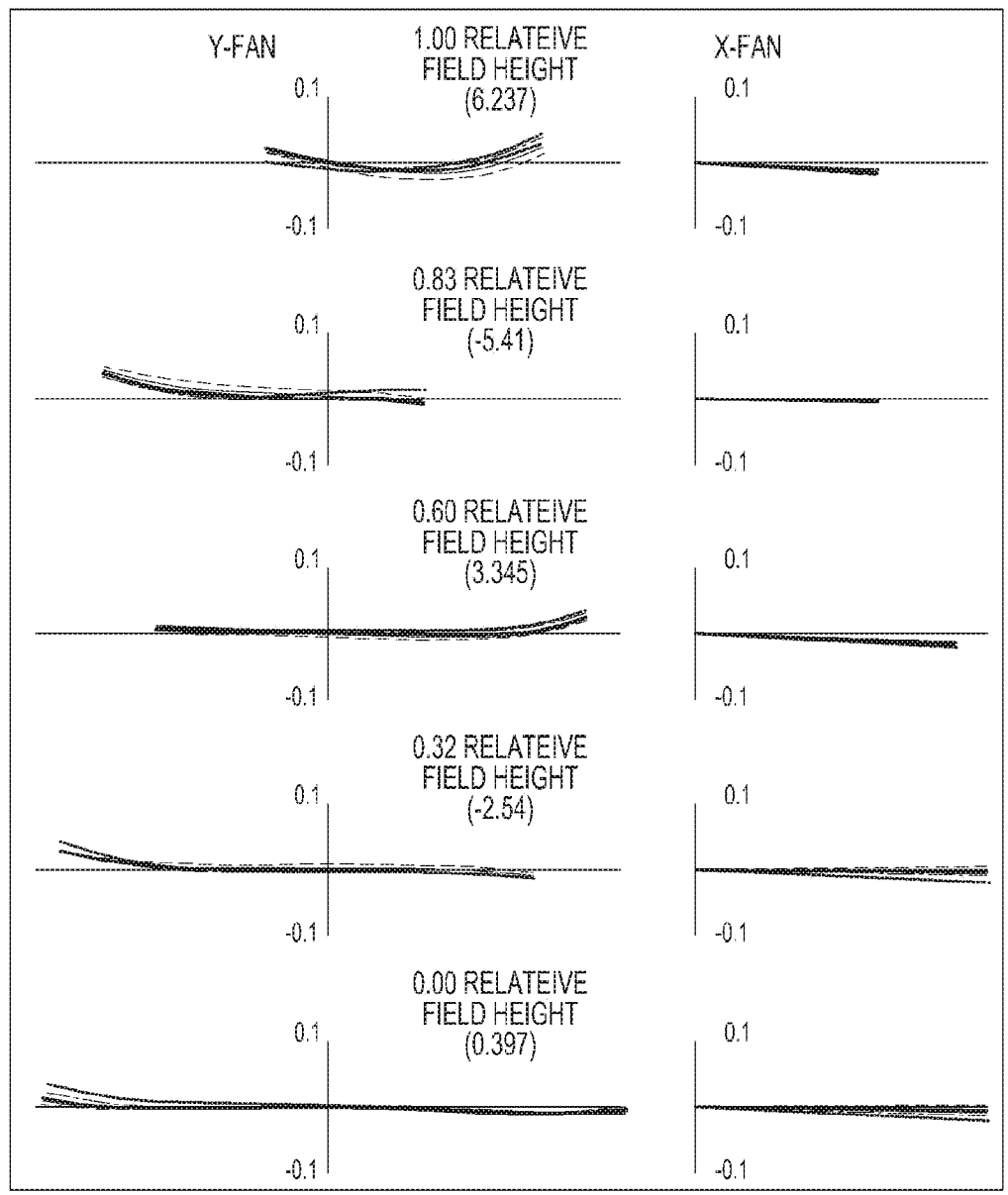

FIGS. 28A-28C are diagrams illustrating the horizontal aberration of the wide-angle end, the middle end, and the telephoto end in the case of an infinite object distance in the optical system 100, according to an embodiment of the present disclosure. FIGS. 29A-29C are diagrams illustrating the horizontal aberration of the wide-angle end, the middle end, and the telephoto end in the case of the shortest object distance in the optical system 100, according to an embodiment of the present disclosure. FIGS. 30A-30C are diagrams illustrating the horizontal aberration in the case of an infinite object distance and in the case of image stabilizations of 0.7 degrees, 0.55 degrees, and 0.4 degrees at a wide-angle end, a middle end, and a telephoto end, respectively, in the optical system 100, according to an embodiment of the present disclosure.

TABLE 9

| EFL: | 72.09 mm | FNO: | 2.89 | 2w: | 34.44 |
|---|---|---|---|---|---|
| EFL: | 194.00 mm | FNO: | 2.89 | 2w: | 12.64 |

| Surf | Radius | Thick | Ind | Abv |
|---|---|---|---|---|
| 1 | 116.368 | 2.5 | 1.81263 | 25.5 |
| 2 | 76.744 | 0.1 | | |
| 3 | 75.148 | 14.19 | 1.4381 | 95.1 |
| 4 | −296.24 | 0.2 | | |
| 5 | 69.89 | 9.03 | 1.49845 | 81.6 |
| 6 | 238.184 | 2 | | |
| 7 | −10527.938 | 4.77 | 1.85047 | 23.3 |
| 8 | −82.196 | 1.6 | 1.66183 | 59.5 |
| 9 | 59.246 | 3.2 | | |
| 10 | −719.958 | 1.6 | 1.77391 | 49.9 |
| 11 | 40.79 | 4.76 | 1.85505 | 23.8 |
| 12 | 82.738 | 14.72 | | |
| 13 | −47.265 | 1.2 | 1.59561 | 67 |
| 14 | 293.744 | 21.93 | | |
| 15 | 432.179 | 3.89 | 1.8134 | 45.8 |
| 16 | −105.897 | 0.15 | | |
| 17 | 87.01 | 8.79 | 1.59489 | 68.6 |
| 18 | −48.735 | 1.6 | 1.91014 | 31.3 |
| 19 | −330.959 | 25.17 | | |
| STO | Infinity | 2.5 | | |
| 21 | 56.899 | 7.16 | 1.49845 | 81.6 |
| 22 | −1.42E+02 | 0.15 | | |
| 23 | 43.149 | 5.9 | 1.68507 | 57.7 |

TABLE 9-continued

| | | | | |
|---|---|---|---|---|
| 24 | 1567.83 | 1.87 | 1.75116 | 38.6 |
| 25 | 44.532 | 14.59 | | |
| 26 | −548.165 | 3.48 | 1.85505 | 23.8 |
| 27 | −59.868 | 1.3 | 1.69249 | 43.7 |
| 28 | 47.283 | 2.68 | | |
| 29 | 73.511 | 3.58 | 1.83944 | 42.7 |
| 30 | −743.871 | 2.7 | | |
| 31 | 57.607 | 7.17 | 1.49845 | 81.6 |
| 32 | −39.864 | 1.5 | 1.91048 | 31.3 |
| 33 | 194.07 | 4.84 | | |
| 34 | −32.334 | 1.5 | 1.49976 | 81.3 |
| 35 | −62.123 | 4.52 | | |
| 36 | 126.306 | 6.19 | 1.72285 | 27.3 |
| 37 | −65.911 | 4.9 | | |
| 38 | −45.526 | 1.6 | 1.79662 | 47 |
| 39 | −82.034 | 37.6 | | |
| IMG | | | | |

TABLE 10

| | | | | | | |
|---|---|---|---|---|---|---|
| f | 72.06 | 106.84 | 194.08 | | | |
| D0 | infinity | infinity | infinity | 962.00 | 962.00 | 962.00 |
| D1 | 2.00 | 20.99 | 40.19 | 2.00 | 20.99 | 40.19 |
| D2 | 14.72 | 11.39 | 17.50 | 12.25 | 6.64 | 5.84 |
| D3 | 21.93 | 17.50 | 4.61 | 24.41 | 22.25 | 16.28 |
| D4 | 25.17 | 13.95 | 1.50 | 25.17 | 13.95 | 1.50 |
| | 0.7 deg | 0.55 deg | 0.4 deg | | | |
| OIS Shift | 0.93 | 1.08 | 1.42 | | | |

Sixth Embodiment

Table 11 below shows numerical values according to Equation (1) to Equation (14) above, and Table 12 below shows the air gap between the infinite group and the closest group and shows the amount of shift required for the lens group G5B when the optical system 100 is corrected by 0.7 degrees, 0.55 degrees, and 0.4 degrees at the wide-angle end, the middle end, and the telephoto end, respectively, in the optical system 100.

Figure 31:
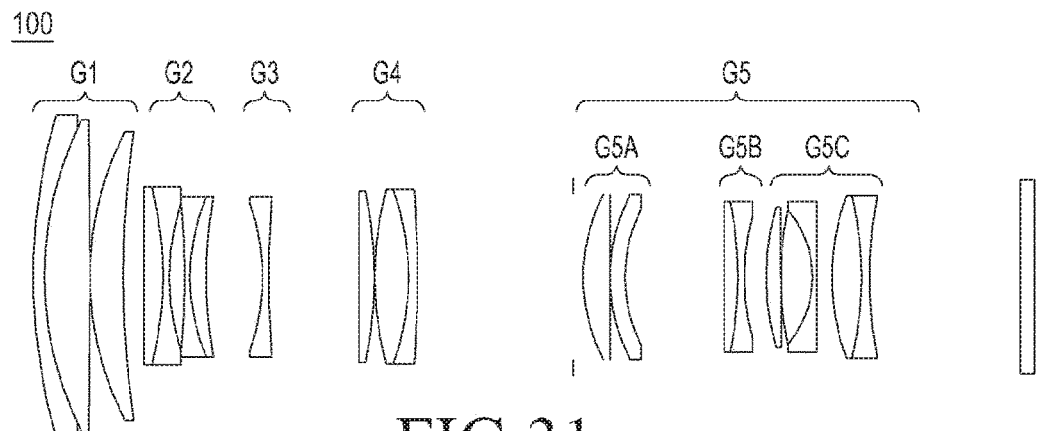
FIG. 31 is a diagram illustrating the lens array of a wide-angle end in the optical system, according to an embodiment of the present disclosure.
Figure 32:
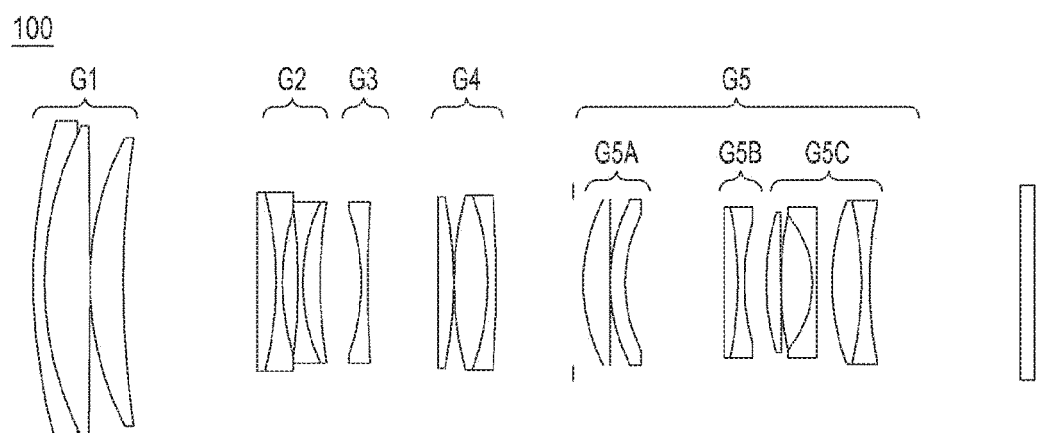
FIG. 32 is a diagram illustrating the lens array of a middle end in the optical system, according to an embodiment of the present disclosure.
Figure 33:
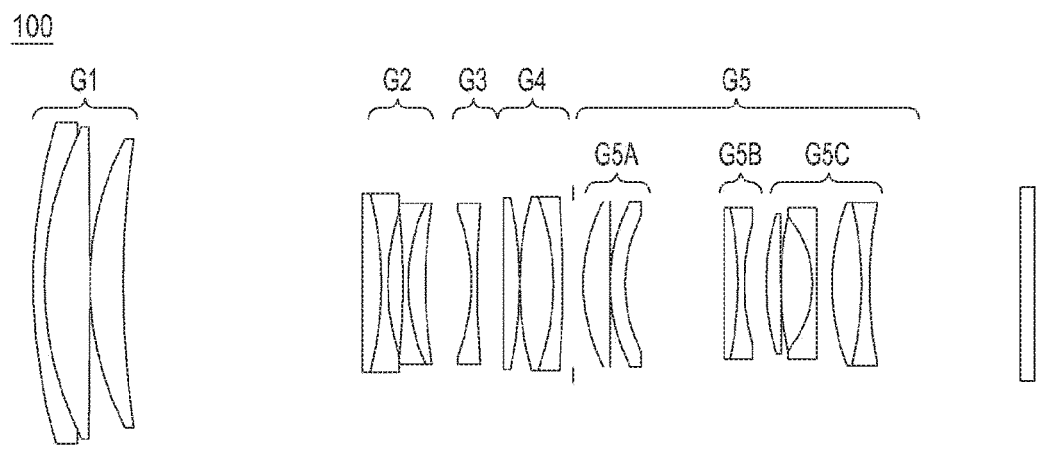
FIG. 33 is a diagram illustrating the lens array of a telephoto end in the optical system, according to an embodiment of the present disclosure.

FIG. 31 is a diagram illustrating the lens array of the wide-angle end in the optical system 100, according to an embodiment of the present disclosure. FIG. 32 is a diagram illustrating the lens array of the middle end in the optical system 100 0, according to an embodiment of the present disclosure. FIG. 33 is a diagram illustrating the lens array of a telephoto end in the optical system 100, according to an embodiment of the present disclosure.

Figure 34A:
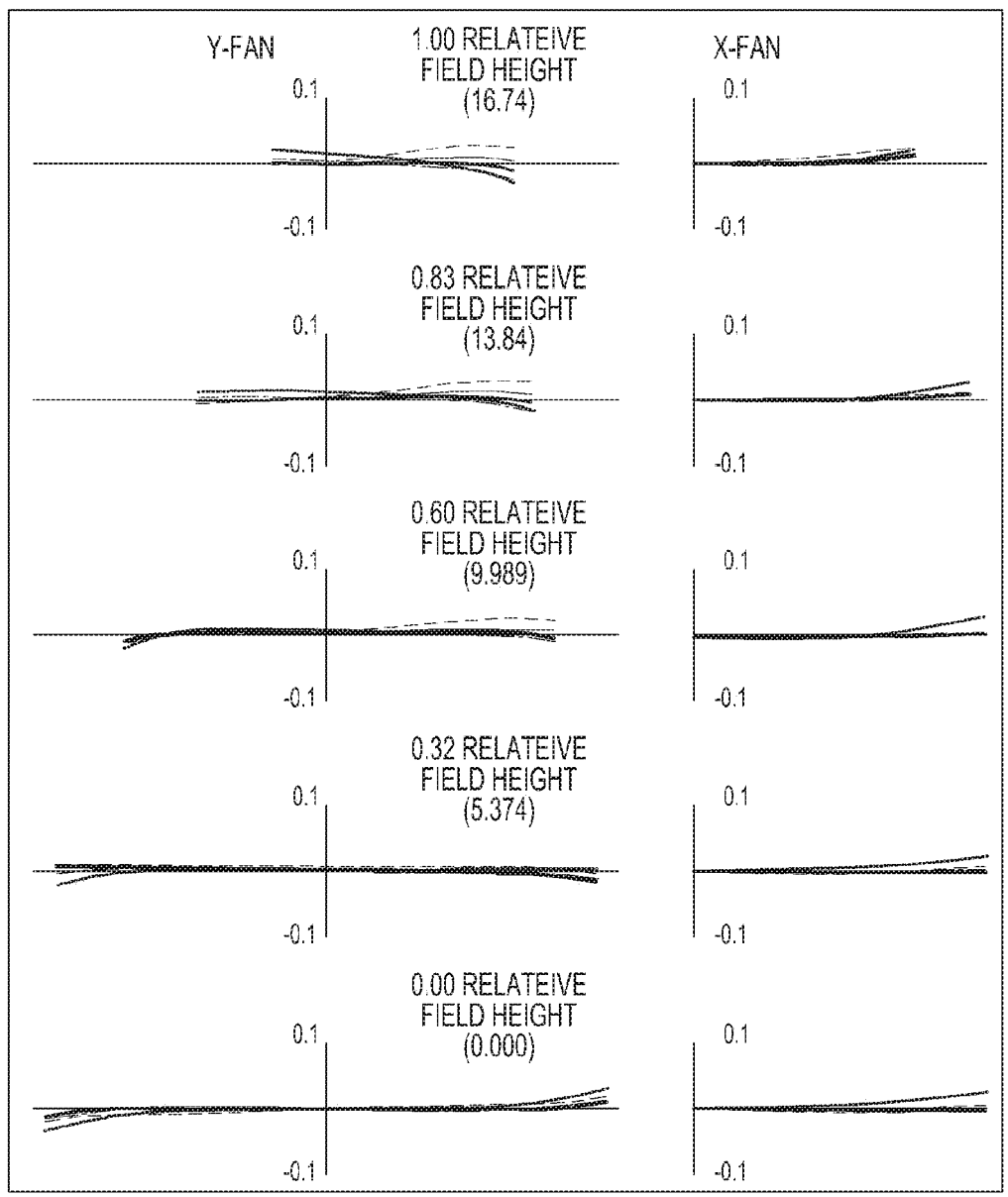
FIGS. 34A-34C are diagrams illustrating the horizontal aberration of the wide-angle end, the middle end, and the telephoto end in the case of an infinite object distance in the optical system, according to an embodiment of the present disclosure.
Figure 34B:
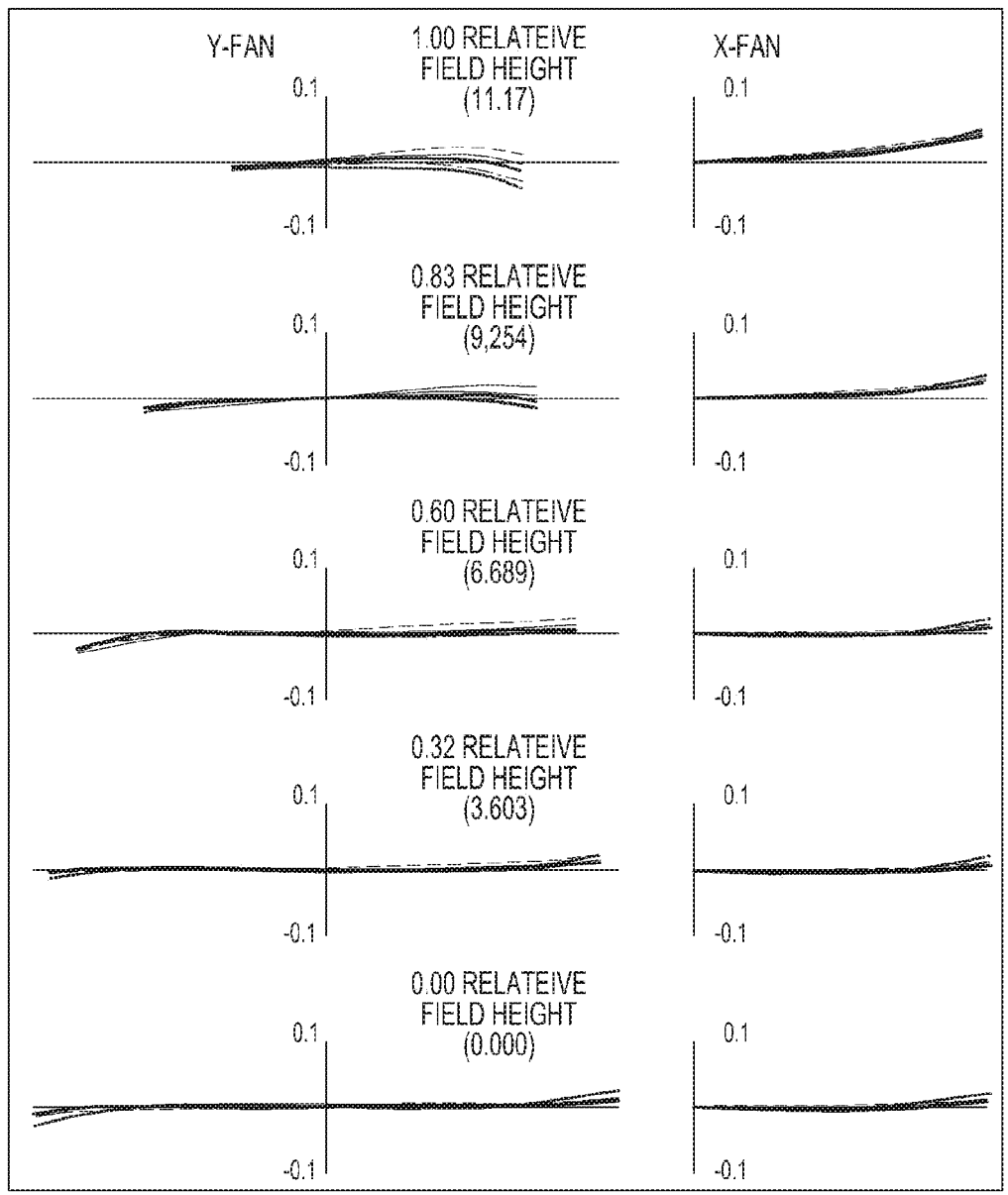
Figure 34C:
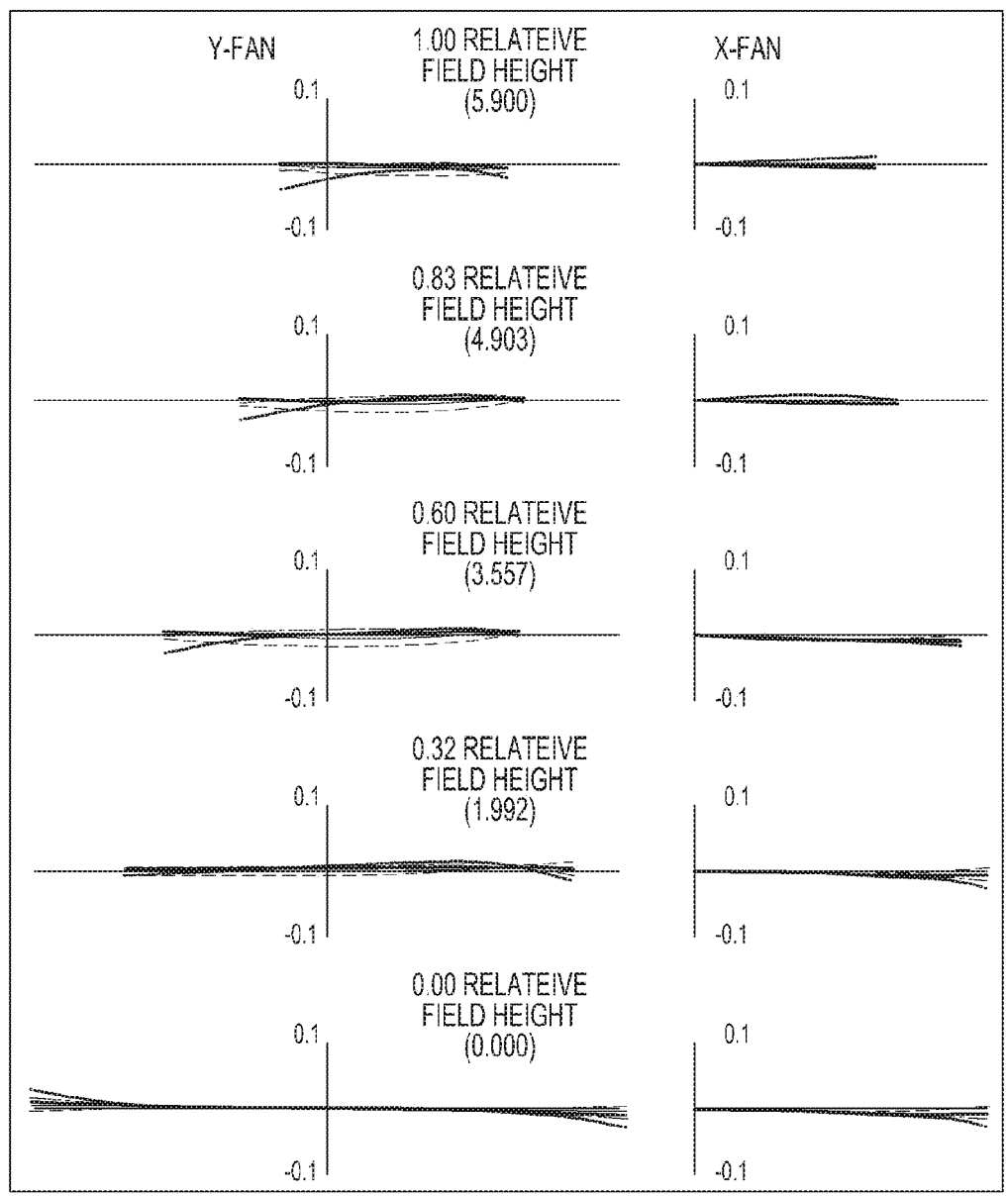
Figure 35A:
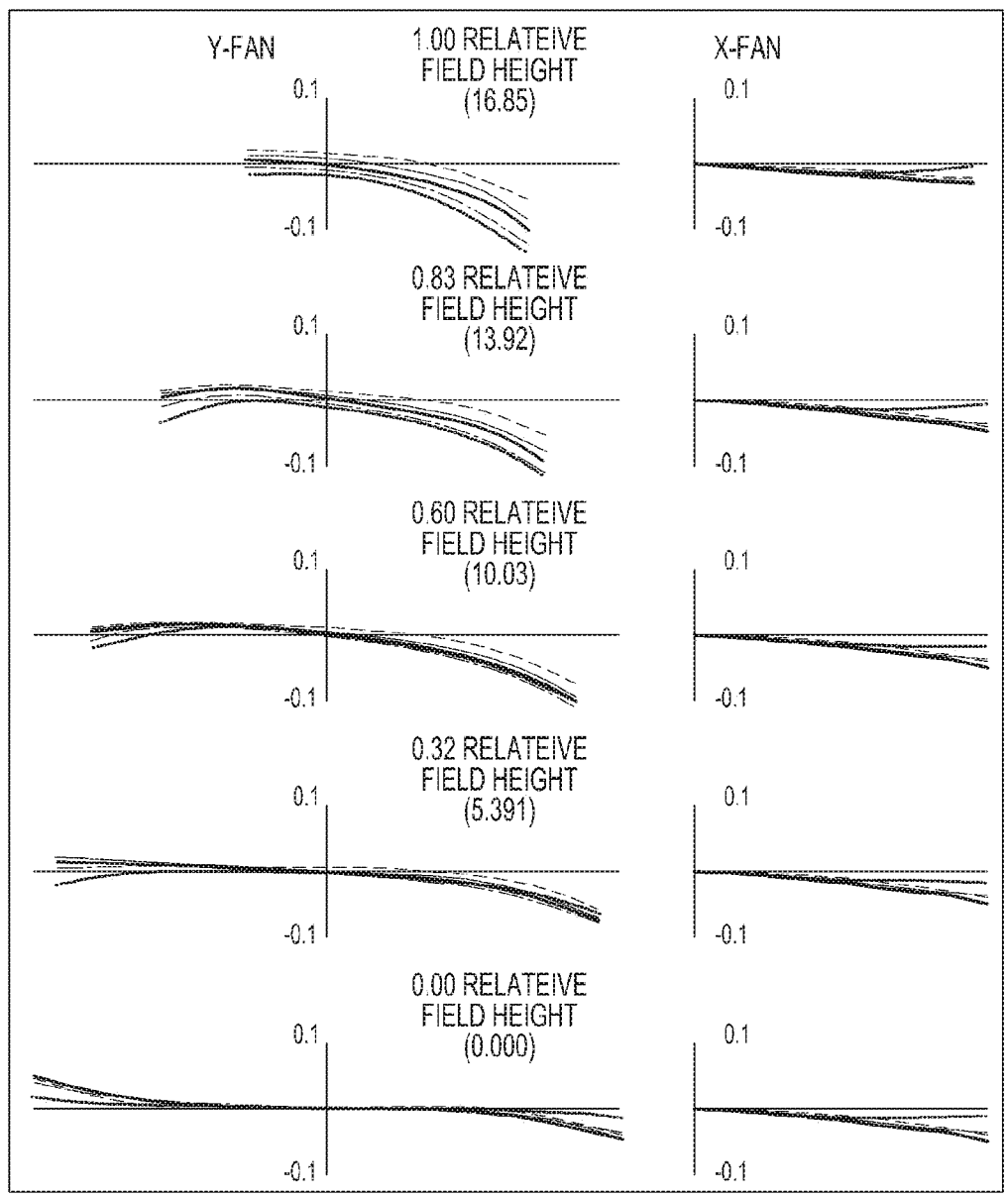
FIGS. 35A-35C are diagrams illustrating the horizontal aberration of the wide-angle end, the middle end, and the telephoto end in the case of the shortest object distance in the optical system, according to an embodiment of the present disclosure.
Figure 35B:
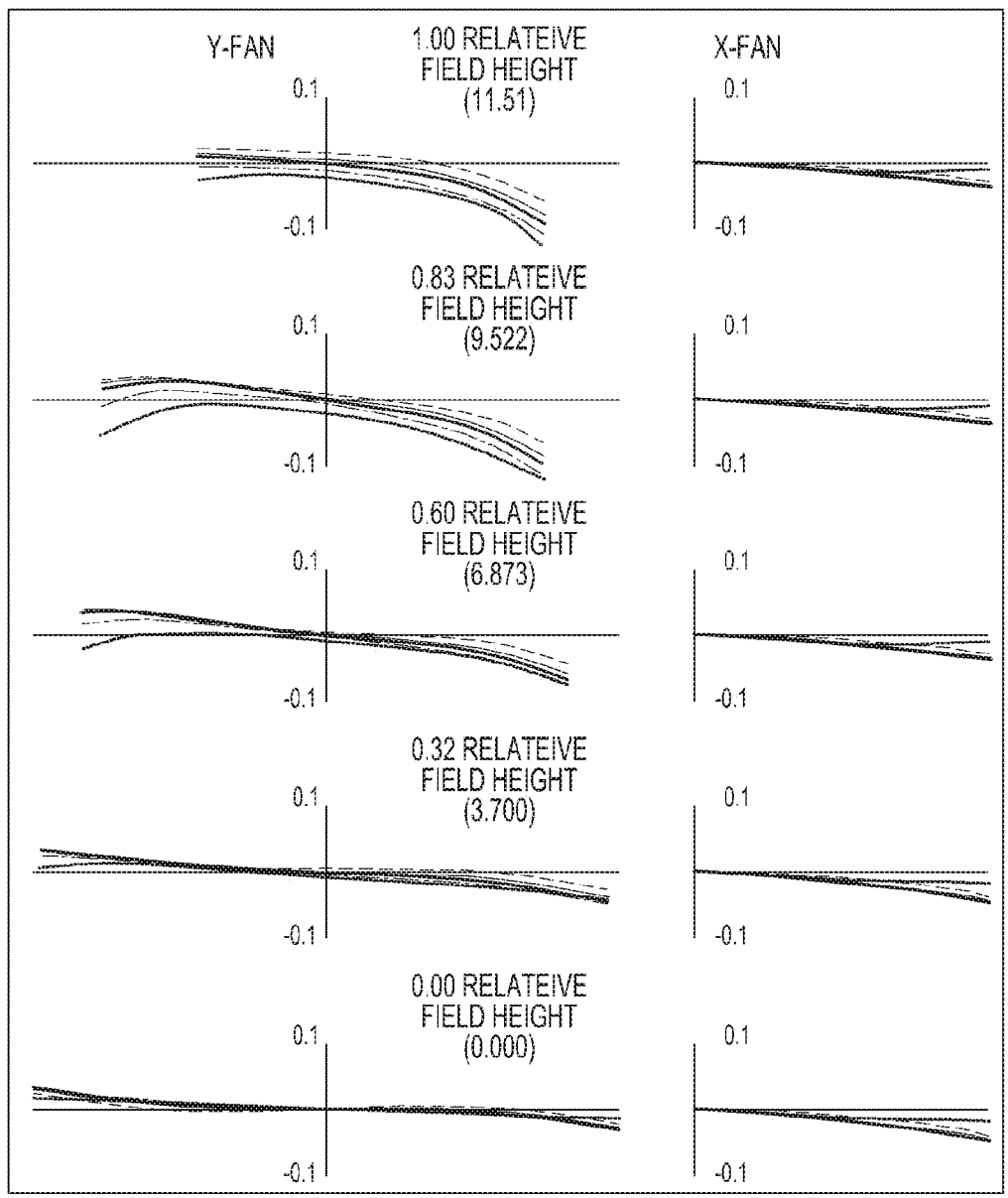
Figure 35C:
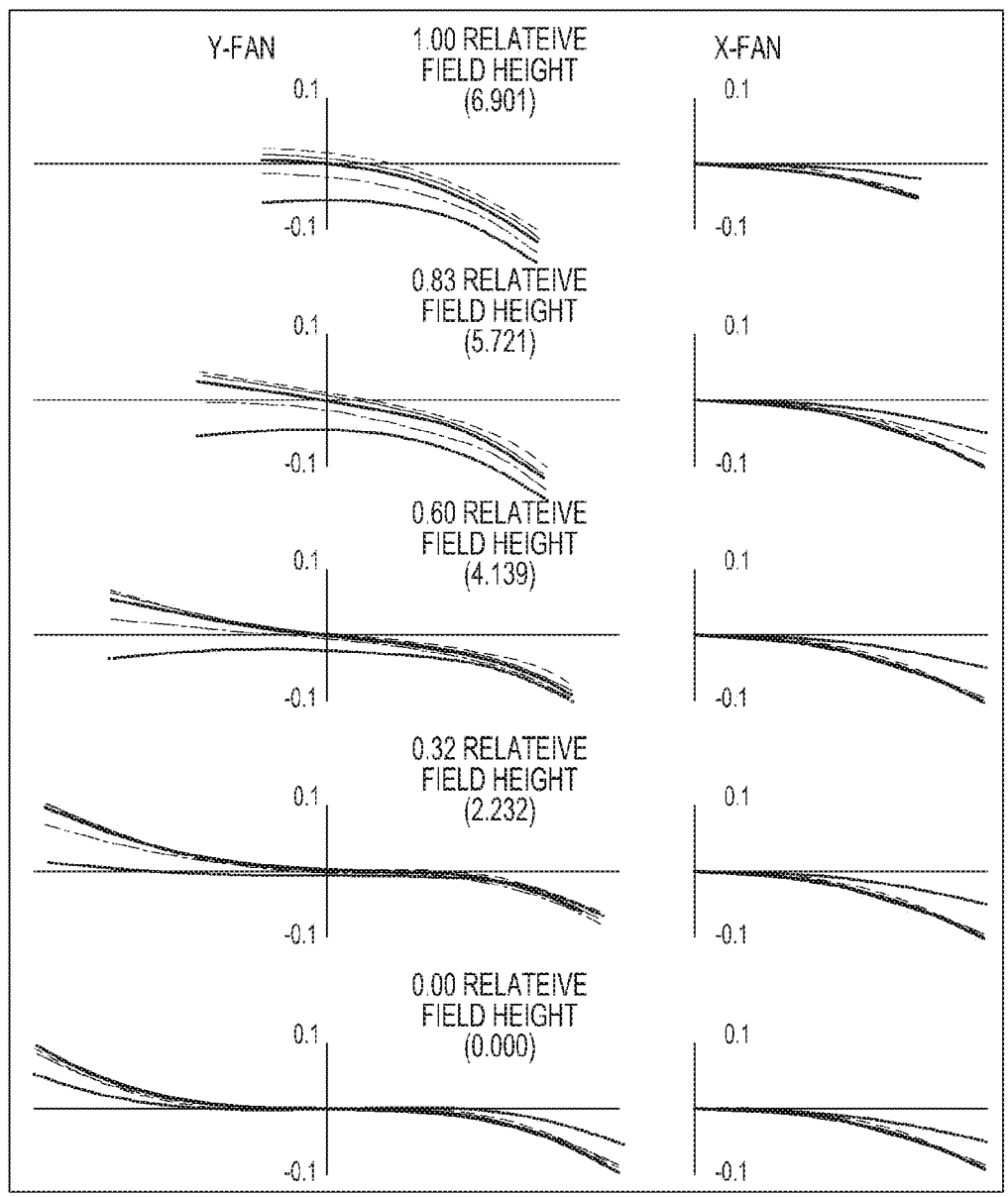
Figure 36A:
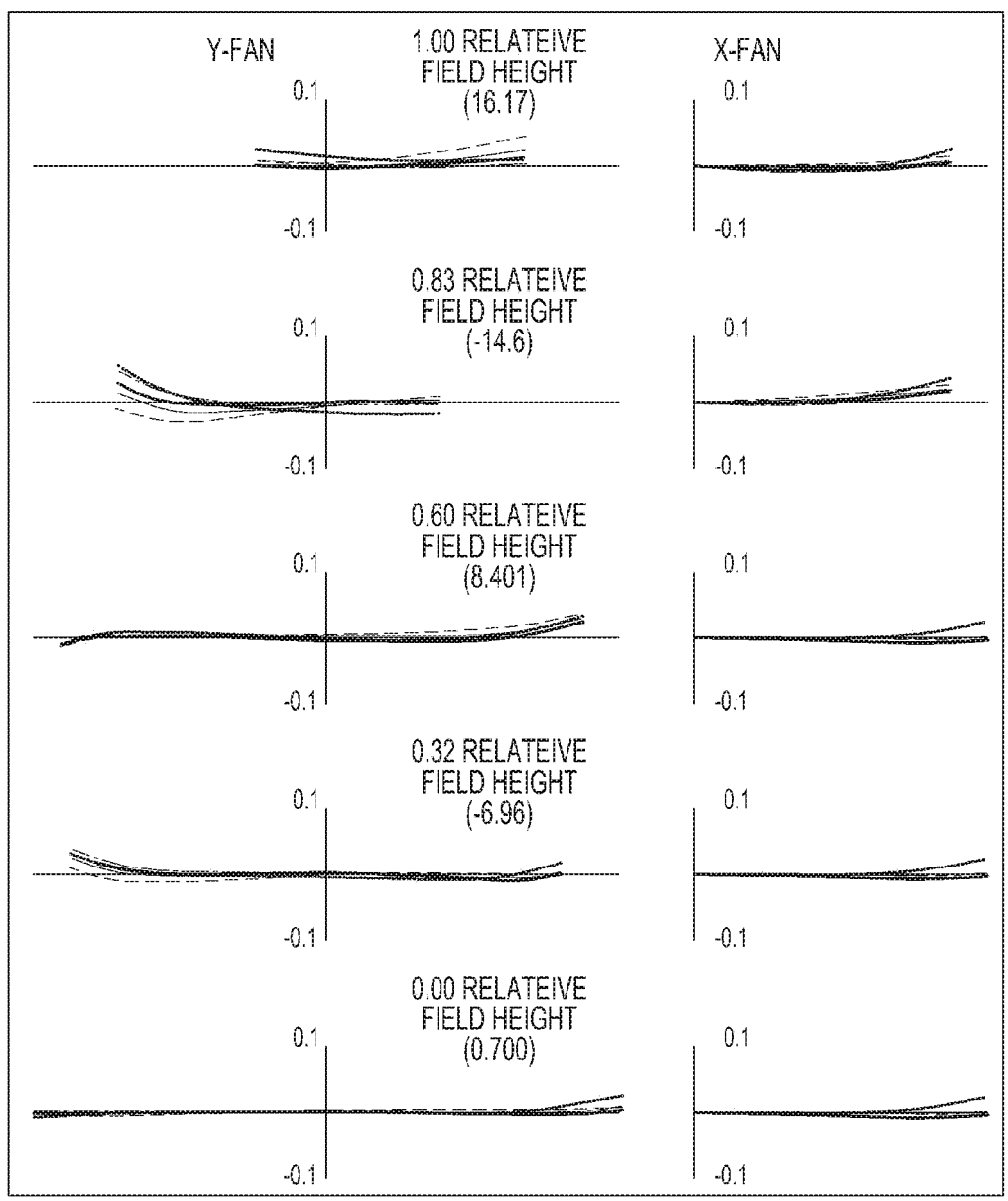
FIGS. 36A-36C are diagrams illustrating the horizontal aberration in the case of an infinite object distance and in the case of image stabilizations of 0.7 degrees, 0.55 degrees, and 0.4 degrees at a wide-angle end, a middle end, and a telephoto end, respectively, in the optical system, according to an embodiment of the present disclosure.
Figure 36B:
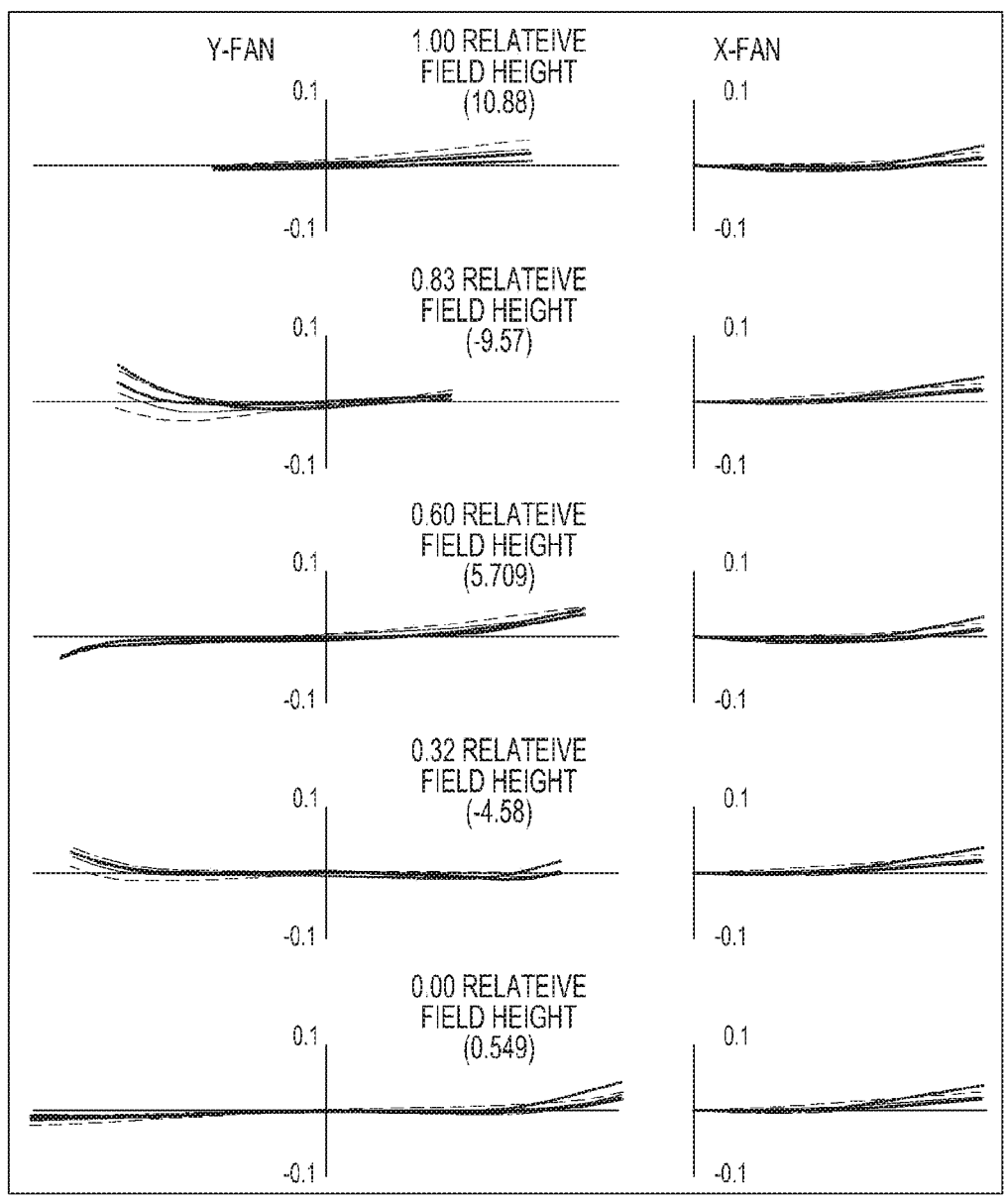
Figure 36C:
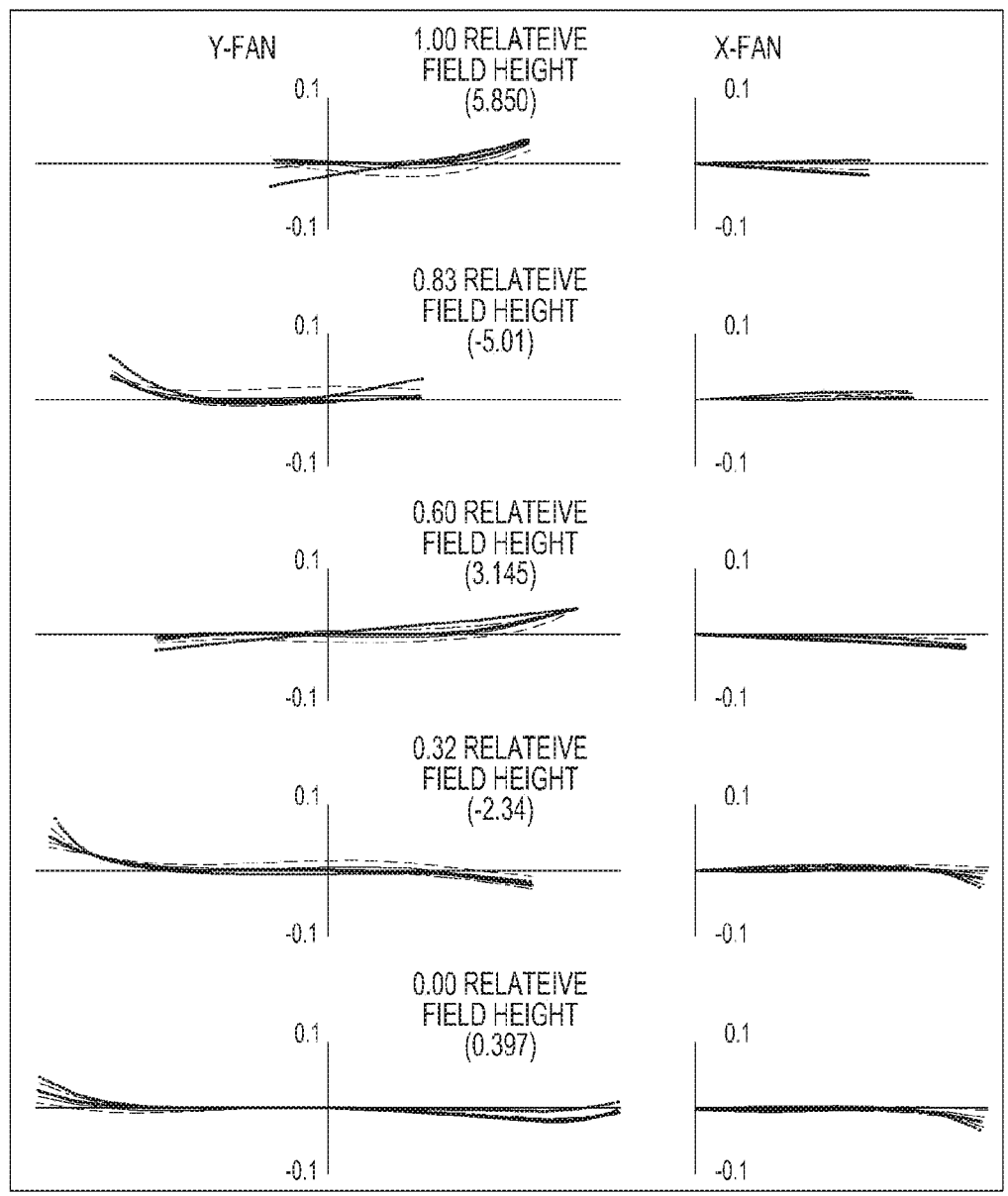

FIGS. 34A-34C are diagrams illustrating the horizontal aberration of the wide-angle end, the middle end, and the telephoto end in the case of an infinite object distance in the optical system 100 o, according to an embodiment of the present disclosure. FIGS. 35A-35C are diagrams illustrating the horizontal aberration of the wide-angle end, the middle end, and the telephoto end in the case of the shortest object distance in the optical system 100, according to an embodiment of the present disclosure. FIGS. 36A-36C are diagrams illustrating the horizontal aberration in the case of an infinite object distance and in the case of image stabilizations of 0.7 degrees, 0.55 degrees, and 0.4 degrees at a wide-angle end, a middle end, and a telephoto end, respectively, in the optical system 100, according to an embodiment of the present disclosure.

TABLE 11

| EFL: | 74.65 mm | FNO: | 2.89 | 2w: | 33.47 |
|---|---|---|---|---|---|
| EFL: | 208.40 mm | FNO: | 2.89 | 2w: | 11.8 |
| Surf | Radius | Thick | Ind | | Abv |
| 1 | 124.564 | 2.5 | 1.81264 | | 25.5 |
| 2 | 77.793 | 0.1 | | | |
| 3 | 77.592 | 11.98 | 1.49845 | | 81.6 |
| 4 | 1204.93 | 0.2 | | | |
| 5 | 90.12 | 10.09 | 1.49845 | | 81.6 |
| 6 | 1457.659 | 2.73 | | | |
| 7 | −943.986 | 5.51 | 1.91048 | | 31.3 |
| 8 | −62.15 | 1.85 | 1.73115 | | 54.4 |
| 9 | 82.029 | 2.56 | | | |
| 10 | −1050.379 | 1.6 | 1.77621 | | 49.6 |
| 11 | 32.701 | 6.39 | 1.8552 | | 23.8 |
| 12 | 102.801 | 11.28 | | | |
| 13 | −49.734 | 1.3 | 1.6805 | | 55.5 |
| 14 | 178.137 | 22.61 | | | |
| 15 | −1084.326 | 3.87 | 1.77621 | | 49.6 |
| 16 | −85.06 | 0.15 | | | |
| 17 | 98.458 | 8.64 | 1.59489 | | 68.6 |
| 18 | −50.932 | 1.6 | 1.85498 | | 23.8 |
| 19 | −196.713 | 39.44 | | | |
| STO | Infinity | 2.5 | | | |
| 21 | 61.662 | 6.62 | 1.49845 | | 81.6 |
| 22 | −199.036 | 0.16 | | | |
| 23 | 59.234 | 3.97 | 1.6998 | | 55.5 |
| 24 | 76.002 | 22.96 | | | |
| 25 | −295.128 | 3.89 | 1.85565 | | 23.9 |
| 26 | −46.583 | 2 | 1.72284 | | 42.6 |
| 27 | 42.568 | 4.74 | | | |
| 28 | 89.068 | 3.26 | 1.84353 | | 40.2 |
| 29 | 2579.184 | 0.34 | | | |
| 30 | 111.034 | 7.88 | 1.49845 | | 81.6 |
| 31 | −30.555 | 1.5 | 1.85069 | | 25.1 |
| 32 | −555.057 | 3.91 | | | |
| 33 | 74.187 | 6.3 | 1.8585 | | 24.3 |
| 34 | −95.231 | 1.6 | 1.79575 | | 44.9 |
| 35 | 144.603 | 46.47 | | | |
| IMG | | | | | |

TABLE 12

| | | | | | | |
|---|---|---|---|---|---|---|
| f | 74.65 | 111.29 | 208.40 | | | |
| D0 | infinity | infinity | infinity | 746.60 | 1046.60 | 1046.60 |
| D1 | 2.73 | 28.79 | 54.49 | 2.73 | 28.79 | 54.49 |
| D2 | 11.28 | 8.95 | 14.54 | 8.29 | 4.68 | 3.23 |
| D3 | 22.61 | 18.07 | 5.56 | 25.60 | 22.34 | 16.86 |
| D4 | 39.44 | 20.28 | 1.50 | 39.44 | 20.28 | 1.50 |
| | 0.7 deg | 0.55 deg | 0.4 deg | | | |
| OIS Shift | 0.83 | 0.97 | 1.31 | | | |

Seventh Embodiment

Table 13 below shows numerical values according to Equation (1) to Equation (14), and Table 14 below shows the air gap between the infinite group and the closest group and shows the amount of shift required for the lens group G5B when the optical system 100 is corrected by 0.7 degrees, 0.55 degrees, and 0.4 degrees at the wide-angle end, the middle end, and the telephoto end, respectively, in the optical system 100.

Figure 37:
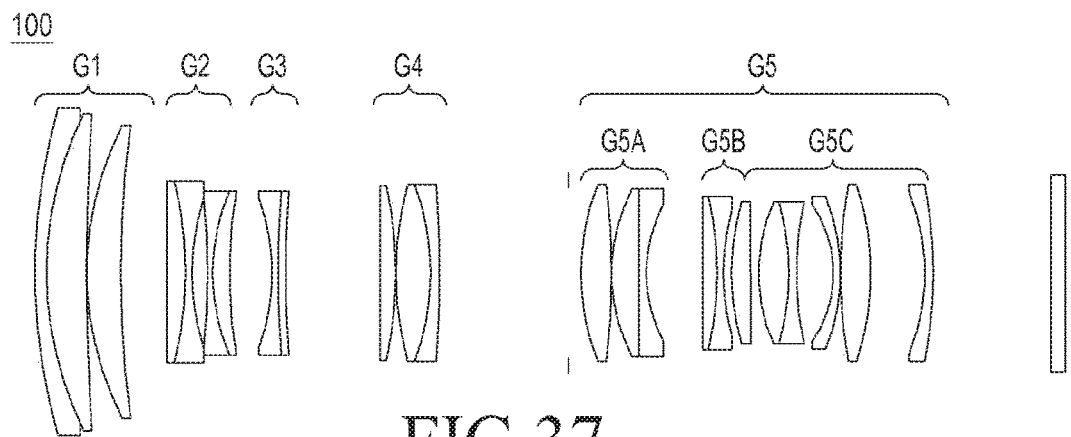
FIG. 37 is a diagram illustrating the lens array of a wide-angle end in the optical system, according to an embodiment of the present disclosure.
Figure 38:
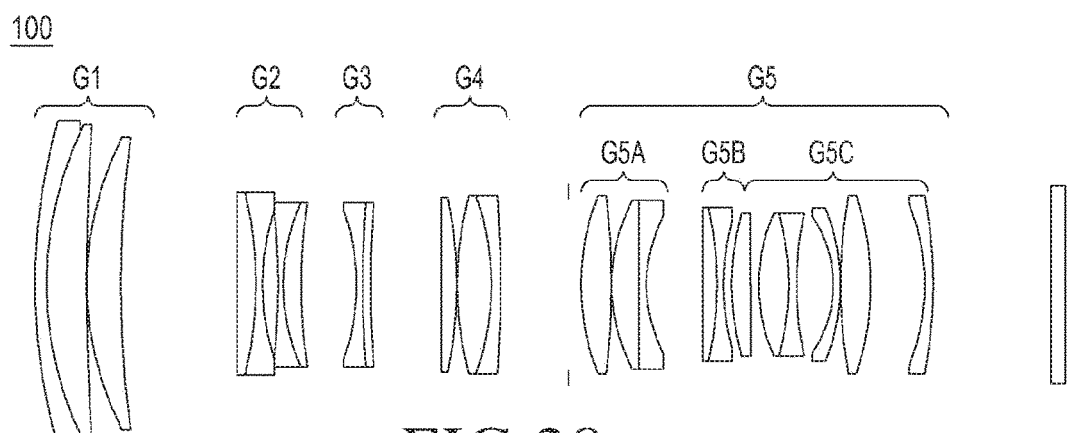
FIG. 38 is a diagram illustrating the lens array of a middle end in the optical system, according to an embodiment of the present disclosure.
Figure 39:
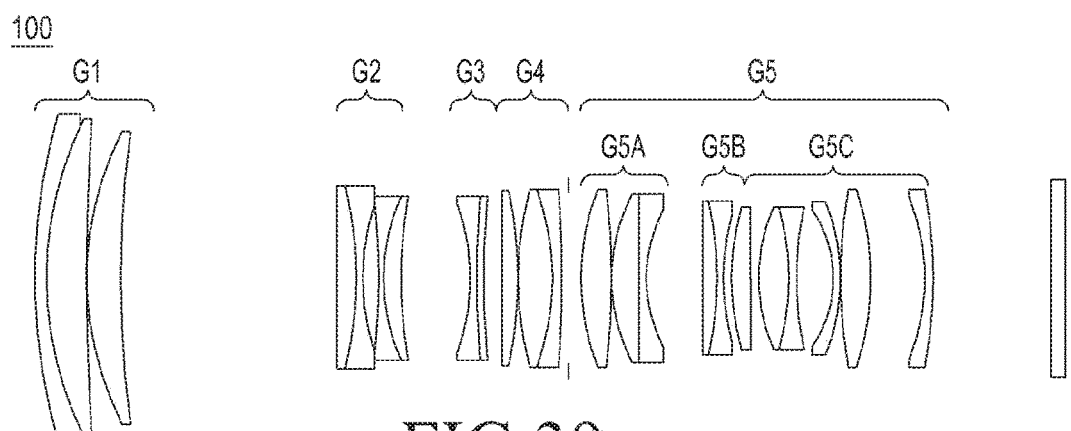
FIG. 39 is a diagram illustrating the lens array of a telephoto end in the optical system, according to an embodiment of the present disclosure.

FIG. 37 is a diagram illustrating the lens array of the wide-angle end in the optical system 100, according to an embodiment of the present disclosure. FIG. 38 is a diagram illustrating the lens array of the middle end in the optical system 100, according to an embodiment of the present disclosure. FIG. 39 is a diagram illustrating the lens array of the telephoto end in the optical system 100, according to an embodiment of the present disclosure.

Figure 40A:
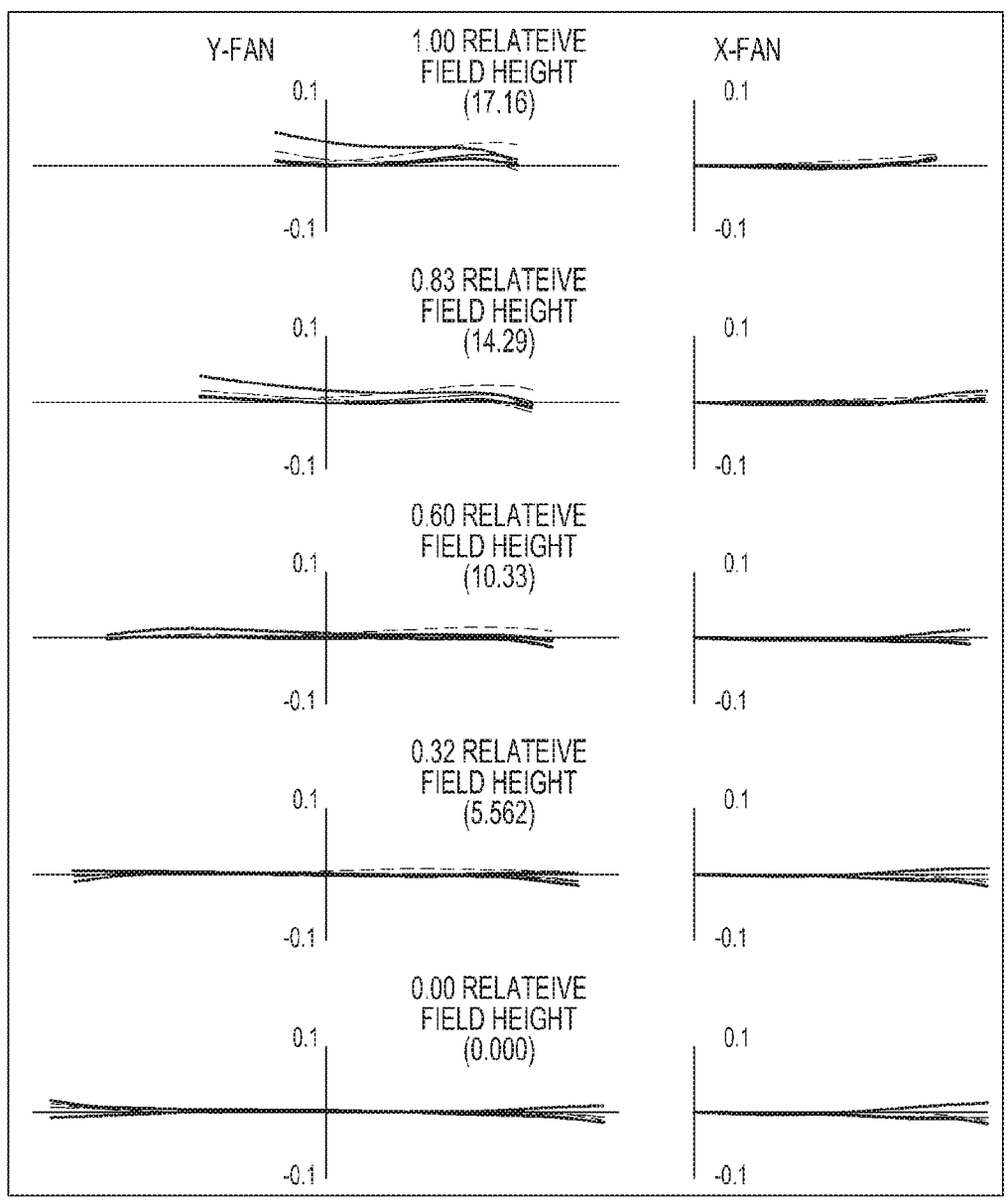
FIGS. 40A-40C are diagrams illustrating the horizontal aberration of the wide-angle end, the middle end, and the telephoto end in the case of an infinite object distance in the optical system, according to an embodiment of the present disclosure.
Figure 40B:
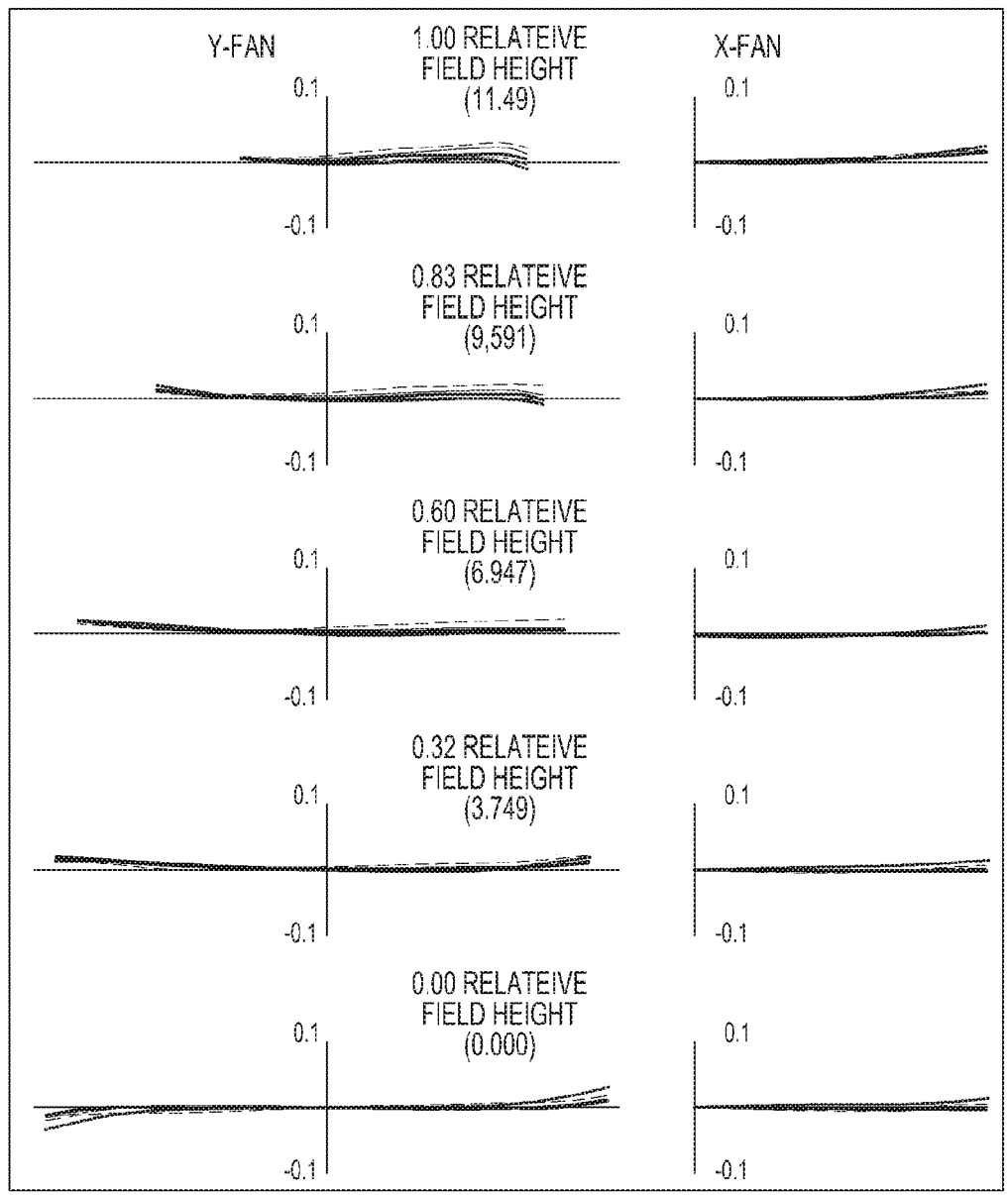
Figure 40C:
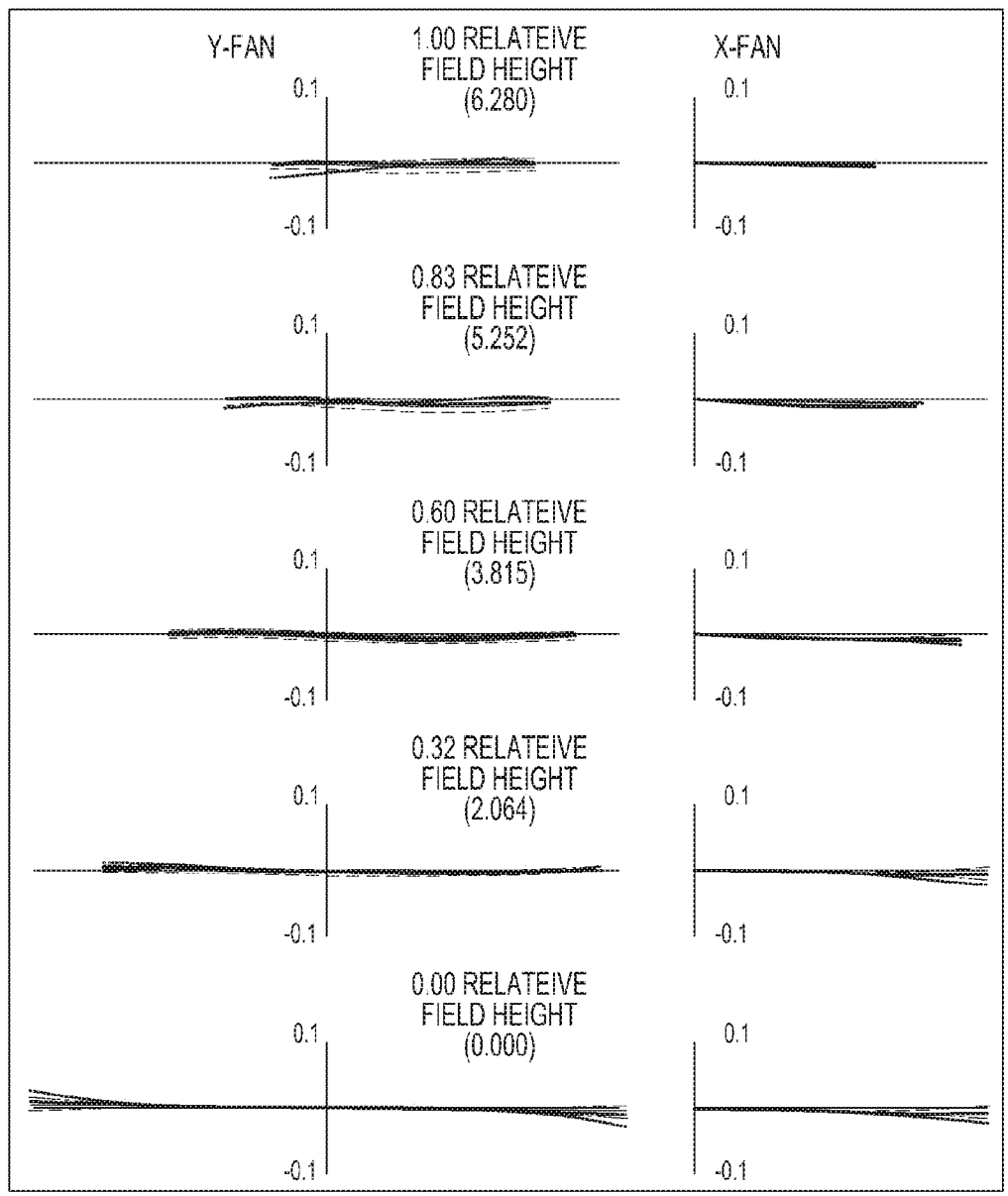
Figure 41A:
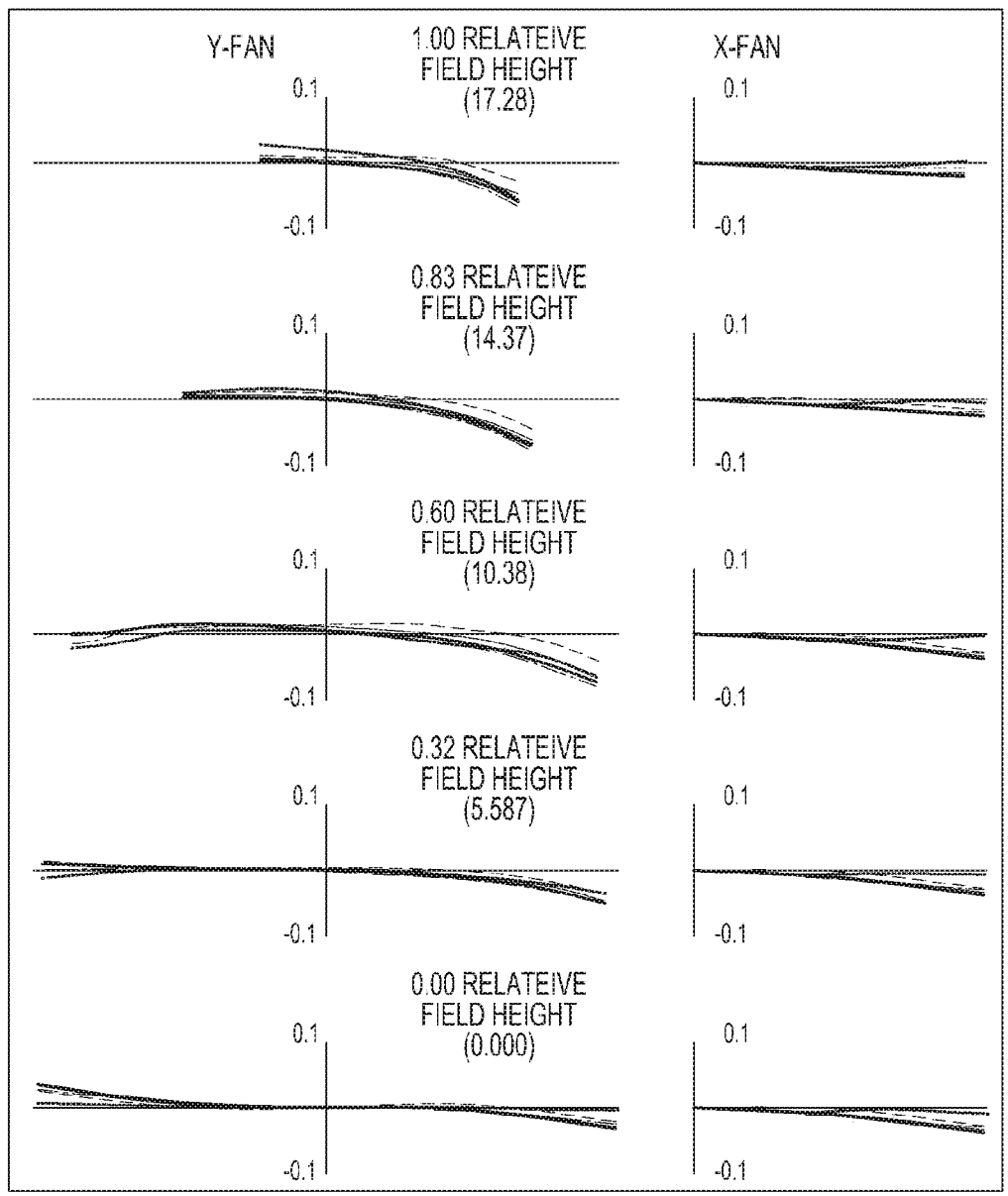
FIGS. 41A-41C are diagrams illustrating the horizontal aberration of the wide-angle end, the middle end, and the telephoto end in the case of the shortest object distance in the optical system, according to an embodiment of the present disclosure.
Figure 41B:
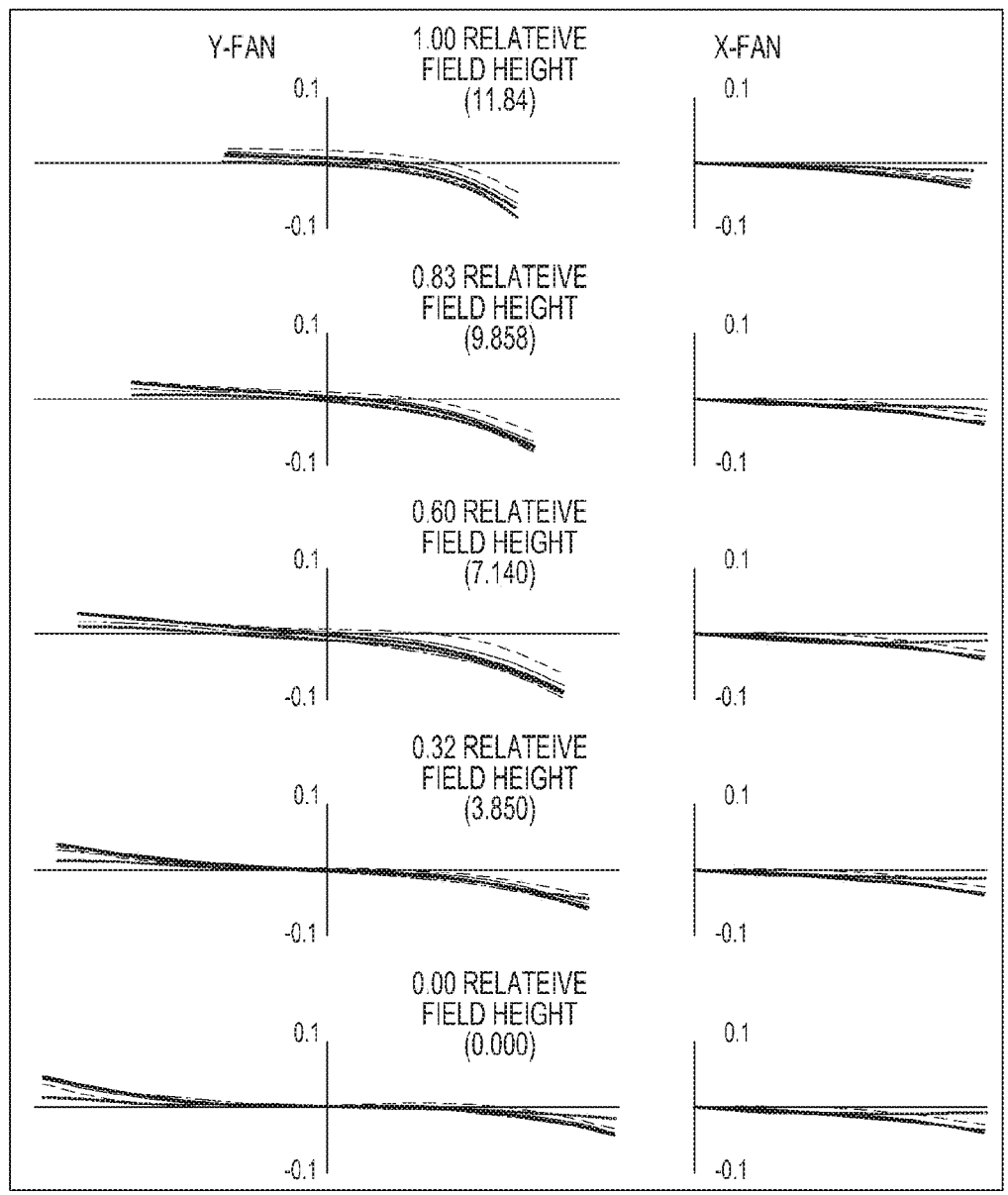
Figure 41C:
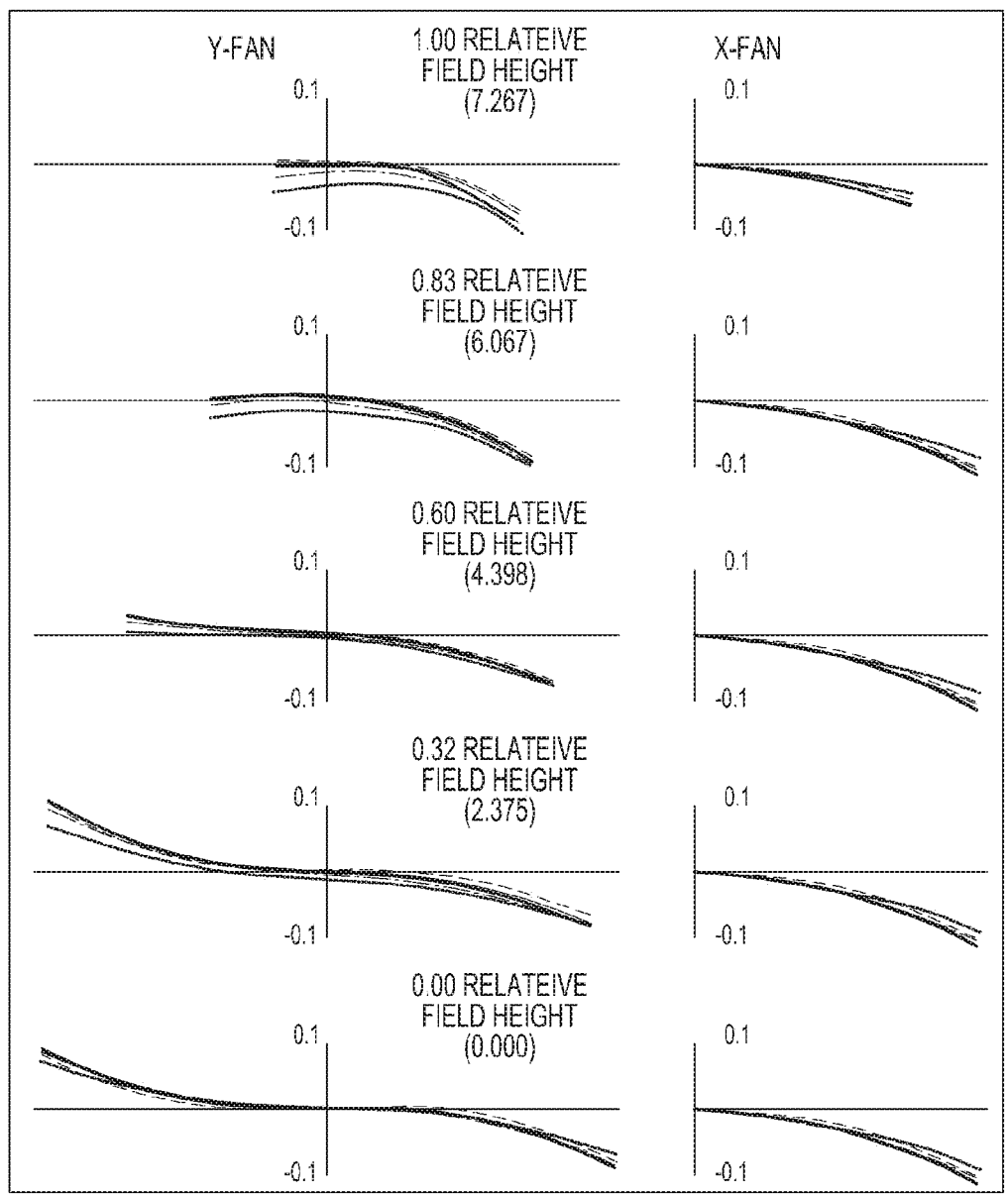
Figure 42A:
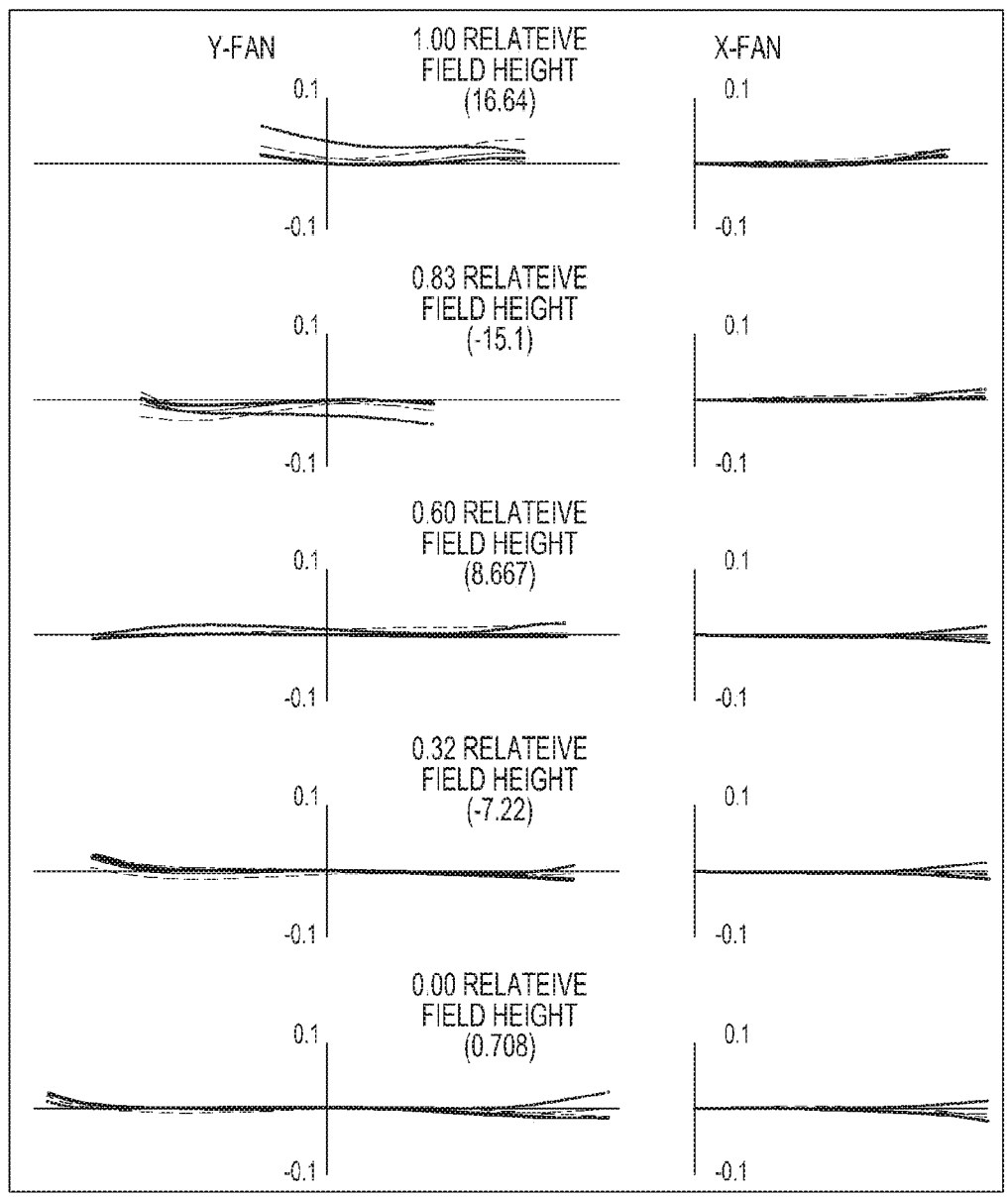
FIGS. 42A-42C are diagrams illustrating the horizontal aberration in the case of an infinite object distance and in the case of image stabilizations of 0.7 degrees, 0.55 degrees, and 0.4 degrees at a wide-angle end, a middle end, and a telephoto end, respectively, in the optical system, according to an embodiment of the present disclosure.
Figure 42B:
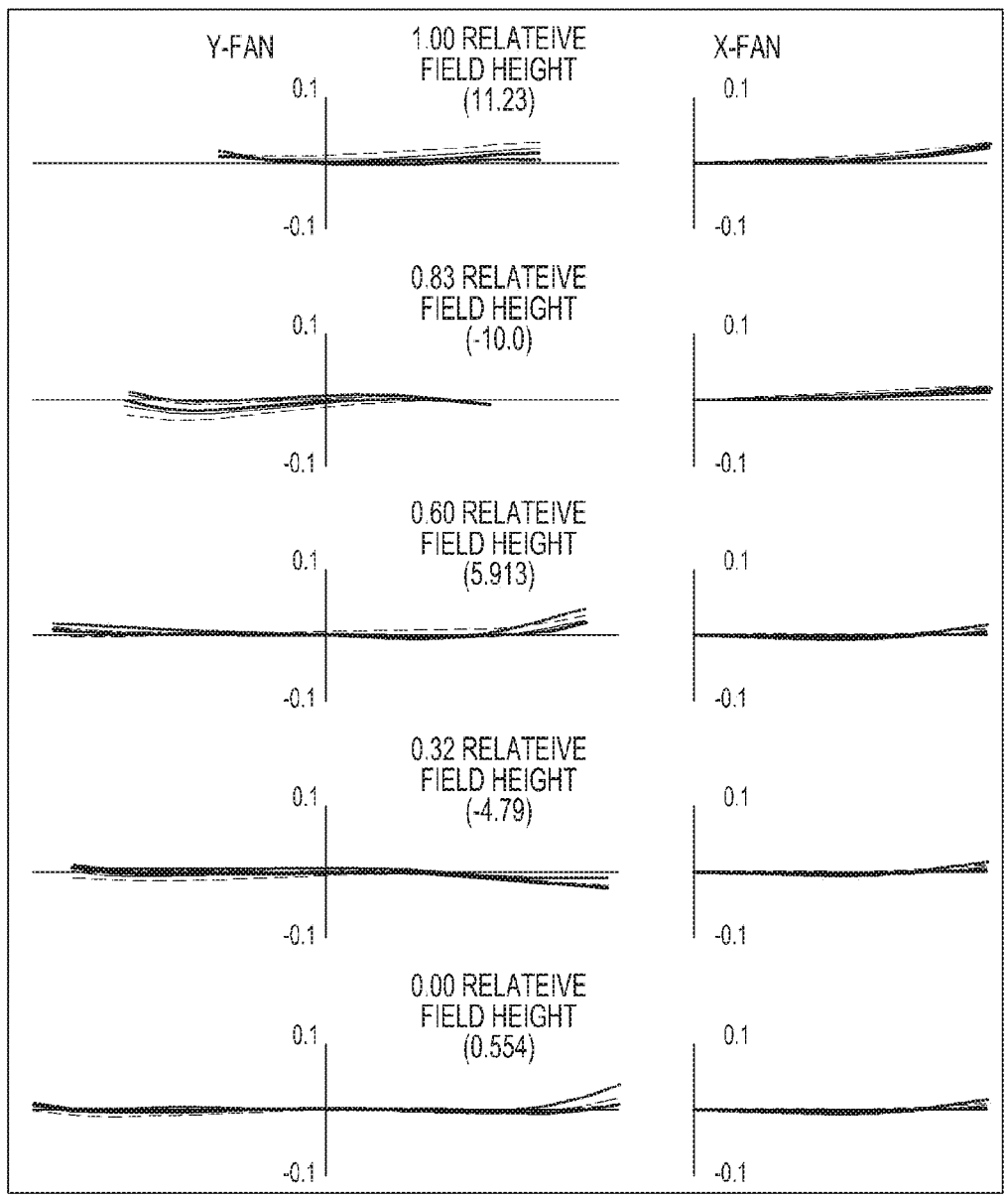
Figure 42C:
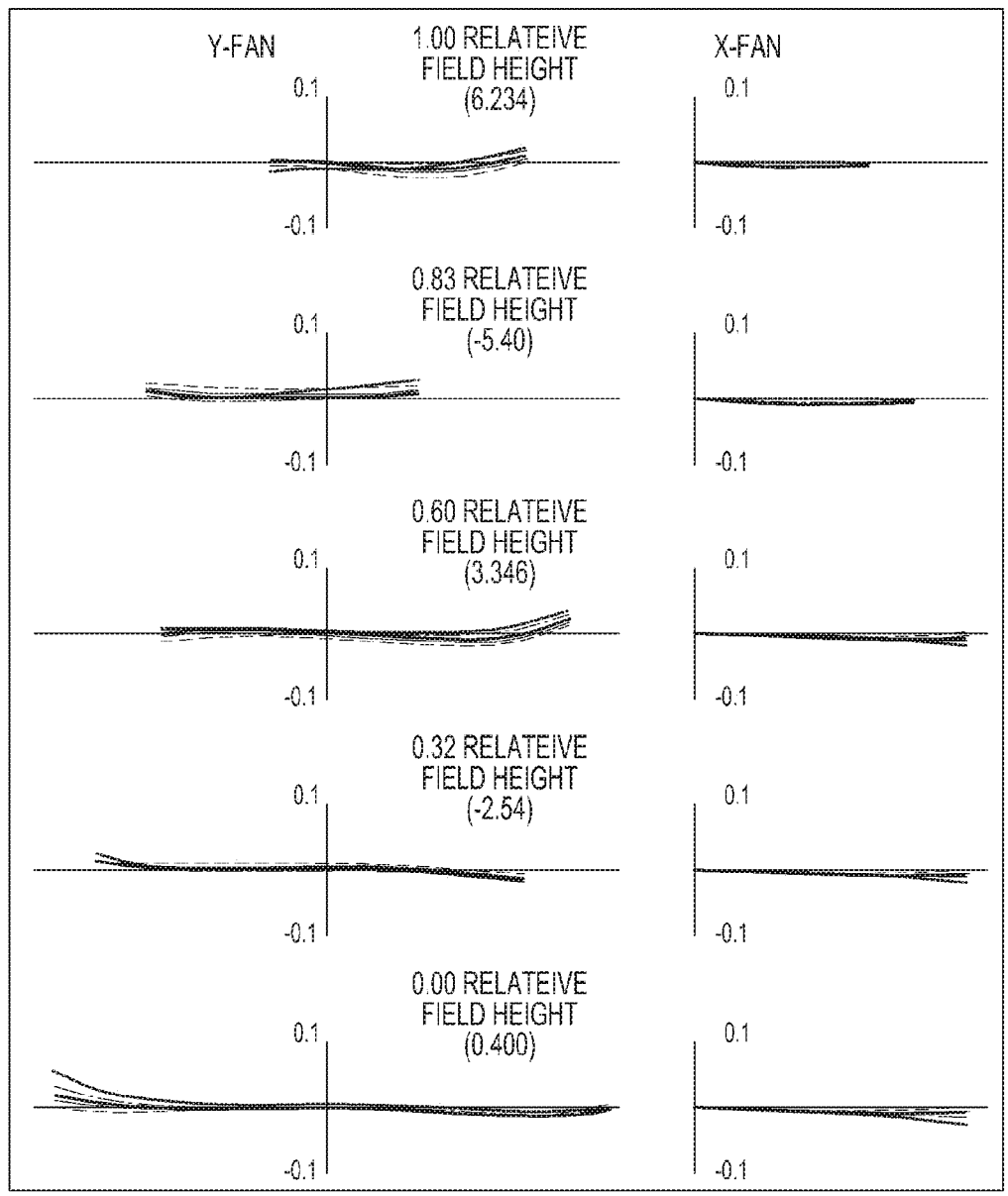

FIGS. 40A-40C are diagrams illustrating the horizontal aberration of the wide-angle end, the middle end, and the telephoto end in the case of an infinite object distance in the optical system 100, according to an embodiment of the present disclosure. FIGS. 41A-41C are diagrams illustrating the horizontal aberration of the wide-angle end, the middle end, and the telephoto end in the case of the shortest object distance in the optical system 100, according to an embodiment of the present disclosure. FIGS. 42A-42C are diagrams illustrating the horizontal aberration in the case of an infinite object distance and in the case of image stabilizations of 0.7 degrees, 0.55 degrees, and 0.4 degrees at the wide-angle end, the middle end, and the telephoto end, respectively, in the optical system 100, according to an embodiment of the present disclosure.

TABLE 13

| EFL: | 72.10 mm | FNO: | 2.88 | 2w: | 34.31 |
| EFL: | 194.00 mm | FNO: | 2.88 | 2w: | 12.56 |

| Surf | Radius | Thick | Ind | Abv |
|---|---|---|---|---|
| 1 | 134.797 | 2.3 | 1.81419 | 25.1 |
| 2 | 88.435 | 0.38 | | |
| 3 | 92.885 | 9.6 | 1.4381 | 95.1 |
| 4 | −792.336 | 0.2 | | |
| 5 | 82.59 | 8.61 | 1.49845 | 81.6 |
| 6 | 1383.731 | 2 | | |
| 7 | −10721.204 | 4.13 | 1.91048 | 31.3 |
| 8 | −80.584 | 1.35 | 1.6602 | 58.1 |
| 9 | 79.716 | 2.8 | | |
| 10 | −313.514 | 1.3 | 1.80831 | 46.5 |
| 11 | 42.732 | 4.15 | 1.85505 | 23.8 |
| 12 | 97.978 | 17.24 | | |
| 13 | −52.4 | 1.3 | 1.59561 | 67 |
| 14 | 107.637 | 2.2 | 1.82478 | 27.2 |
| 15 | 185 | 21.43 | | |
| 16 | 1971.353 | 3.59 | 1.80267 | 47 |
| 17 | −97.203 | 0.15 | | |
| 18 | 87.002 | 7.31 | 1.59489 | 68.6 |
| 19 | −54.971 | 1.35 | 1.91048 | 31.3 |
| 20 | −412.099 | 30.9 | | |
| STO | Infinity | 2.7 | | |
| 22 | 50.078 | 6.48 | 1.49845 | 81.6 |
| 23 | −172.82 | 0.15 | | |
| 24 | 32.77 | 7.59 | 1.62503 | 53.5 |
| 25 | −269.164 | 1.84 | 1.76651 | 40.1 |
| 26 | 29.295 | 12.99 | | |
| 27 | −265.476 | 3.47 | 1.85505 | 23.8 |
| 28 | −42.82 | 1.2 | 1.70876 | 39.5 |
| 29 | 53.764 | 2.65 | | |
| 30 | 58.743 | 4.21 | 1.81081 | 40.7 |
| 31 | −235.474 | 0.15 | | |
| 32 | 38.784 | 7.25 | 1.49845 | 81.6 |
| 33 | −53.574 | 1.47 | 1.91695 | 35.2 |
| 34 | 53.867 | 9.25 | | |
| 35 | −27.37 | 1.83 | 1.59489 | 68.6 |
| 36 | −42.362 | 0.15 | | |
| 37 | 87.666 | 7.12 | 1.62997 | 37.3 |
| 38 | −47.128 | 12.46 | | |
| 39 | −36.611 | 1.6 | 1.79196 | 47.4 |
| 40 | −69.492 | 32.11 | | |
| IMG | | | | |

TABLE 14

| f | 72.10 | 106.89 | 194.00 | | | |
|---|---|---|---|---|---|---|
| D0 | infinity | infinity | infinity | 962.00 | 962.00 | 962.00 |
| D1 | 2.00 | 24.95 | 48.18 | 2.00 | 24.95 | 48.18 |
| D2 | 17.24 | 13.46 | 19.11 | 14.52 | 8.24 | 6.23 |
| D3 | 21.43 | 16.64 | 3.00 | 24.14 | 21.85 | 15.89 |
| D4 | 30.90 | 16.57 | 1.30 | 30.90 | 16.57 | 1.30 |
| | 0.7 deg | 0.55 deg | 0.4 deg | | | |
| OIS Shift | 0.94 | 1.09 | 1.43 | | | |

TABLE 15

| | | 1st embodiment | 2nd embodiment | 3rd embodiment | 4th embodiment | 5th embodiment | 6th embodiment | 7th embodiment |
|---|---|---|---|---|---|---|---|---|
| (1) | $|fT/f12T|$ | −0.113 | 0.095 | −0.054 | −0.023 | −0.113 | 0.121 | −0.070 |
| (2) | $|(R1 + R2)/(R1 - R2)|$ | −0.650 | −0.683 | −0.602 | | −0.723 | −0.563 | −0.559 |
| (3) | T Punt Sens * f3/fT | −0.834 | −0.724 | −0.819 | −0.749 | −0.836 | −0.674 | −0.799 |
| (4) | $0.7 \leq \frac{(1 - m_{focus,T}^2) \cdot m_{rear,T}^2}{(1 - m_{focus,W}^2) \cdot m_{rear,W}^2} \leq 1.4$ | 1.201 | 1.128 | 1.187 | 1.146 | 1.193 | 1.092 | 1.179 |
| (5) | $|fT/f34T|$ | −0.100 | −0.464 | −0.201 | −0.157 | −0.120 | −0.369 | −0.135 |
| (6) | fW/f34W + fT/f34T | 0.092 | −0.376 | −0.048 | 0.021 | 0.072 | −0.194 | 0.038 |
| (7) | 1/(fp1 × Vdp1) + 1/(fp2 + Vdp2) | 1.294E−04 | 1.263E−04 | 1.266E−04 | 1.267E−04 | 1.388E−04 | 1.376E−04 | 1.249E−04 |
| (8) | ΔPgFp1/(fp1 × Vdp1) + ΔPgFp2/ | 5.438E−06 | 4.076E−06 | 5.055E−06 | 5.068E−06 | 5.792E−06 | 4.442E−06 | 4.986E−06 |
| (9) | Vnd | 57.78 | 95.10 | 68.63 | 68.63 | 81.28 | N/A | 68.63 |
| (10) | $|fT/f15BT|$ | 0.275 | 0.601 | −0.002 | 0.032 | 0.326 | 0.325 | 0.011 |
| (11) | $|(D5 \times f5B)/(f5A \times f5C)|$ | −0.140 | −0.075 | −0.149 | −0.128 | −0.139 | −0.195 | −0.137 |
| (12) | B.F.L./f5c | 0.320 | 0.240 | 0.443 | 0.422 | 0.364 | 0.500 | 0.437 |
| (13) | N3p − N3n | N/A | N/A | N/A | 0.210 | N/A | N/A | 0.229 |
| (14) | $(\hat{w}T(0, 1) - \hat{w}T(0))/\hat{w}T(0)$ | 0.100 | 0.118 | 0.105 | 0.116 | 0.066 | 0.125 | 0.109 |

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

An electronic device 1010 in a network environment 1000, according to an embodiment of the present disclosure, will be described with reference to FIG. 43. The electronic device 1010 includes a bus 1110, a processor 1200, a memory 1300, an input/output interface 1500, a display 1600, and a communication interface 1700. In some embodiments, the electronic device 1010 may exclude one or more elements or may add other elements thereto.

The bus 1110, for example, may include a circuit for connecting the elements 1200, 1300, and 1500 to 1700 with each other and transferring communication data (e.g., control messages and/or data) between the elements.

The processor 1200 may include at least one of a central processing unit (CPU), an application processor (AP), or a communication processor (CP). The processor 1200, for example, may process a calculation or data that is related to the control and/or communication of one or more other elements of the electronic device 1010. The processor 1200 may be referred to as a controller, and may include the controller as a part thereof, or may constitute the controller.

The memory 1300 may include a volatile and/or nonvolatile memory. For example, the memory 1300 may store instructions or data in relation to one or more other elements of the electronic device 1010. The memory 1300 may store software and/or programs 1400. For example, the programs 1400 may include a kernel 1410, middleware 1430, an application programming interface (API) 1450, and/or an application programs (or "applications") 1470. At least some of the kernel 1410, the middleware 1430, or the API 1450 may be referred to as an operating system (OS).

The kernel 1410, for example, may control or manage system resources (e.g., the bus 1110, the processor 1200, or the memory 1300), which are used to execute the operation or function that is implemented in other programs (e.g., the middleware 1430, the API 1450, or the application programs 1470). In addition, the kernel 1410 may provide an interface by which the middleware 1430, the API 1450, or the application programs 1470 may access each element of the electronic device 1010 for control or management.

The middleware 1430, for example, may play the intermediate role between the API 1450 or the application programs 1470 and the kernel 1410 to communicate with each other for the transmission and reception of data.

In addition, the middleware 1430 may process one or more operation requests that are received from the application programs 1470 according to the priority. For example, the middleware 1430 may give priority for using the system resources (e.g., the bus 1110, the processor 1200, or the memory 1300) of the electronic device 1010 to the one or more application programs 1470. For example, the middleware 1430 may perform scheduling or load balancing for the one or more operation requests by processing the one or more operation requests according to the priority given to the one or more application programs 1470.

The API 1450, for example, may be an interface by which the application programs 1470 control functions that are provided by the kernel 1410 or the middleware 1430. For example, the API 1450 may include one or more interfaces or functions (e.g., instructions) for file control, window control, image processing, or text control.

The input/output interface 1500, for example, may play the role of an interface that transfers instructions or data received from a user or other external devices to other elements of the electronic device 1010. For example, the input/output interface 1500 may output instructions or data received from the other elements of the electronic device 1010 to the user or the other external devices.

The display 1600, for example, may include a liquid crystal display (LCD), an light emitting diode (LED) display, an organic LED (OLED) display, a micro electromechanical system (MEMS) display, or an electronic paper display. For example, the display 1600 may display a variety of content (e.g., text, images, videos, icons, symbols, or the like) to the user. The display 1600 may include a touch screen, and may receive a touch input, a gesture input, a proximity input, or a hovering input by using electronic pens or a user's body part.

The communication interface 1700, for example, may configure communication between the electronic device 1010 and external devices (e.g., a first external electronic device 1020, a second external electronic device 1040, or a server 1060). For example, the communication interface 1700 may be connected to the network 1620 through wireless communication or wired communication in order to thereby communicate with the second external electronic device 1040, or the server 1060. The communication interface 1700 may include a communication processor (CP), and the communication processor may constitute one to a plurality of modules constituting the communication interface 1700. The communication processor may be included in the processor 1200.

For example, the wireless communication may use, as a cellular communication protocol, at least one of long term evolution (LTE), LTE Advance (LTE A), code division multiple access (CDMA), wideband CDMA (WCDMA), a universal mobile telecommunications system (UMTS), Wireless Broadband (WiBro), Global System for Mobile Communications (GSM), or the like. In addition, the wireless communication, for example, may include a short-range communication 1640. The short-range communication 1640, for example, may include at least one of wireless fidelity (WiFi), Bluetooth, near field communication (NFC), or a global navigation satellite system (GNSS). The GNSS, for example, may include at least one of a global positioning system (GPS), a Glonass (global navigation satellite system), a Beidou Navigation Satellite System (Beidou), or Galileo, the European global satellite based navigation system according to the usage area or bandwidth. Hereinafter, "GPS" may be interchangeably used with "GNSS" in the present specification. For example, the wired communication may include at least one of a universal serial bus (USB), a high definition multimedia interface (HDMI), recommended standard 232 (RS-232), or plain old telephone service a (POTS). The network 1620 may include at least one of the telecommunication networks, such as a computer network (e.g., local area network (LAN) or wide area network (WAN)), the Internet, or a telephone network.

The first external electronic device 1020 and the second external electronic device 1040 may be the same as, or different from, the electronic device 1010 in its type. The server 1060 may include a group of one or more servers. At least some, or all, of the operations that are executed in the electronic device 1010 may be executed by the electronic device 1020 or 1040, or the server 1060. In the case where the electronic device 1010 executes a specific function or service automatically or by request, the electronic device 1010 may make a request to the electronic device 1020 or 1040, or the server 1060 for at least some of the functions related to the function or service additionally or instead of executing the same by itself. The electronic device 1020 or 1040, or the server 1060 may execute the requested function or additional function, and may transfer the result thereof to the electronic device 1010. The electronic device 1010 may provide the requested function or service by providing the result or by additionally processing the same. To this end, for example, cloud computing, distributed computing, or client-server computing technology may be used.

Figure 43:
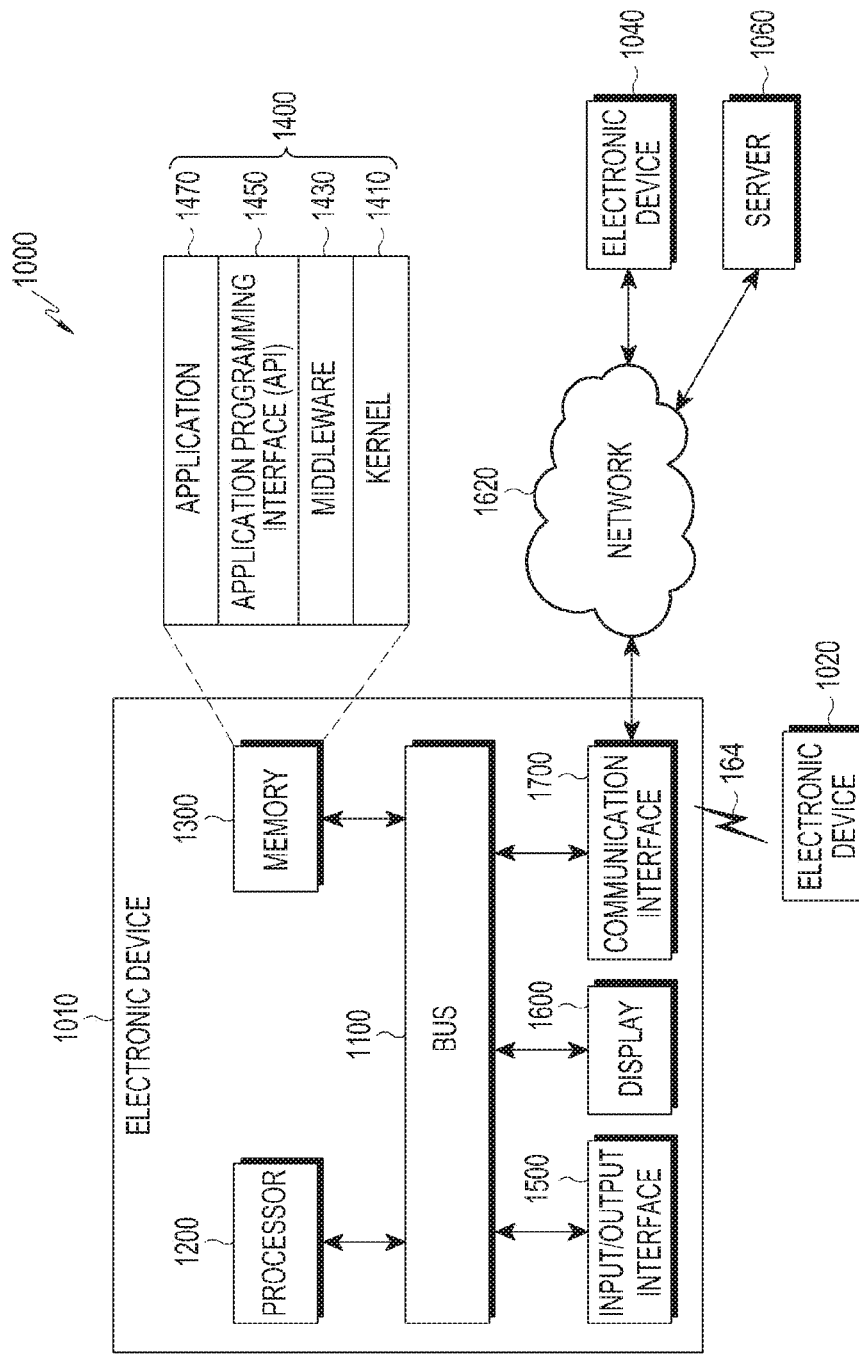
FIG. 43 is a diagram illustrating an electronic device in a network environment, according to an embodiment of the present disclosure.
Figure 44:
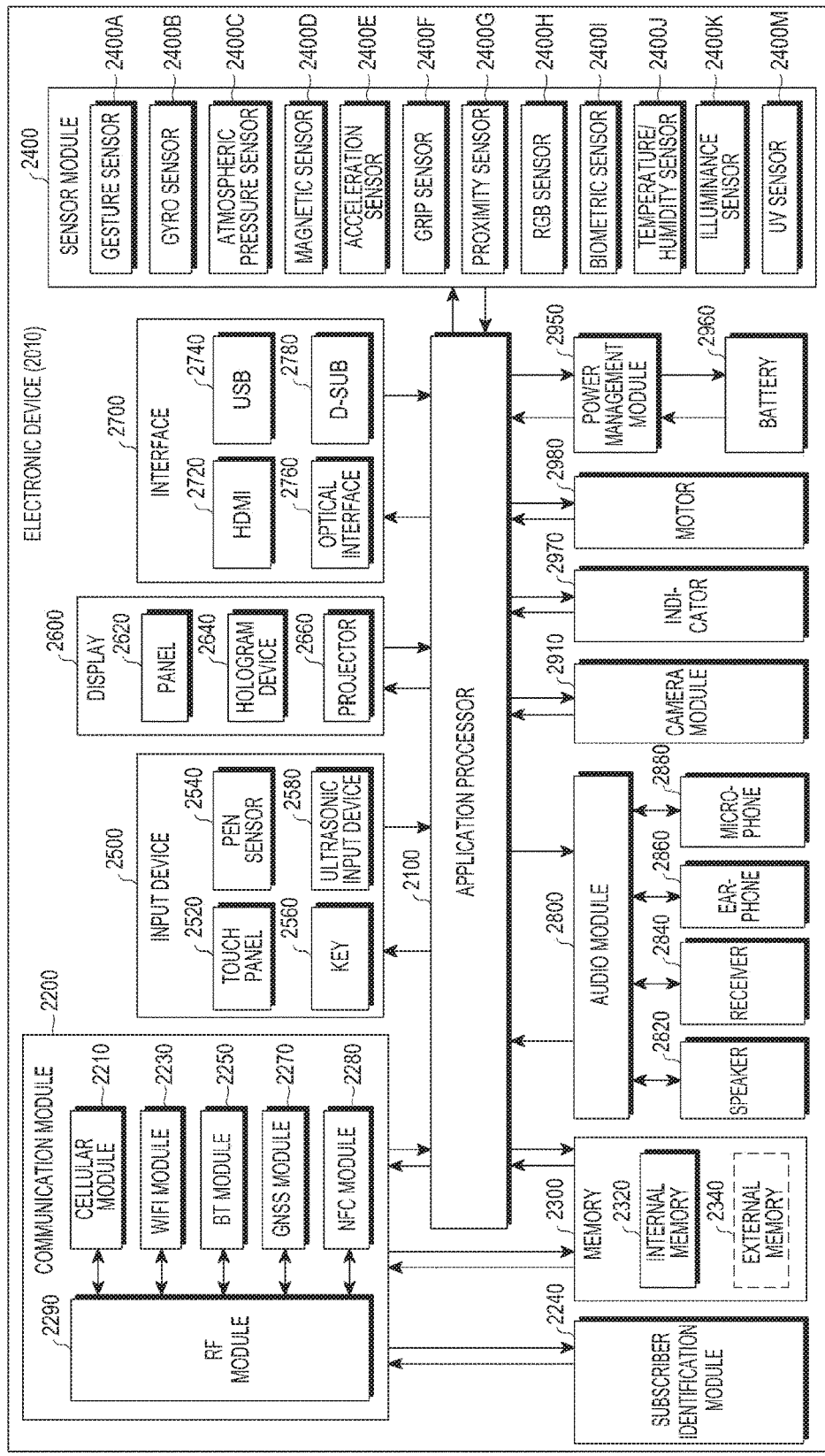
FIG. 44 is a block diagram of an electronic device, according to an embodiment of the present disclosure.

FIG. 44 is a block diagram of an electronic device 2010, according to an embodiment of the present disclosure. The electronic device 2010, for example, may include all or some of the elements of the electronic device 1010 shown in FIG. 43. The electronic device 2010 may include one or more processors (e.g., application processors (AP)) 2100, a communication module 2200, a memory 2300, a sensor module 2400, an input device 2500, and a display 2600. The electronic device 2100 may include at least one of a subscriber identification module 2240, an interface 2700, an audio module 2800, a camera module 2910, a power management module 2950, a battery 2960, an indicator 2970, or a motor 2980.

The processor 2100, for example, may control a multitude of hardware or software elements connected with the processor 2100, and may perform the processing of various pieces of data and a calculation by executing an operating system or application programs. The processor 2100 may be implemented by, for example, a system on chip (SoC). The processor 2100 may further include a graphic processing unit (GPU) and/or an image signal processor. The processor 2100 may include at least some (e.g., a cellular module 2210) of the elements shown in FIG. 44. The processor 2100 may load instructions or data received from one or more other elements (e.g., a non-volatile memory) to a volatile memory to then process the same, and may store a variety of data in a non-volatile memory.

The communication module 2200 may have the same or a similar configuration as the communication interface 1700 of FIG. 43. The communication module 2200, for example, may include at least one of the cellular module 2210, a WiFi module 2230, a Bluetooth module 2250, a GNSS module 2270 (e.g., a GPS module, a Glonass module, a Beidou module, or the Galileo module), an NFC module 2280, or a radio frequency (RF) module 2290.

The cellular module 2210, for example, may provide services of voice calls, video calls, text messaging, or the Internet through communication networks. The cellular module 2210 may perform identification and verification of the electronic device 2010 in communication networks by using the SIM 2240. The cellular module 2210 may perform at least some of the functions provided by the processor 2100. The cellular module 2210 may include a communication processor (CP).

For example, each of the WiFi module 2230, the Bluetooth module 2250, the GNSS module 2270, or the NFC module 2280 may include a processor for processing data transmitted and received through the corresponding module. At least some (e.g., two or more) of the cellular module 2210, the WiFi module 2230, the Bluetooth module 2250, the GNSS module 2270, or the NFC module 2280 may be included in one integrated chip (IC) or one IC package.

The RF module 2290 may transmit and receive communication signals (for example, RF signals). The RF module 2290 may include, for example, a transceiver, a power amp module (PAM), a frequency filter, a low noise amplifier (LNA), antennas, or the like. At least one of the cellular module 2210, the WiFi module 2230, the Bluetooth module 2250, the GNSS module 2270 and the NFC module 2280 may transmit and receive RF signals through a separate RF module.

The SIM 2240 may be an embedded SIM, and may contain inherent identification information (e.g., an integrated circuit card identifier (ICCID)) or subscriber information (e.g., an international mobile subscriber identity (IMSI)).

The memory 2300 may include an internal memory 2320 or an external memory 2340. The internal memory 2320, for example, may include at least one of volatile memories (e.g., a dynamic RAM (DRAM), a static RAM (SRAM), a synchronous dynamic RAM (SDRAM), or the like) or non-volatile Memories (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, a solid state drive (SSD), or the like).

The external memory 2340 may include a flash drive, and may further include, for example, compact flash (CF), secure digital (SD), micro secure digital (Micro-SD), mini secure digital (Mini-SD), extreme digital (xD), a memory stick, or the like. The external memory 2340 may be functionally and/or physically connected with the electronic device 2010 through various interfaces.

The sensor module 2400, for example, may measure physical quantities or may detect the operation state of the electronic device 2010 to thereby convert the measured or detected information to electric signals. The sensor module 2400 may include at least one of, for example, a gesture sensor 2400A, a gyro-sensor 2400B, an atmospheric pressure sensor 2400C, a magnetic sensor 2400D, an acceleration sensor 2400E, a grip sensor 2400F, a proximity sensor 2400G, a color sensor 2400H (e.g., a red-green-blue (RGB) sensor), a biometric sensor 2400I, a temperature/humidity sensor 2400J, an illuminance sensor 2400K, or an ultra violet (UV) sensor 2400M. Alternatively or additionally, the sensor module 2400, for example, may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2400 may further include a control circuit for controlling one or more sensors included therein. The electronic device 2010 may further include a processor as a part of the processor 2100 or separately from the processor 2100, which is configured to control the sensor module 2400 in order to thereby control sensor module 2400 while the processor 2100 is in a sleep mode.

The input device 2500, for example, may include a touch panel 2520, and the input device 2500 may include at least one of a (digital) pen sensor 2540, keys 2560, or an ultrasonic input device 2580. The touch panel 2520 may use at least one of, for example, a capacitive type, a pressure type, an infrared type, or an ultrasonic type. In addition, the touch panel 2520 may further include a control circuit. The touch panel 2520 may further include a tactile layer in order to thereby provide a user with a tactile reaction.

For example, the (digital) pen sensor 2540 may be a part of the touch panel, or may include a separate recognition sheet. The keys 2560 may include, for example, physical buttons, optical keys, or a keypad. The ultrasonic input device 2580 detects ultrasonic waves that are generated in the input means through a microphone 2880 to thereby identify data corresponding to the ultrasonic waves.

The display 2600 may include a panel 2620, and may further include a hologram device 2640 and/or a projector 2660. The panel 2620 may include the same, or a similar, configuration as the display 1600 of FIG. 43. The panel 2620 may be implemented to be, for example, flexible, transparent, or wearable. The panel 2620 may be configured with the touch panel 2520 as a single module. The hologram device 2640 may display 3D images in the air by using interference of light. The projector 2660 may display images by projecting light onto a screen. The screen may be positioned, for example, inside or outside the electronic device 2010. The display 2600 may further include a control circuit for controlling the panel 2620, the hologram device 2640, or the projector 2660.

The interface 2700 may include, for example, at least one of an HDMI 2720, a UBS 2740, an optical interface 2760, or a d-subminiature (D-sub) 2780. The interface 2700 may be included in, for example, the communication interface 1700 shown in FIG. 43. Additionally or alternatively, the interface 2700 may include, for example, a mobile high-definition link (MHL) interface, a secure digital (SD) card/multi-media card (MMC) interface, or an infrared data association (IrDA) standard interface.

The audio module 2800, for example, may convert a sound into an electric signal, and vice versa. At least some elements of the audio module 2800 may be included, for example, in the input/output interface 1500 shown in FIG. 43. For example, the audio module 2800 may process voice information that is input or output through a speaker 2820, a receiver 2840, earphones 2860, or the microphone 2880.

The camera module 2910, for example, may be a device for photographing still and moving images, and, the camera module 291 may include one or more image sensors (e.g., a front sensor or a rear sensor), lenses, an image signal processor (ISP), or a flash (e.g., an LED or a xenon lamp).

The power management module 2950, for example, may manage the power of the electronic device 2010. The power management module 2950 may include a power management integrated circuit (PMIC), a charger integrated circuit (IC), or a battery gauge. The PMIC may be implemented by a wired charging type and a wireless charging type. The wireless charging type may encompass, for example, a magnetic resonance type, a magnetic induction type, or an electromagnetic wave type, and additional circuits for wireless charging, such as coil loops, resonance circuits, or rectifiers, may be provided. The battery gauge may measure, for example, the remaining power of the battery 2960, a charging voltage, current, or temperature. The battery 2960 may include, for example, a rechargeable battery or a solar battery.

The indicator 2970 may display a specific state (for example, a booting state, a message state, or a charging state) of the whole or a part (e.g., the processor 2100) of the electronic device 2010. The motor 2980 may convert an electric signal to a mechanical vibration, and may provide a vibration or a haptic effect. Although it is not shown in the drawing, the electronic device 2010 may include a processing device (e.g., a GPU) for supporting mobile TV. The processing device for supporting mobile TV may process media data according to standards, such as, for example, digital multimedia broadcasting (DMB), digital video broadcasting (DVB), or mediaFlo™.

Each of the above-described component elements of hardware may be configured with one or more components, and the names of the corresponding component elements may vary based on the type of electronic device 2010. The electronic device 2010 may include at least one of the above-described elements. Some of the above-described elements may be omitted from the electronic device 2010, or the electronic device may further include additional elements. Also, some of the hardware components may be combined into one entity, which may perform functions identical to those of the relevant components before the combination.

Figure 45:
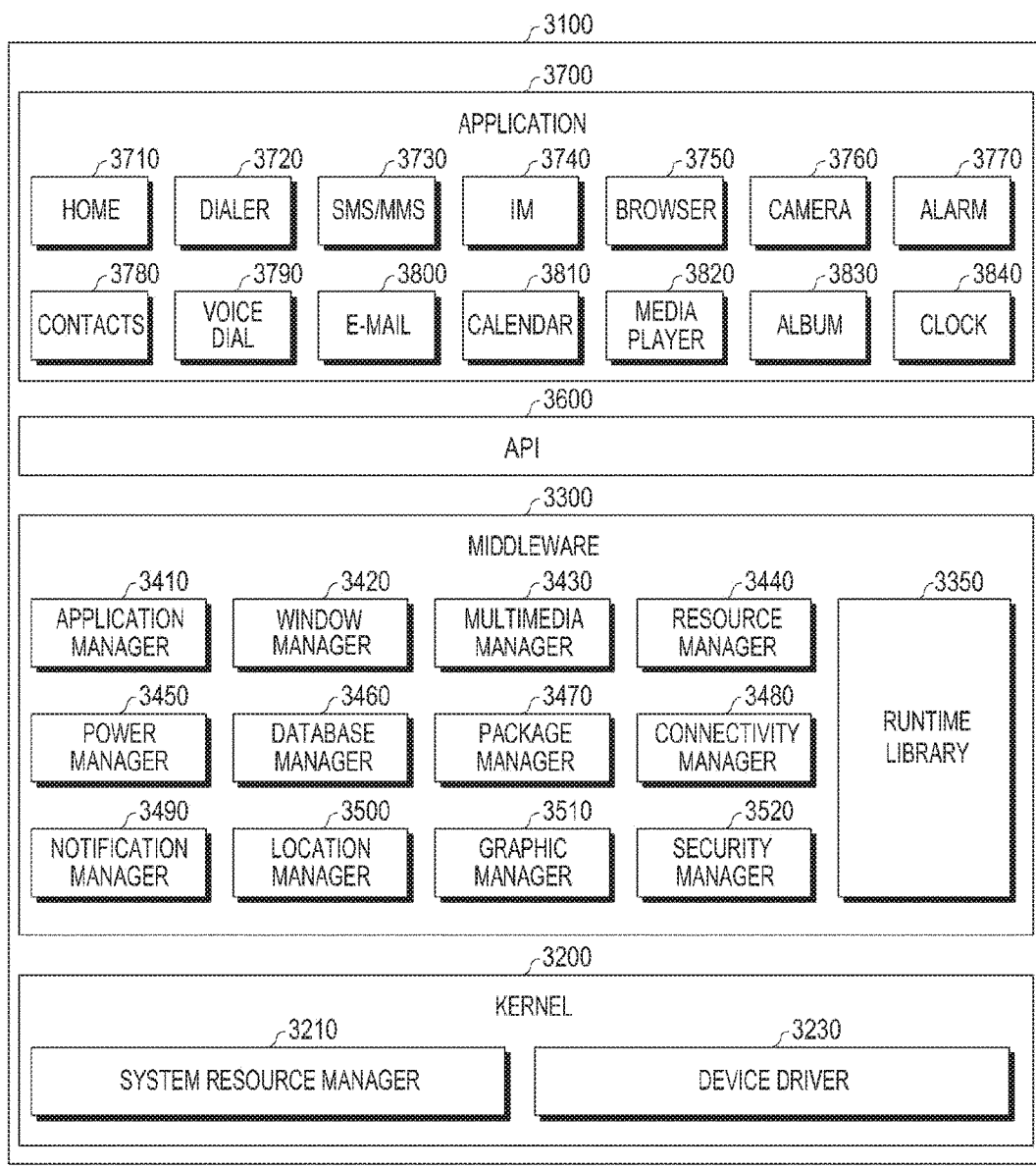
FIG. 45 is a block diagram of a program module, according to an embodiment of the present disclosure.

FIG. 45 is a block diagram of a program module, according to an embodiment of the present disclosure. The program module 3100 may include an OS for controlling resources related to an electronic device (e.g., the electronic device 1010/2010) and/or various applications (e.g., the application programs 1847), which are operated under the operating system. For example, the operating system may be Android™, iOS™, Windows™, Symbian™, Tizen™, Bada™, or the like.

The program module 3100 may include a kernel 3200, middleware 3300, an application programming interface (API) 3600, and/or applications 3700. At least some of the program module 3100 may be preloaded in the electronic device, or may be downloaded from external electronic devices (e.g., the electronic devices 1020 and 1040, or the server 1060).

The kernel 3200, for example, may include a system resource manager 3210 or a device driver 3230. The system resource manager 3210 may perform the control, allocation, or collection of system resources. The system resource manager 3210 may include a process management unit, a memory management unit, or a file system management unit. The device driver 3230 may include, for example, a display driver, a camera driver, a Bluetooth driver, a common memory driver, a USB driver, a keypad driver, a Wi-Fi driver, an audio driver, or an inter-process communication (IPC) driver.

The middleware 3300, for example, may provide functions required in common for the applications 3700, or may provide various functions through the API 3600 in order to allow the applications 3700 to effectively use limited system resources in the electronic device. The middleware 3300 may include at least one of a run time library 3350, an application manager 3410, a window manager 3420, a multimedia manager 3430, a resource manager 3440, a power manager 3450, a database manager 3460, a package manager 3470, a connectivity manager 3480, a notification manager 3490, a location manager 3500, a graphic manager 3510, or a security manager 3520.

The run time library 3350, for example, may include a library module that a compiler uses in order to add new functions through programming languages while the applications 3700 are executed. The run time library 3350 may perform the input/output management, the memory management, or a function of an arithmetic calculation.

The application manager 3410, for example, may manage a life cycle of at least one of the applications 3700. The window manager 3420 may manage a GUI resource used in the screen. The multimedia manager 3430 may identify formats for reproducing various media files, and may perform encoding or decoding of media files by using a codec corresponding to each format. The resource manager 3440 may manage resources, such as source codes, memories, or storage spaces of one or more applications 3700.

The power manager 3450, for example, may manage a battery or power by operating in association with a basic input/output system (BIOS), and may provide power information that is necessary for the operation of the electronic device. The database manager 3460 may manage to create, retrieve, or change a database that is to be used in one or more applications 3700. The package manager 3470 may manage the installation or updating of the applications that are distributed in the form of a package file.

The connectivity manager 3480, for example, may manage a wireless connection, such as Wi-Fi or Bluetooth. The notification manager 3490 may display or notify of events (such as received messages, appointments, or proximity notifications) to the user without disturbance. The location manager 3500 may manage location information of the electronic device. The graphic manager 3510 may manage graphic effects to be provided to the user or user interfaces related thereto. The security manager 3520 may provide a general security function required for the system security or user authentication. In the case of the electronic device 1010 adopting a phone call function, the middleware 3300 may further include a telephony manager for managing the functions of a voice call or a video call of the electronic device.

The middleware 3300 may include a middleware module through a combination of various functions of the above-described elements. The middleware 3300 may provide a module that is specialized according to the type of operating system in order to provide differentiated functions. In addition, the middleware 3300 may dynamically exclude some of the typical elements or add new elements.

The API 3600), for example, may be a group of API programming functions, and may be provided as a different configuration according to an operating system. For example, one set of APIs may be provided to each platform in the case of Android™ or iOS™, and two or more sets of APIs may be provided to each platform in the case of Tizen™.

The applications 3700 may include one or more applications that execute functions of home 3710, a dialer 3720, SMS/MMS 3730, instant messages 3740, a browser 3750, a camera 3760, an alarm 3770, contacts 3780, voice dial 3790, e-mail 3800, a calendar 3810, a media player 3820, an album 3830, a clock 3840, healthcare (e.g., measuring the amount of exercise or blood glucose), providing environment information (e.g., providing atmospheric pressure, humidity, or temperature information), or the like.

The applications 3700 may include an information-exchange application that supports the exchange of information between the electronic device 1010 and the electronic device 1020 or 1040. The information-exchange application, for example, may include a notification relay application for relaying specific information to the external electronic devices, or may include a device management application for managing the external electronic devices.

For example, the notification relay application may include a function of transferring notification information generated in other applications (e.g., the SMS/MMS application, the e-mail application, the healthcare application, or the environment information application) of the electronic device to the electronic device 1020 or 1040. In addition, the notification relay application, for example, may receive notification information from the external electronic device to then provide the same to the user.

The device management application, for example, may manage (e.g., install, delete, or update): one or more functions (e.g., turning on and off the external electronic device (or some elements) or adjusting the brightness (or resolution) of a display) of the electronic device 1020 or 1040 that communicates with the electronic device; applications executed in the external electronic device; or services (e.g., a phone call service or a messaging service) provided by the external electronic device.

The applications 3700 may include applications that are designated according to the attribute (e.g., the healthcare application of a mobile medical device) of the electronic device 1020 or 1040. The applications 3700 may include applications that are received from the server 1060 or the electronic device 1020 or 1040. The applications 3700 may include preloaded applications or third party applications that can be downloaded from a server. The names of the elements of the program module 3100 may vary depending on the type of operating system.

According to various embodiments, at least some of the program module 3100 may be implemented by software, firmware, hardware, or a combination thereof. At least some of the program module 3100, for example, may be implemented (e.g., executed) by the processor (e.g., the processor 1200). At least some of the program module 3100, for example, may include modules, program routines, sets of instructions, or processors for executing one or more functions.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An optical system comprising:
a first lens group that has a positive refractive power;
a second lens group that has a negative refractive power;
a third lens group that has a negative refractive power;
a fourth lens group that has a positive refractive power; and
a fifth lens group that includes one or more lens groups, in sequence from an object,
wherein the first lens group and the fifth lens group are fixed and the third lens group moves parallel to an optical axis to perform focusing when adjusting a magnification of the optical system,
wherein the third lens group is comprised of one negative lens, a combined lens of a positive lens and a negative lens, or a combination of a single positive lens and a single negative lens,
wherein the first lens group is comprised of one negative lens, two positive lenses, in sequence from an object,
wherein the fifth lens group is comprised of a first sub-lens group having a positive refractive power, a second sub-lens group having a negative refractive power, and a third sub-lens group having a positive refractive power in sequence from an object, and
wherein the first sub-lens group has a last surface configured to be concave with respect to the image plane and the third sub-lens group has a concave surface with respect to the object.

2. The optical system according to claim 1, wherein the second lens group, the third lens group, and the fourth lens group move toward an image without inflection when adjusting the magnification of the optical system from a wide-angle end to a telephoto end.

3. The optical system according to claim 1, wherein the optical system satisfies the equation:

$$|fT/f12T|<0.3,$$

where fT represents a focal distance of a whole system at a telephoto end, and f12T represents a composite focal distance of the first lens group and the second lens group at the telephoto end.

4. The optical system according to claim 1, wherein the third lens group is configured with one of one lens and two combined lenses.

5. The optical system according to claim 4, wherein the optical system satisfies the equation:

$$0.4<|(R1+R2)/(R1-R2)|<0.8,$$

where R1 denotes a radius of curvature of a first lens surface from the object in the third lens group, and R2 denotes a radius of curvature of a last lens surface from the object in the third lens group.

6. The optical system according to claim 1, wherein the third lens group of the optical system satisfies the equations:

$$(1 - m_{focus,T}^2) \cdot m_{rear,T}^2 \cdot f3/fT < -0.4 \text{ and}$$

$$0.7 \leq \frac{\{(1 - m_{focus,T}^2) \cdot m_{rear,T}^2\}}{\{(1 - m_{focus,W}^2) \cdot m_{rear,W}^2\}} \leq 1.4,$$

where fT denotes a focal distance of the whole system at a telephoto end, f3 denotes a focal distance of the third lens group, $m_{focus,T}$ denotes a magnification of the third lens group at a telephoto end, and $m_{rear,T}$ denotes a magnification of the lens groups positioned after the third lens group at a telephoto end, $m_{focus,W}$ denotes a magnification of the third lens group at a wide-angle end, and $m_{rear,W}$ denotes a magnification of the lens groups positioned after the third lens group at a wide-angle end.

7. The optical system according to claim 1, wherein the optical system satisfies the equations:

$$|fT/f34T|<1.0 \text{ and}$$

$$-0.4<fW/f34W+f34T<0.2,$$

where f34T represents a composite focal distance of the third lens group and the fourth lens group at a telephoto end, fW represents a focal distance of the whole system at a wide-angle end, and f34W represents a composite focal distance of the third lens group and the fourth lens group at a wide-angle end.

8. The optical system according to claim 1, wherein the first lens group is comprised of two or more positive lenses and one or more negative lenses, and wherein the optical system satisfies the equations:

$$1E-4<1/(fp1 \times Vdp1)+1/(fp2+Vdp2)<1.5E-4 \text{ and}$$

$$4.5E-6<\Delta Pg,Fp1/(fp1 \times Vdp1)+\Delta Pg,Fp2/(fp2 \times Vdp2)<6.5E-6,$$

where fpn is a focal distance of a lens Pn, Vdpn is the Abbe number of the lens Pn, Pg and Fpn are a partial dispersion ratio of a group-line and a F-line of the lens Pn, and Pg,F is Pg,F−(−0.001682*vd+0.6438) when it is assumed that P1, P2, P3, . . . are arranged in the order of a large Abbe number among the positive lenses, or in the order of a short focal distance in the case of the same Abbe number.

9. The optical system according to claim 1, wherein the optical system satisfies the equations:

$$Vnd>60 \text{ and}$$

$$|fT/f15BT|<0.7,$$

where Vnd represents the Abbe number of the negative lens, and f15BT represents a composite focal distance of the second sub-lens group at the telephoto end in the first lens group.

10. The optical system according to claim 1, wherein the optical system satisfies the equation:

$$0.05<|(D5 \times f5B)/(f5A \times f5C)|<0.25,$$

where D5 denotes an air gap between the first sub-lens group and the second sub-lens group, f5A denotes a focal distance of the first sub-lens group, f5B denotes a focal distance of the second sub-lens group, and f5C denotes a focal distance of the third sub-lens group.

11. The optical system according to claim 1, wherein the optical system satisfies the equation:

$$0.2<B.F.L./f5C<0.8,$$

where B.F.L. represents a focal distance in-air when there is no filter around an image plane, and f5C represents a focal distance of the third sub-lens group.

12. The optical system according to claim 1, wherein the third lens group is comprised of one or more negative lenses and one or more positive lenses, and wherein the optical system satisfies the equation:

$$0.150<N3p-N3n,$$

where N3n represents a refractive index of a negative lens that has the minimum refractive power among the lenses of the third lens group, and N3p represents a refractive index of a positive lens that has the maximum refractive power among the lenses of the third lens group.

13. The optical system according to claim 1, wherein the optical system satisfies the equation:

$$0<(wT(0.1)-wT(0))/wT(0)<0.15,$$

where wT(M) denotes a degree of a half-angle of view at a telephoto end when an object-to-image magnification is M.

14. An optical system comprising:
a first lens group that has a positive refractive power;
a second lens group that has a negative refractive power;
a third lens group that has a negative refractive power;
a fourth lens group that has a positive refractive power; and
a fifth lens group that includes one or more lens groups, in sequence from an object,
wherein the first lens group and the fifth lens group are fixed and the third lens group moves parallel to an optical axis to perform focusing when adjusting a magnification of the optical system from a wide-angle end to a telephoto end,
wherein the optical system satisfies the equation:

$$|fT/f12T|<0.3,$$

where fT represents a focal distance of the whole system at a telephoto end, and f12T represents a composite focal distance of the first lens group and the second lens group at a telephoto end,
wherein the third lens group is comprised of one negative lens, a combined lens of a positive lens and a negative lens, or a combination of a single positive lens and a single negative lens,
wherein the first lens group is comprised of one negative lens, two positive lenses, in sequence from an object,
wherein the fifth lens group is comprised of a first sub-lens group having a positive refractive power, a second sub-lens group having a negative refractive power, and a third-sub lens group having a positive refractive power in sequence from an object, and
wherein the first sub-lens group has a last surface configured to be concave with respect to the image plane and the third sub-lens group has a concave surface with respect to the object.

15. An optical system comprising:
a first lens group that has a positive refractive power;
a second lens group that has a negative refractive power;
a third lens group that has a negative refractive power;
a fourth lens group that has a positive refractive power; and
a fifth lens group that includes one or more lens groups, in sequence from an object,
wherein the first lens group and the fifth lens group are fixed and the third lens group moves parallel to an optical axis to perform focusing when adjusting a magnification of the optical system from a wide-angle end to a telephoto end,
wherein the optical system satisfies the equations:

$$|fT/f12T|<0.3 \text{ and}$$

$$0.4<|(R1+R2)/(R1-R2)|<0.8,$$

where fT represents a focal distance of the whole system at a telephoto end, f12T represents a composite focal distance of the first lens group and the second lens group at a telephoto end, R1 represents a radius of curvature of the first lens surface from the object in the third lens group, and R2 represents a radius of curvature of the last lens surface from the object in the third lens group,
wherein the third lens group is comprised of one negative lens, a combined lens of a positive lens and a negative lens, or a combination of a single positive lens and a single negative lens,
wherein the first lens group is comprised of one negative lens, two positive lenses, in sequence from an object,
wherein the fifth lens group is comprised of a first sub-lens group having a positive refractive power, a second sub-lens group having a negative refractive power, and a third sub-lens group having a positive refractive power in sequence from an object, and
wherein the first sub-lens group has a last surface configured to be concave with respect to the image plane and the third sub-lens group has a concave surface with respect to the object.

16. An optical system comprising:
a first lens group that has a positive refractive power;
a second lens group that has a negative refractive power;
a third lens group that has a negative refractive power;
a fourth lens group that has a positive refractive power; and
a fifth lens group that includes one or more lens groups, in sequence from an object,
wherein the first lens group and the fifth lens group are fixed and the third lens group moves parallel to an optical axis to perform focusing when adjusting a magnification of the optical system from a wide-angle end to a telephoto end,
wherein the optical system satisfies the equations:

$$|fT/f12T|<0.3$$

$$0<(wT(0.1)-wT(0))/wT(0)<0.15,$$

where fT represents a focal distance of the whole system at a telephoto end, f12T represents a composite focal distance of the first lens group and the second lens group at a telephoto end, and wT(M) represents a degree of a half-angle of view at a telephoto end when the object-to-image magnification is M,
wherein the third lens group is comprised of one negative lens, a combined lens of a positive lens and a negative lens, or a combination of a single positive lens and a single negative lens,
wherein the first lens group is comprised of one negative lens, two positive lenses, in sequence from an object,
wherein the fifth lens group is comprised of a first sub-lens group having a positive refractive power, a second sub-lens group having a negative refractive power, and a third sub-lens group having a positive refractive power in sequence from an object, and
wherein the first sub-lens group has a last surface configured to be concave with respect to the image plane and the third sub-lens group has a concave surface with respect to the object.

17. An optical system comprising:
a first lens group that has a positive refractive power;
a second lens group that has a negative refractive power;
a third lens group that has a positive refractive power; and
a fourth lens group that includes one or more lens groups,
wherein the first lens group and the fourth lens group are fixed when adjusting a magnification of the optical system from a wide-angle end to a telephoto end, and the second lens group comprises a focusing lens group that moves parallel to an optical axis to perform focusing,
wherein the optical system satisfies the equation:

$$|fT/f1\text{-focus}T|<0.3,$$

where fT represents a focal distance of the whole system at a telephoto end, and f1-focusT represents a composite focal distance from the first lens group to a lens group before the focusing lens group at a telephoto end,
wherein the third lens group is comprised of one negative lens, a combined lens of a positive lens and a negative lens, or a combination of a single positive lens and a single negative lens,
wherein the first lens group is comprised of one negative lens, two positive lenses, in sequence from an object,
wherein the fourth lens group is comprised of a first sub-lens group having a positive refractive power, a second sub-lens group having a negative refractive power, and a third sub-lens group having a positive refractive power in sequence from an object, and
wherein the first sub-lens group has a last surface configured to be concave with respect to the image plane and the third sub-lens group has a concave surface with respect to the object.

18. The optical system according to claim 17, wherein the focusing lens group is configured with one of one lens and two combined lenses.

19. The optical system according to claim 18, wherein the optical system satisfies the equation:

$$0.4<|(R\text{focus}1+R\text{focus}2)/(R\text{focus}1-R\text{focus}2)|<0.8,$$

where Rfocus1 represents a radius of curvature of the first lens surface of the focusing lens group from the object, and Rfocus2 represents a radius of curvature of the last lens surface of the focusing lens group from the object.

* * * * *